(12) United States Patent
Sasaki

(10) Patent No.: US 8,199,223 B2
(45) Date of Patent: Jun. 12, 2012

(54) IMAGE PROCESSING DEVICE, IMAGE PROCESSING METHOD, AND COMPUTER READABLE STORAGE MEDIUM STORING IMAGE PROCESSING PROGRAM

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 253 days.

(21) Appl. No.: 12/754,765

(22) Filed: Apr. 6, 2010

(65) Prior Publication Data

US 2010/0259650 A1    Oct. 14, 2010

(30) Foreign Application Priority Data

Apr. 8, 2009   (JP) ................................ 2009-094429

(51) Int. Cl.
*H04N 5/217* (2011.01)
*H04N 5/208* (2006.01)
*G06K 9/40* (2006.01)
(52) U.S. Cl. ......... 348/241; 348/252; 382/261; 382/164
(58) Field of Classification Search .................. 348/241, 348/242, 252, 253; 382/260, 261, 264, 266
See application file for complete search history.

(56) References Cited

U.S. PATENT DOCUMENTS

| 6,714,242 | B1 * | 3/2004 | Kobayashi | 348/272 |
|---|---|---|---|---|
| 7,317,842 | B2 | 1/2008 | Lin et al. | |
| 7,995,868 | B2 * | 8/2011 | Hasegawa et al. | 382/299 |
| 2003/0122969 | A1 * | 7/2003 | Higuchi | 348/607 |
| 2006/0114526 | A1 * | 6/2006 | Hasegawa | 358/518 |
| 2008/0107352 | A1 | 5/2008 | Chang et al. | |
| 2008/0175511 | A1 * | 7/2008 | Horie | 382/260 |
| 2009/0041371 | A1 * | 2/2009 | Hasegawa | 382/261 |
| 2009/0115870 | A1 * | 5/2009 | Sasaki | 348/223.1 |
| 2009/0219417 | A1 * | 9/2009 | Tsuruoka | 348/241 |
| 2010/0086202 | A1 * | 4/2010 | Omata et al. | 382/162 |
| 2010/0141809 | A1 * | 6/2010 | Fukutomi et al. | 348/241 |
| 2010/0194933 | A1 * | 8/2010 | Sasaki | 348/241 |
| 2010/0245632 | A1 * | 9/2010 | Suzuki | 348/241 |
| 2010/0302416 | A1 * | 12/2010 | Kawashima | 348/246 |
| 2011/0205404 | A1 * | 8/2011 | Tamura et al. | 348/241 |
| 2011/0267509 | A1 * | 11/2011 | Hasegawa et al. | 348/242 |

FOREIGN PATENT DOCUMENTS

| JP | 61-206376 A | | 9/1986 |
|---|---|---|---|
| JP | 2001061157 A | * | 3/2001 |
| JP | 2006-302023 A | | 11/2006 |
| JP | 2008-124764 A | | 5/2008 |
| JP | 2009042926 A | * | 2/2009 |
| JP | 2009055281 A | * | 3/2009 |

* cited by examiner

*Primary Examiner* — John Villecco
(74) *Attorney, Agent, or Firm* — Holtz, Holtz, Goodman & Chick, PC

(57) ABSTRACT

An image processor extracts a pixel area including a pixel of interest for processing and peripheral pixels located around the pixel of interest from input image data, generates a plurality of pixel groups by dividing pixels in the pixel area based on a pixel value distribution in the pixel area, calculates a pixel group similarity between a pixel group and a pixel group including the pixel of interest for each pixel group for pixels belonging to the pixel group in the pixel area, calculates a pixel value similarity of each pixel in the pixel area based on a pixel value of the pixel of interest, calculates filter coefficients to be applied to pixels in the pixel area based on the pixel group and pixel value similarities, and smooths the pixel value of the pixel of interest based on pixel values in the pixel area and the filter coefficients.

16 Claims, 22 Drawing Sheets

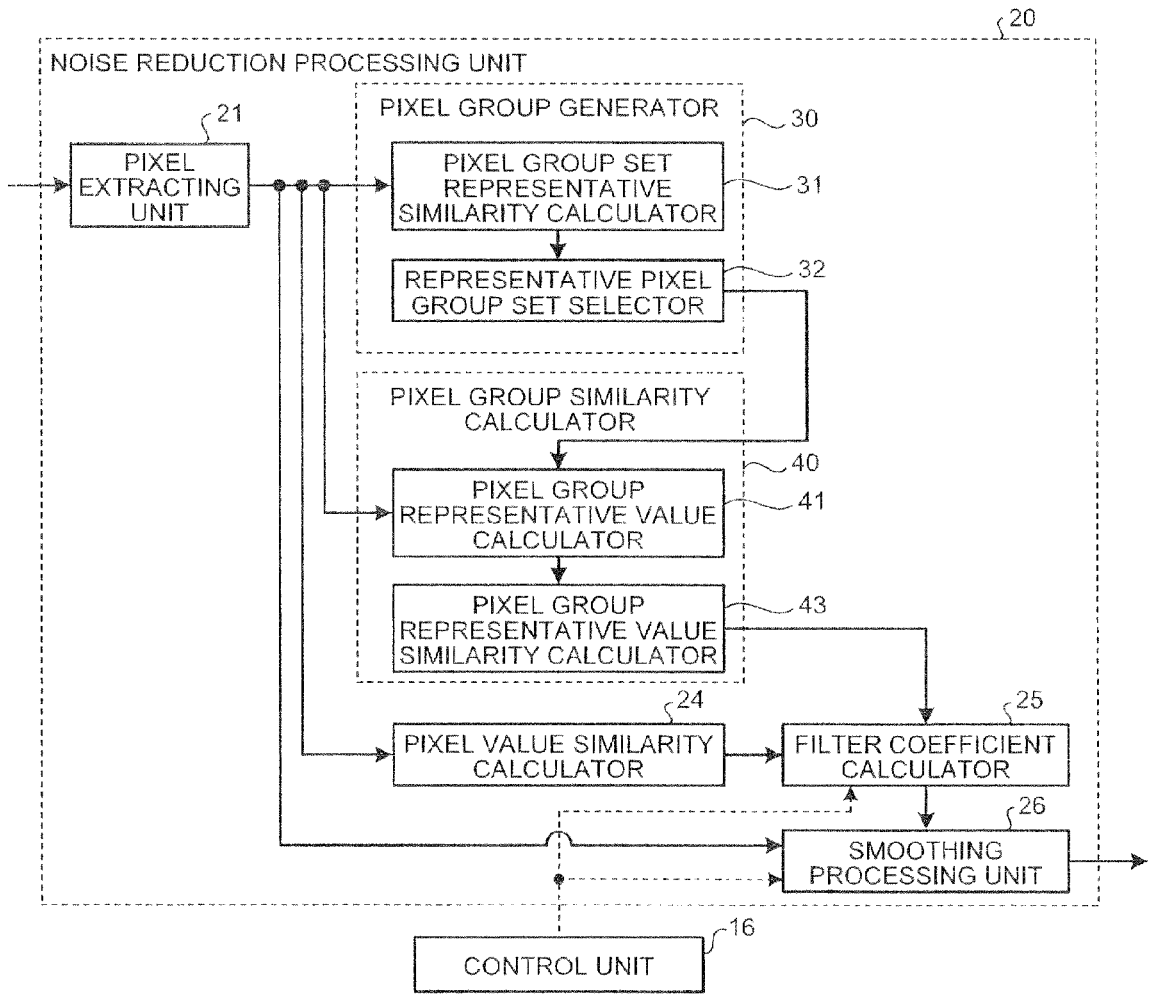

FIG.4A

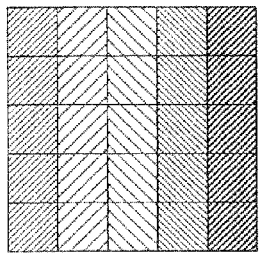

- PIXEL GROUP $g_{10}$
- PIXEL GROUP $g_{11}$
- PIXEL GROUP $g_{12}$
- PIXEL GROUP $g_{13}$
- PIXEL GROUP $g_{14}$

FIG.4B

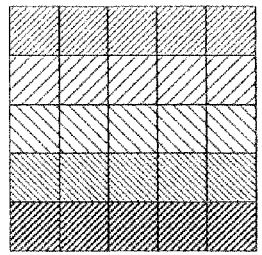

- PIXEL GROUP $g_{20}$
- PIXEL GROUP $g_{21}$
- PIXEL GROUP $g_{22}$
- PIXEL GROUP $g_{23}$
- PIXEL GROUP $g_{24}$

FIG.4C

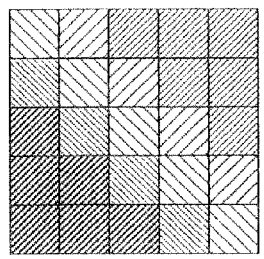

- PIXEL GROUP $g_{30}$
- PIXEL GROUP $g_{31}$
- PIXEL GROUP $g_{32}$
- PIXEL GROUP $g_{33}$
- PIXEL GROUP $g_{34}$

FIG.4D

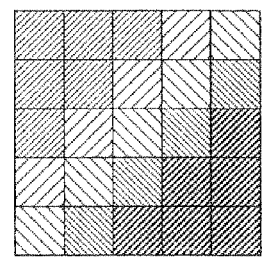

- PIXEL GROUP $g_{40}$
- PIXEL GROUP $g_{41}$
- PIXEL GROUP $g_{42}$
- PIXEL GROUP $g_{43}$
- PIXEL GROUP $g_{44}$

FIG.4E

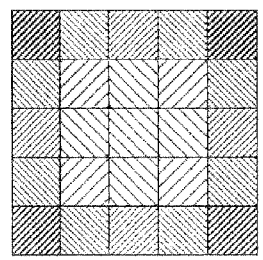

- PIXEL GROUP $g_{50}$
- PIXEL GROUP $g_{51}$
- PIXEL GROUP $g_{52}$
- PIXEL GROUP $g_{53}$
- PIXEL GROUP $g_{54}$

PIXEL OF INTEREST

PIXEL OF INTEREST

PIXEL OF INTEREST

PIXEL OF INTEREST

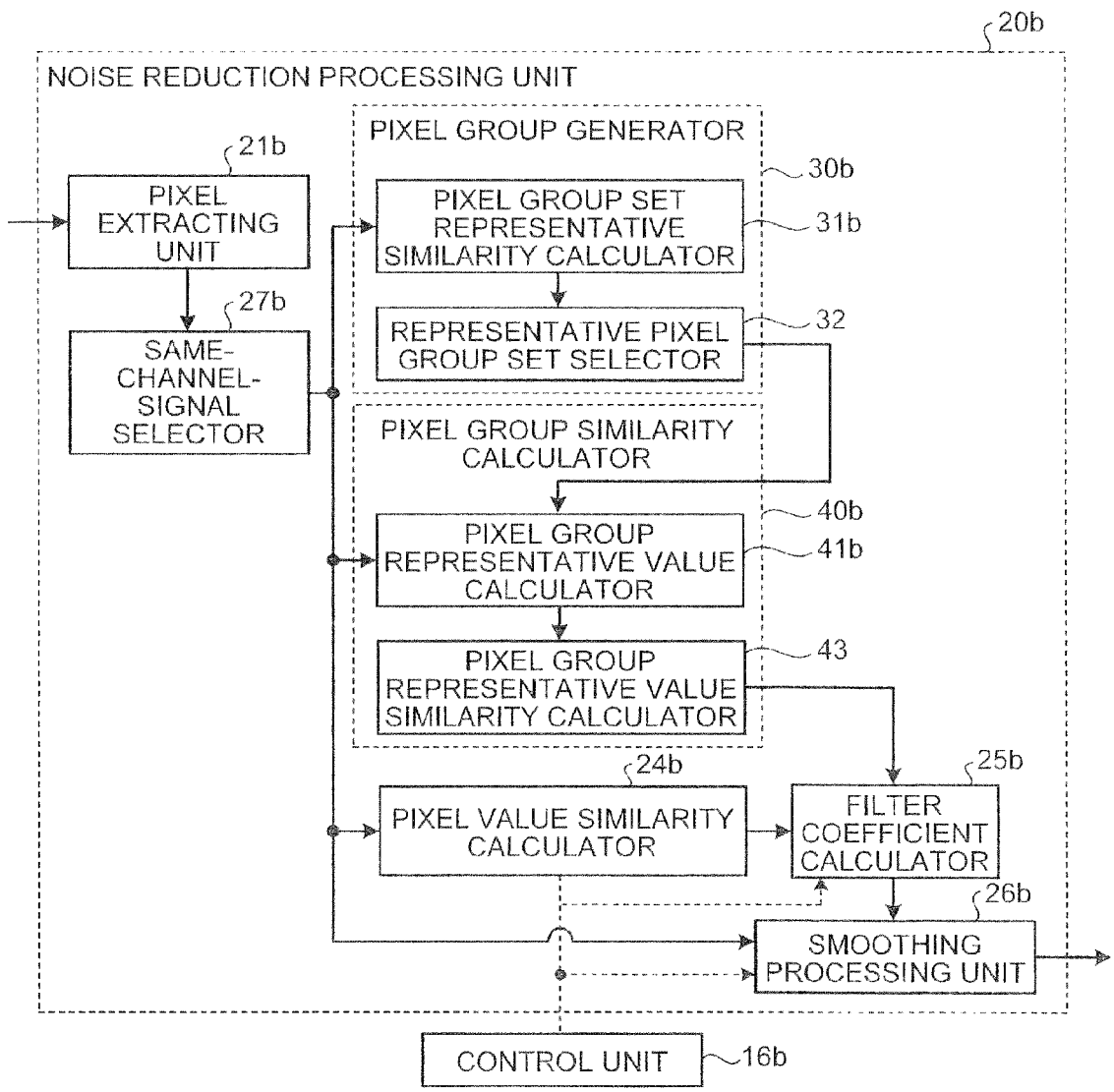

FIG.20
 PIXEL OF INTEREST

FIG.21A

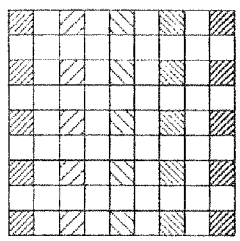

PIXEL GROUP $g_{10\_2}$
PIXEL GROUP $g_{11\_2}$
PIXEL GROUP $g_{12\_2}$
PIXEL GROUP $g_{13\_2}$
PIXEL GROUP $g_{14\_2}$

FIG.21B

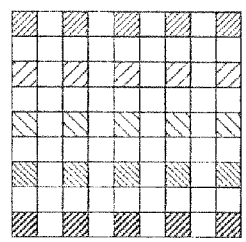

PIXEL GROUP $g_{20\_2}$
PIXEL GROUP $g_{21\_2}$
PIXEL GROUP $g_{22\_2}$
PIXEL GROUP $g_{23\_2}$
PIXEL GROUP $g_{24\_2}$

FIG.21C

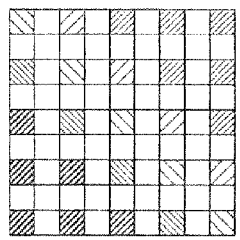

PIXEL GROUP $g_{30\_2}$
PIXEL GROUP $g_{31\_2}$
PIXEL GROUP $g_{32\_2}$
PIXEL GROUP $g_{33\_2}$
PIXEL GROUP $g_{34\_2}$

FIG.21D

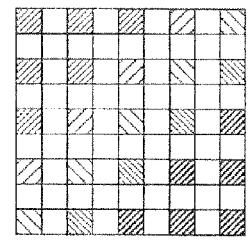

PIXEL GROUP $g_{40\_2}$
PIXEL GROUP $g_{41\_2}$
PIXEL GROUP $g_{42\_2}$
PIXEL GROUP $g_{43\_2}$
PIXEL GROUP $g_{44\_2}$

FIG.21E

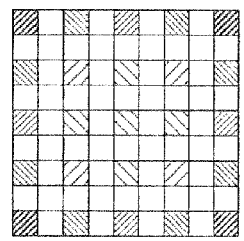

PIXEL GROUP $g_{50\_2}$
PIXEL GROUP $g_{51\_2}$
PIXEL GROUP $g_{52\_2}$
PIXEL GROUP $g_{53\_2}$
PIXEL GROUP $g_{54\_2}$

IMAGE PROCESSING DEVICE, IMAGE PROCESSING METHOD, AND COMPUTER READABLE STORAGE MEDIUM STORING IMAGE PROCESSING PROGRAM

CROSS-REFERENCE TO RELATED APPLICATIONS

This application is based upon and claims the benefit of priority from Japanese Patent Application No. 2009-094429, filed on Apr. 8, 2009, the entire contents of which are incorporated herein by reference.

BACKGROUND OF THE INVENTION

1. Field of the Invention

The present invention relates to an image processing device, an image processing method and a computer readable storage medium storing an image processing program for performing noise reduction process on image data.

2. Description of the Related Art

An imaging device is known which focuses light collected by an image capturing lens to form an image on an image sensor such as a CCD (Charge Coupled Device), a CMOS (Complementary Metal Oxide Semiconductor), and the like, and captures an image of a subject. The image captured by such an imaging system includes noise added to the image when the image is an analog signal, such as when photoelectrically converting the image formed on the image sensor through the image capturing lens at light receiving units of each pixel of the image sensor or when amplifying and A/D converting a charge amount obtained by photoelectrical conversion.

For example, the noise predominantly generated in photoelectrical conversion is shot noise which is caused by stochastic fluctuations of photoelectrical conversion, and the noise is a so-called random noise. Fluctuations of generated charge amount increase as the number of photons (or dark current) increases. On the other hand, the noise predominantly generated in A/D conversion is a so-called fixed pattern noise, which is different from the random noise, including noise added by dark current and sensitivity variations of each pixel, crosstalk of signal transmission path and peripheral pixels, and the like, and noise added by variations of signal amplification due to multi-line reading.

The fixed pattern noise can be reduced by storing characteristics of the fixed pattern noise as correction data in advance and correcting the image data after A/D conversion by using the correction data. Meanwhile, regarding the random noise, characteristics thereof cannot be estimated in advance, unlike the fixed pattern noise. Therefore, conventionally, a signal to noise ratio (SN ratio) is improved by using smoothing process in order to reduce the random noise.

Here, ds the smoothing process, there are proposed various methods from a method in which fixed low pass filter characteristics are uniformly applied regardless of local structures of captured image, to a method in which a low pass filter characteristic applied is changed to perform filter processing while considering local structures of an image, and noise reduction performance is determined depending on which method is used.

Among these methods, as a method which can effectively reduce noise, a method is known in which a weight coefficient is determined for each pixel and each pixel is smoothed by using the determined weight coefficient (for example, refer to Japanese Laid-open Patent Publication Nos. 2006-302023 and 2008-124764). In Japanese Laid-open Patent Publication No. 2006-302023, filter processing is performed while adaptively changing the weight coefficient for each pixel on the basis of correlation (for example, absolute value of pixel value difference) between pixel values of a pixel of interest and a pixel around the pixel of interest. On the other hand, in Japanese Laid-open Patent Publication No. 2008-124764, the weight coefficient is determined by using a relative spatial distance and an absolute value of pixel value difference between a pixel of interest and a pixel around the pixel of interest, and the filter processing is performed by using the determined weight coefficient. Then, a noise amount with respect to the pixel of interest is estimated on the basis of the filter-processed pixel of interest value, and the noise reduction process of the pixel of interest is performed on the basis of the pixel of interest value and the estimated noise amount.

A typical smoothing filter which uses such an absolute value of pixel value difference is a bilateral filter. The bilateral filter is an adaptive filter which uses two types of parameters and changes low pass filter characteristics in accordance with local structures of an image, and can perform smoothing process while preserving edges in the image. In this bilateral filter, a Gauss function, for example, is used as a function to determine the filter coefficient, and the filter coefficient is calculated as a product of Gauss function values which are obtained by using the two types of parameters as weights.

Here, one of the two parameters used in the bilateral filter corresponds to the absolute value of pixel value difference between the pixel of interest and a pixel around the pixel of interest, and the smaller the value is, the larger the filter coefficient is set. On the other hand, for the other parameter, a relative spatial distance between the pixel of interest and a pixel around the pixel interest is used, and the smaller the value of the relative spatial distance is, the larger the filter coefficient is set.

The parameters will be briefly described. One parameter which is the absolute value of pixel value difference is used to determine whether there is an edge or not, and the determination condition is determined by a σ value of the Gauss function. When an edge amount (specifically, absolute value of pixel value difference) desired to be preserved is sufficiently larger than the σ value, the Gauss function value approaches zero, and thus the pixel does not contribute to the smoothing process. Therefore, a pixel having a large absolute value of pixel value difference between the pixel and pixels around the pixel (a pixel which does not correlate with the absolute value of the pixel value difference), such as a pixel at an edge boundary is not used for the smoothing process. Based on this, an effect that an edge is not smoothed is obtained.

On the other hand, the other parameter which is the spatial distance is based on an assumption that a correlation between pixel values decreases as the spatial distance between the pixels increases when statistically viewing local structures of an image. In other words, regarding a second pixel having the same pixel value as that of a first pixel and being located far from the first pixel, it is assumed that the original pixel value of the second pixel is not the same as the pixel value of the first pixel but the second pixel has the same pixel value because noise is added to the pixel value. Specifically, when pixels having the sane pixel value as that of the first pixel are located near the first pixel and far from the first pixel respectively, it is assumed that the near pixel has a correlation higher than that of the far pixel, and a larger weight is applied to the near pixel. Therefore, a pixel having a large spatial distance from pixels around the pixel (pixel having no correlation in spatial distance) is not used for the smoothing process.

The noise reduction effect using the bilateral filter modeled a described above shows significantly better performance in an area formed by a sharp and large edge and a flat portion.

Other than the above, as another method of smoothing process having a high noise reduction effect, for example, there is a method in which a one-dimensional low pass filter is applied along an edge direction (for example, refer to Japanese Laid-open Patent Publication No. 61-206376) In Japanese Laid-open Patent Publication No. 61-206376, first, the direction of the edge is determined. Then, on the basis of the determination result, a smoothing filter in the horizontal direction, smoothing filter in the vertical direction, or a smoothing filter in the diagonal direction is selected to perform the filter processing.

Further, as a method for improving the noise reduction effect in the filter processing along the edge direction, a method in which a two-dimensional filter is applied along the edge direction is known (for example, refer to U.S. Pat. No. 7,317,842). In U.S. Pat. No. 7,317,842, when determining the edge direction, distribution values in a plurality of directions are calculated in a local area, and an anisotropic two-dimensional filter is generated on the basis of the determined edge direction and its distribution value.

Further, there is a method that improves determination accuracy of the edge direction and is able to preserve fine edges (for example, refer to U.S. Patent Application Publication No. 2008/107352). Here, the fine edges are edge boundary portions having a small pixel value difference (brightness value difference), and hereinafter, the fine edges are arbitrarily referred to as "microstructure". U.S. Patent Application Publication No. 2008/107352 discloses smoothing process for an image in which spatial frequency is subbanded. Specifically, the smoothing process is performed by switching between a bilateral filter and a direction-dependent Gauss filter on the oasis of an energy amount of a local area and a determination threshold value of the energy amount. When using the direction-dependent Gauss filter, a filter coefficient is selected from a look-up table (LUT) prepared in advance, on the basis of an amount indicating isotropy of the local area, and the filter coefficient weighted along an edge direction is applied to the local area. More specifically, the bilateral filter and the direction-dependent Gauss filter are switched depending on the energy amount of the local area, that is, depending on whether there is a large edge or not, so that a control considering the characteristics of the bilateral filter is realized.

SUMMARY OF THE INVENTION

An image processing device according to an aspect of the present invention includes an image data input unit that receives liege data; a pixel extracting unit that extracts a pixel area including a pixel of interest to be processed and peripheral pixels located around the pixel of interest from the image data; a pixel group generator that generates a plurality of pixel groups by dividing pixels in the pixel area in accordance with a pixel value distribution in the pixel area; a pixel group similarity calculator that calculates a similarity between a pixel group and a pixel group including the pixel of interest for each pixel group as a pixel group similarity to be defined for pixels belonging to the pixel group in the pixel area; a pixel value similarity calculator that calculates a pixel value similarity of each pixel in the pixel area on the basis of pixel value of the pixel of interest; a filter coefficient calculator that calculates filter coefficients to be applied to pixels in the pixel area on the basis of the pixel group similarity and the pixel value similarity; and a smoothing processing unit that performs a smoothing process on the pixel value of the pixel of interest on the basis of pixel values in the pixel area and the filter coefficients. An image processing method according to another aspect of the present invention includes receiving image data; extracting a pixel area including a pixel of interest to be processed and peripheral pixels located around the pixel of interest from the image data; generating a plurality of pixel groups by dividing pixels in the pixel area in accordance with a pixel value distribution in the pixel area; calculating a similarity between a pixel group and a pixel group including the pixel of interest for each pixel group as a pixel group similarity to be defined for pixels belonging to the pixel group in the pixel area; calculating a pixel value similarity of each pixel in the pixel area on the basis of a pixel value of the pixel of interest; calculating filter coefficients to be applied to pixels in the pixel area on the basis of the pixel group similarity and the pixel value similarity; and performing a smoothing process on the pixel value of the pixel of interest on the bass of pixel values in the pixel area and the filter coefficients.

A computer readable storage medium according to still another aspect of the present invention stores an image processing program that comprises instructions causing a computer to execute receiving image data; extracting a pixel area including a pixel of interest to be processed and peripheral pixels located around the pixel of interest from the image data; generating a plurality of pixel groups by dividing pixels in the pixel area in accordance with a pixel value distribution in the pixel area; calculating a similarity between a pixel group and a pixel group including the pixel of interest for each pixel group as a pixel group similarity to be defined for pixels belonging to the pixel group in the pixel area; calculating a pixel value similarity of each pixel in the pixel area on the basis of a pixel value of the pixel of interest;

calculating filter coefficients to be applied to pixels in the pixel area on the basis of the pixel group similarity and the pixel value similarity; and performing a smoothing process on the pixel value of the pixel interest on the basis of pixel values in the pixel area and the filter coefficients.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram showing a configuration example of a noise reduction process unit according to the first embodiment;

FIG. 3 is a diagram showing an example of a processing target pixel area according to the first embodiment;

FIG. 4A is a diagram showing an example of candidate pixel group set according to the first embodiment;

FIG. 4B is a diagram showing another example of candidate pixel group set according to the first embodiment;

FIG. 4C is a diagram showing another example of candidate pixel group set according to the first embodiment;

FIG. 4D is a diagram showing another example of candidate pixel group set according to the first embodiment;

FIG. 4E is a diagram showing another example of candidate pixel group set according to the first embodiment;

FIG. 18 is a diagram showing an arrangement example of each RGB primary color filter;

FIG. 19 is a block diagram snowing a configuration example of the noise reduction processing unit;

FIG. 20 is a diagram showing an example of the processing target pixel area according to the second embodiment;

FIG. 21A is a diagram showing an example of candidate pixel group set to the second embodiment;

FIG. 21B is a diagram showing another example of candidate pixel group set according to the second embodiment;

FIG. 21C is a diagram showing another example of candidate pixel group set according to the second embodiment;

FIG. 21D is a diagram showing another example of candidate pixel group set according to the second embodiment;

FIG. 21E is a diagram showing another example of candidate pixel group set according to the second embodiment;

DETAILED DESCRIPTION OF THE PREFERRED EMBODIMENTS

Figure 1:
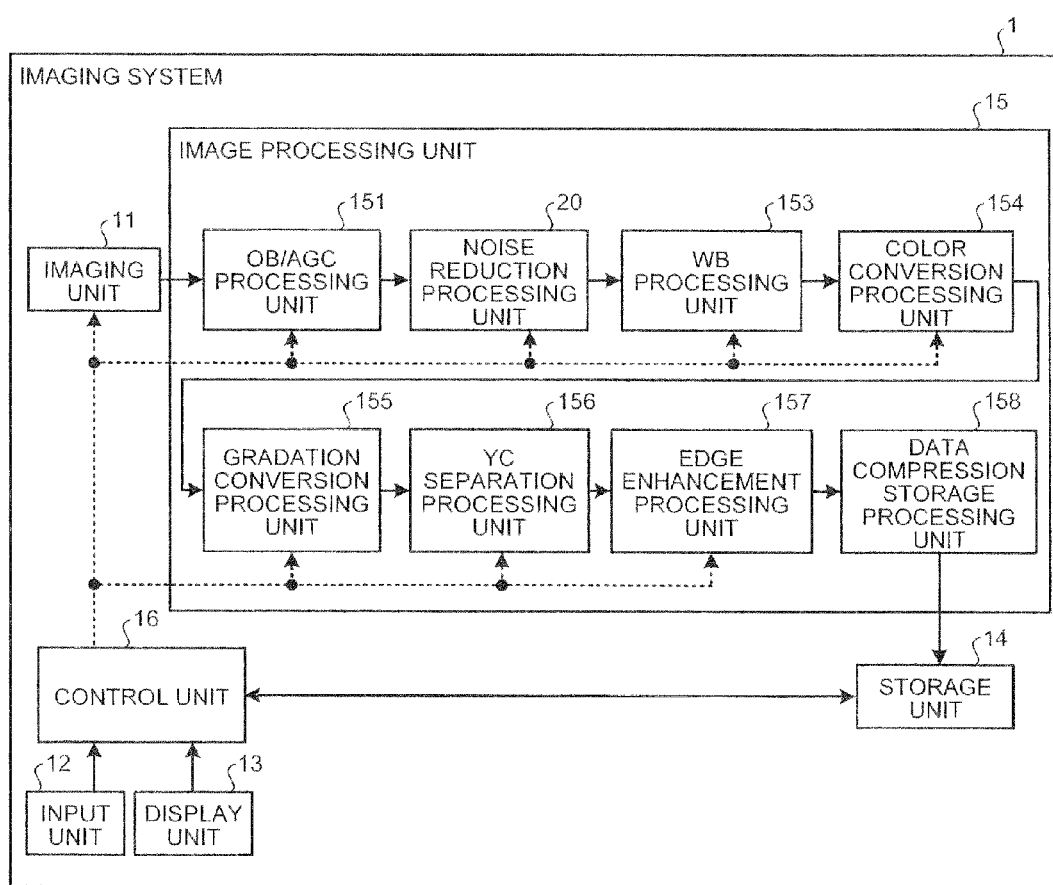
FIG. 1 is a block diagram showing an example of a general configuration of an imaging system according to a first embodiment.

Hereinafter, preferred embodiments for implementing the present invention will be described with reference to the drawings. The present invention is not limited by the embodiments. In the drawings, the same components are given the same reference symbols.

First, first embodiment will be described. In the first embodiment, an imaging system to which an image processing device of the present invention is applied will be described. FIG. 1 block diagram showing an example of a general configuration of an imaging system 1 according to the first embodiment. As shown in FIG. 1, the imaging system 1 according to the first embodiment includes an imaging unit 11 as an image data input unit, an input unit 12, a display unit 13, a storage unit 14, an image processing unit 15, and a control unit 16 that controls operations of the above units.

The imaging unit 11 includes an image capturing lens, a prism that separates incident light into color lights of RGB wavelength hands, and a three-chip digital video camera including image sensors such as CCDs or CMOSs that capture a subject image for each RGB color, and outputs 3-channel signals for each pixel. The imaging unit 11 forms images on the image sensors from light collected by the image capturing lens, and converts the formed images into electrical signals. The imaging unit 11 performs amplification process and A/D conversion process on the converted electrical signals, and generates image data of 3-channel RCB. The generated image data is outputted to an OB/AGC processing unit 151 in the image processing unit 15.

The input unit 12 is realized by, for example, a keyboard, a mouse, a touch panel, various switches, and the like, and outputs operation signals of the above components to the control unit 16. The display unit 13 is realized by a display device such as an LCD (Liquid Crystal Display), an EL display (Electroluminescence Display), or the like, and displays, for example, various screens such as a display screen of an image captured by the imaging unit 11, a setting screen for setting an operation environment of the imaging system 1, and the like under a control of the control unit 16.

The storage unit 14 is realized by various IC memories including a ROM such as an updatable flash memory and a RAM, a hard disk that is embedded or connected via a data communication terminal, various storage media such as a CD-ROM and a reading device thereof, and the like. In the storage unit 14, a program for operating the imaging system 1 and realizing various functions included in the imaging system 1, data used while the program is being executed, and the like are stored. Also, in the storage unit 14, the image data, which is captured by the imaging unit 11 and image-processed by the image processing unit 15, is stored.

The image processing unit 15 performs various image processing including noise reduction process on the image captured by the imaging unit 11. The image processing unit 15 includes the OB/AGC processing unit 151, a noise reduction processing unit 20, a WB processing unit 153, a color conversion processing unit 154, a gradation conversion processing unit 155, a YC separation processing unit 156, an edge enhancement processing unit 157, and a data compression storage processing unit 158.

The OB/AGC processing unit 151 performs a process (OB clamp process) to correct an offset amount of black level on the image inputted from the imaging unit 11. Specifically, first, an average of pixel values in a predetermined OB area in the image data is calculated. Then, the calculated average of pixel values is subtracted from an effective area in the image data, and the effective area where the average value has been subtracted is extracted to perform the OB clamp process. Further, the OB/AGC processing unit 151 performs brightness level adjustment process (AGC process) on the image data on which the OB clamp process has been performed. Specifically, the amount of gain is calculated on the basis of an average value or a maximum value of pixel values in the predetermined area in the image data, and the AGC process is performed by multiplying the effective area in the image data by the calculated amount of gain. The processed image data is outputted to the noise reduction processing unit 20.

The noise reduction processing unit 20 performs the noise reduction process on the image data inputted from the OB/AGC processing unit 151. The processed image data is outputted to the WB processing unit 153.

The WB processing unit 153 performs white balance correction process on the image data inputted from the noise reduction processing unit 20. Specifically, correction coefficients of an R channel and a B channel are calculated so that the values of the R channel, the channel, and a B channel of white color are the same, and the white balance of the inputted image data is corrected by using the calculated correction coefficients. The processed image data is outputted to the color conversion processing unit 154.

The color conversion processing unit 154 performs color conversion process on the image data inputted from the WB processing unit 153. Here, the image data from the WE processing unit 153 is image data of RGB col depending on an input device. The color conversion processing unit 154 converts the inputted image data of RGB colors depending on the input device into image data of RCB colors not depending on the device such as, for example, sRGB by performing matrix calculation process. The processed image data is outputted to the gradation conversion processing unit 155.

The gradation conversion processing unit 155 performs gradation conversion process on the image data inputted from the color conversion processing unit 154. Here, the image data from the color conversion processing unit 154 is inputted as image data having linear gradation characteristics. The gradation conversion processing unit 155 converts the inputted image data having linear gradation characteristics into image data having nonlinear gradation characteristics by using gamma characterstics notified from the control unit 16. The processed image data is outputted to the YC separation processing unit 156.

The YC separation processing unit 156 performs YC separation process on the image data inputted from the gradation conversion processing unit 155. Specifically, the YC separation processing unit 156 performs a 3×3 matrix calculation process to convert the inputted image data into a brightness signal Y and color difference signals Cb and Cr. The processed brightness signal and color difference signals are outputted to the edge enhancement processing unit 157.

The edge enhancement processing unit 157 performs edge enhancement process on the brightness signal inputted from the YC separation processing unit 156. Specifically, the edge enhancement processing unit 157 performs edge signal extraction process on the basis of the inputted brightness signal, performs amplification process on the extracted edge signal, and then adds the amplified edge signal to the input value of the brightness signal to generate a brightness signal whose edge is enhanced. The processed brightness signal and the color difference signals inputted from the YC separation processing unit 156 are outputted to toe data compression storage processing unit 158.

The data compression storage processing unit 158 performs compression process based on, for example, an MPEG method or a JPEG method on the brightness signal and the color difference signals inputted from the edge enhancement processing unit 157, and performs a process (storage process) to write and store the processed image data to the storage unit 14.

The control unit 16 is realized by hardware such as a CPU. The control unit 16 integrally controls an operation of the entire imaging system 1 by transmitting instructions and data to each unit constituting the imaging system 1 on the basis of the operation signals inputted from the input unit 12 or the program and the data stored in the storage unit 14. For example, the control unit 16 performs process for controlling the operation of the imaging unit 11 by setting an exposure amount, a gain, and the like, process for setting values of various parameters in accordance with a mode setting instructed by a user via the input unit 12 and transmitting the parameters to each unit of the device, and the like.

Next, the noise reduction processing unit 20 in the image processing unit 15 will be described. FIG. 2 is block diagram wing a configuration example of the noise reduction processing unit according to the first embodiment. As described above, the image data of 3-channel RGB is inputted into the noise reduction processing unit 20 as image data. The noise reduction processing unit 20 performs the same process on the image data of each channel. Here, the noise reduction processing unit 20 may perform the process on the image data of each channel in serial or in parallel at the same time.

As shown in FIG. 2, the noise reduction processing unit 20 includes a pixel extracting unit 21, a pixel group generator 30, a pixel group similarity calculator 40, a pixel value similarity calculator 24, a filter coefficient calculator 25, and a smoothing processing unit 26, and performs process on each pixel to be processed sequentially (hereinafter, the pixel to be processed is referred to as "pixel of interest"). In the noise reduction processing unit 20, the pixel extracting unit 21 extracts a processing target pixel area including a pixel of interest. Thereafter, the pixel group generator 30 and the pixel group similarity calculator 40 obtain a pixel group similarity for each pixel in the processing target pixel area. Meanwhile, the pixel value similarity calculator 24 obtains a pixel value similarity for each pixel in the processing target pixel area. The filter coefficient calculator 25 calculates a filter coefficient to be applied to each pixel in the processing target pixel area on the basis of the pixel group similarity and the pixel value similarity, and the smoothing processing unit 26 performs smoothing process on the pixel of interest. Hereinafter, process performed by each unit will be described.

The image data from the OB/AGC processing unit 151 is inputted into the pixel extracting unit 21 sequentially for each channel. The pixel extracting unit 21 extracts a pixel area to be referred when performing the noise reduction process on the pixel of interest as a processing target pixel area. FIG. 3 is a diagram showing an example of the processing target pixel area that is extracted by the pixel extracting unit 21. In the first embodiment, the pixel extracting unit 21 extracts a 5×5 processing target pixel area with the pixel of interest at its center.

Here, as shown in FIG. 3, the pixel values of each pixel (including the pixel of interest) in the processing target pixel area extracted with respect to the pixel of interest is defined as $P_{x+i,y+j}$ (i=−2, −1, 0, 1, 2; j=−2, −1, 0, 1, 2). The x and y respectively represent the horizontal coordinate (x coordinate) and the vertical coordinate (y coordinate) of the pixel of interest in the image data. The i and j respectively represent a relative coordinate (i) in the horizontal direction and a relative coordinate (j) in the vertical direction of each pixel in the extracted processing target pixel area. The extracted processing target pixel area (actually, pixel values $P_{x+i,y-j}$ of pixels constituting the processing target pixel area) is outputted to a pixel group set representative similarity calculator 31 in the pixel group generator 30 and the pixel value similarity calculator 24.

The pixel group generator 30 generates a pixel group by dividing the processing target pixel area inputted from the pixel extracting unit 21 into a plurality of small areas. For example, a plurality of division patterns is defined in advance. The pixel group generator 30 then uses a plurality of pixel group sees divided in accordance with the defined division patterns as candidates, selects one representative pixel group set from the candidates, and generates a pixel group.

In the first embodiment, five types of division patterns which divide the 5×5 processing target pixel area by five pixels are defined, and five types of pixel group sets divided in accordance with the division patterns are used as candidates. FIGS. 4A, 4B, 4C, 4D, and 4E are diagrams showing an example of five types of pixel group, sets used as candidates. In FIGS. 4A, 4B, 4C, 4D, and 4E, pixels belonging to the same pixel group are identified by a type of hatching.

Specifically, as shown in FIG. 4A, a pixel group set including five pixel groups $g_{10}$ to $g_{14}$ each obtained by dividing the processing target pixel area by five pixels in the column direction is used as a first candidate (hereinafter, this pixel group set is referred to as "vertical correlation pixel group set"). As shown in FIG. 4B, a pixel group set including five pixel groups $g_{20}$ to $g_{24}$ each obtained by dividing the processing target pixel area by five pixels in the row direction is used as a second candidate (hereinafter, this pixel group set is referred to as "horizontal correlation pixel group set"). As shown in FIG. 4C, a pixel group set including five pixel groups $g_{30}$ to $g_{34}$ each obtained by dividing the processing target pixel area along diagonally left-up lines is used as a third candidate (hereinafter, this pixel Group set is referred to as "left-up correlation pixel group set"). As shown in FIG. 4D, a pixel group set including five pixel groups $g_{40}$ to $g_{44}$ each obtained by dividing the processing target pixel area along diagonally right-up lines is used as a fourth candidate (hereinafter, this pixel group set is referred to as "right-up correlation pixel group set"). As shown in FIG. 4E, a pixel group set including five pixel groups $g_{50}$ to $g_{54}$ each obtained by dividing the processing target pixel area so that pixels included in each pixel group are symmetrical with respect to the pixel of interest at the center of the processing target pixel area is used as a fifth candid (hereinafter, this pixel group set is referred to as "isotropic correlation pixel group set").

Actually, as shown in FIG. 2, the pixel group generator 30 includes the pixel group set representative similarity calculator 31 and a representative pixel group set selector 32, and generates a pixel group (in other words, selects a representative pixel group set) by the processing of these components.

Figure 5:
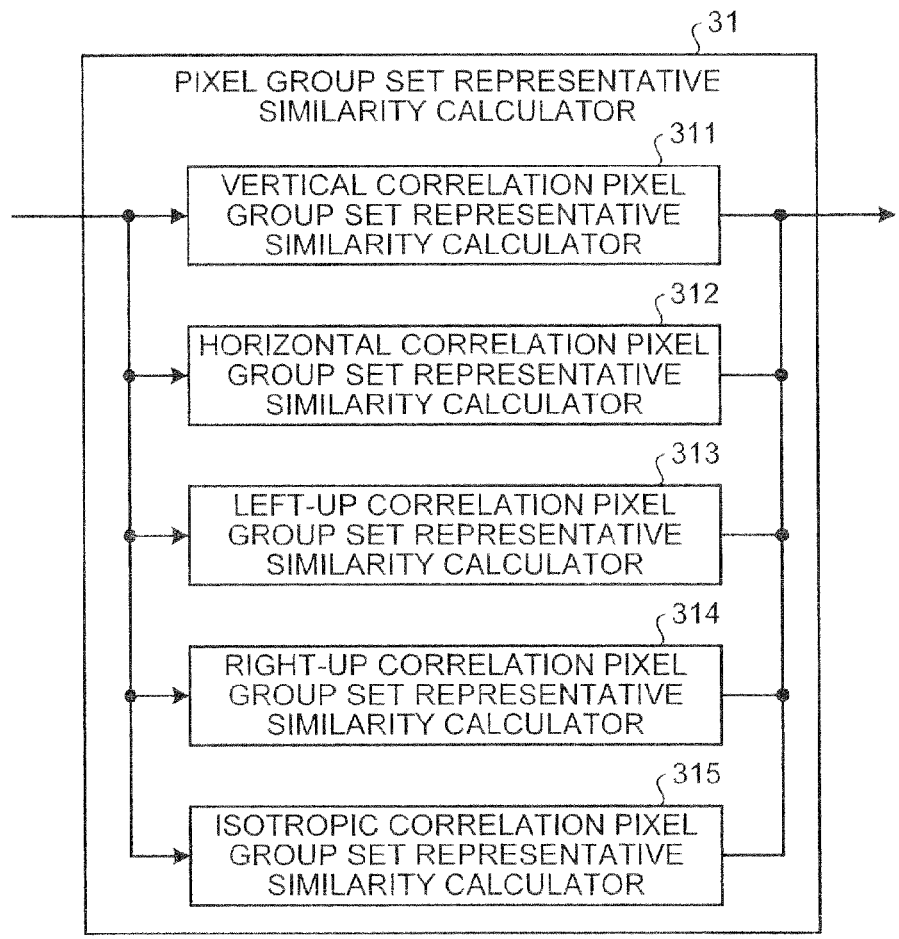
FIG. 5 is a block diagram showing a configuration of a pixel group set representative similarity calculator.

First, the pixel group set representative similarity calculator 31 calculates a similarity (a pixel group representative similarity) for each candidate when dividing the processing target pixel area into a pixel group set of each candidate. FIG. 5 is a block diagram showing a configuration of the pixel group set representative similarity calculator 31. As shown in FIG. 5, the pixel group set representative similarity calculator 31 includes a vertical correlation pixel group at representative similarity calculator 311, a horizontal correlation pixel group set representative similarity calculator 312, a left-up correlation pixel group set representative similarity calculator 313, a right-up correlation pixel group set representative similarity calculator 314, and an isotropic correlation pixel group set representative similarity calculator 315.

Figure 6:
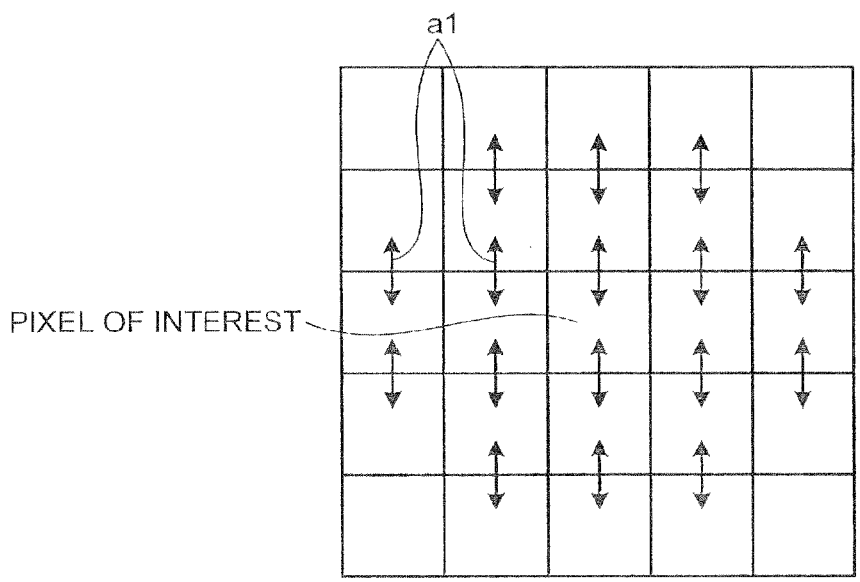
FIG. 6 is an explanatory diagram illustrating a calculation principle of pixel group set representative similarity according to the first embodiment.

First, the vertical correlation pixel group set representative similarity calculator 311 calculates a similarity a pixel group set representative similarity) SGv when dividing the processing target pixel area into the vertical correlation pixel group set. FIG. 6 is an explanatory diagram illustrating a calculation principle of the pixel group set representative similarity SGv according to the first embodiment. As shown by arrows a1 in FIG. 6, the vertical correlation pixel group set representative similarity calculator 311 calculates, for example, a difference absolute value between the values of pixels adjacent to each other in the vertical direction as an adjacent pixel similarity for each pixel, and obtains the pixel group set representative similarity SGv by calculating a total sum of the adjacent pixel similarities. The calculation equation of the pixel group set representative similarity SGv is represented by the following equation (1).

$$SGv = |P_{x-2,y-1} - P_{x-2,y}| + |P_{x-2,y} - P_{x-2,y+1}| + \\ |P_{x-1,y-2} - P_{x-1,y-1}| + |P_{x-1,y-1} - P_{x-1,y}| + \\ |P_{x-1,y} - P_{x-1,y+1}| + |P_{x-1,y+1} - P_{x-1,y+2}| + |P_{x,y-2} - P_{x,y-1}| + \\ |P_{x,y-1} - P_{x,y}| + |P_{x,y} - P_{x,y+1}| + |P_{x,y+1} - P_{x,y+2}| + \\ |P_{x+1,y-2} - P_{x+1,y-1}| + |P_{x+1,y-1} - P_{x+1,y}| + |P_{x+1,y} - P_{x+1,y+1}| + \\ |P_{x+1,y+1} - P_{x+1,y+2}| + |P_{x+2,y-1} - P_{x+2,y}| + |P_{x+2,y} - P_{x+2,y+1}| \quad (1)$$

Figure 7:
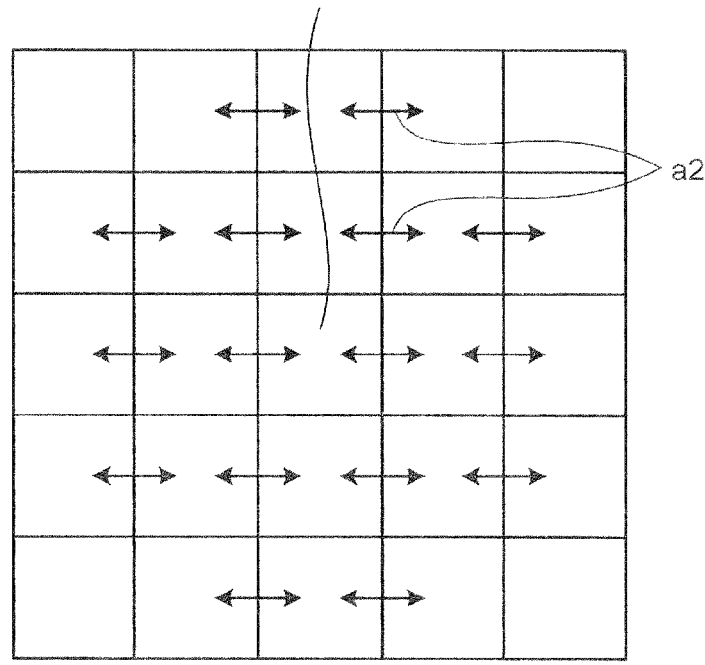
FIG. 7 is an explanatory diagram illustrating a calculation principle of pixel group set representative similarity according to the first embodiment.

The horizontal correlation pixel group set representative similarity calculator 312 calculates a pixel group set representative similarity SGh when dividing the processing target pixel area into the horizontal correlation pixel group set. FIG. 7 is an explanatory diagram illustrating a calculation principle of the pixel group set representative similarity SGh according to the first embodiment. As shown by arrows a2 in FIG. 7, the horizontal correlation pixel group set representative similarity calculator 312 calculates, for example, a difference absolute value between the values of pixels adjacent to each otter in the horizontal direction as an adjacent pixel similarity for each pixel, and obtains the pixel group set representative similarity SGh by calculating a total sum of the adjacent pixel similarities. The calculation equation of the pixel group set representative similarity SGh is represented by the following equation (2).

$$SGh = |P_{x-1,y-2} - P_{x,y-2}| + |P_{x,y-2} - P_{x+1,y-2}| + \\ |P_{x-2,y-1} - P_{x-1,y-1}| + |P_{x-1,y-1} - P_{x,y-1}| + \\ |P_{x,y-1} - P_{x+1,y-1}| + |P_{x+1,y-1} - P_{x+2,y-1}| + |P_{x-2,y} - P_{x-1,y}| + \\ |P_{x-1,y} - P_{x,y}| + |P_{x,y} - P_{x+1,y}| + |P_{x+1,y} - P_{x-2,y}| + \\ |P_{x-2,y+1} - P_{x-1,y+1}| + |P_{x-1,y+1} - P_{x,y+1}| + |P_{x,y+1} - P_{x+1,y+1}| + \\ |P_{x+1,y+1} - P_{x+2,y+1}| + |P_{x-1,y+2} - P_{x,y+2}| + |P_{x,y+2} - P_{x+1,y+2}| \quad (2)$$

Figure 8:
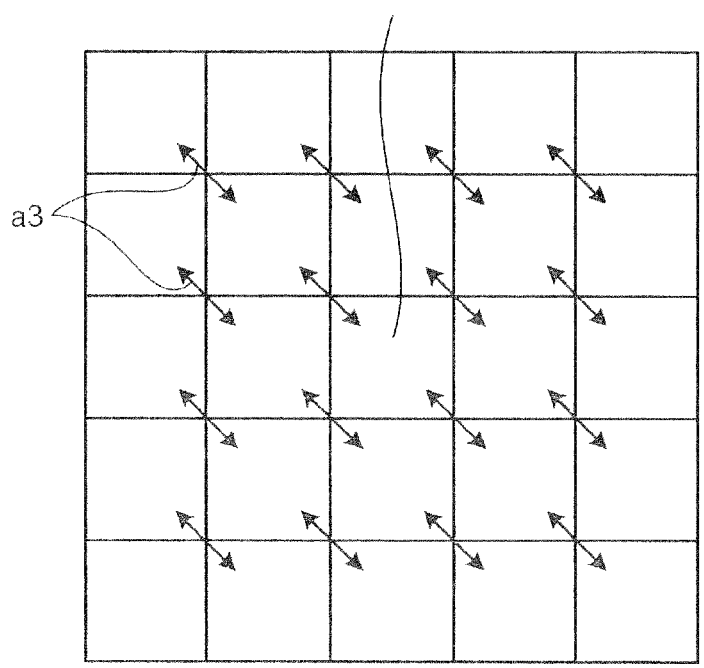
FIG. 8 is an explanatory diagram illustrating a calculation principle of pixel group set representative similarity according to the first embodiment.

The left-up correlation pixel group set representative similarity calculator 313 calculates a pixel group representative similarity SGb when dividing the processing target pixel area into the left-up correlation pixel group set. FIG. 8 is an explanatory diagram illustrating a calculation principle of the pixel group set representative similarity SGb according to the first embodiment. As shown by arrows a3 in FIG. 8, the left-up correlation pixel group set representative similarity calculator 313 calculates, for example, a difference absolute value between the values of pixels adjacent to each other in the left-up diagonal direction as an adjacent pixel similarity for each pixel, and obtains the pixel group set representative similarity SGb by calculating a total sum of the adjacent pixel similarities. The calculation equation of the pixel group set representative similarity SGb is represented by the following equation (3).

$$SGb = |P_{x+1,y-2} - P_{x+2,y-1}| + |P_{x,y-2} - P_{x+1,y-1}| + \quad (3)$$
$$|P_{x+1,y-1} - P_{x+2,y}| + |P_{x-1,y-2} - P_{x,y-1}| + |P_{x,y-1} - P_{x+1,y}| +$$
$$|P_{x+1,y} - P_{x+2,y+1}| + |P_{x-2,y-2} - P_{x-1,y-1}| +$$
$$|P_{x-1,y-1} - P_{x,y}| + |P_{x,y} - P_{x+1,y+1}| + |P_{x+1,y+1} - P_{x+2,y+2}| +$$
$$|P_{x-2,y-1} - P_{x-1,y}| + |P_{x-1,y} - P_{x,y+1}| + |P_{x,y+1} - P_{x+1,y+2}| +$$
$$|P_{x-2,y} - P_{x-1,y+1}| + |P_{x-1,y+1} - P_{x,y+2}| + |P_{x-2,y+1} - P_{x-1,y+2}|$$

Figure 9:
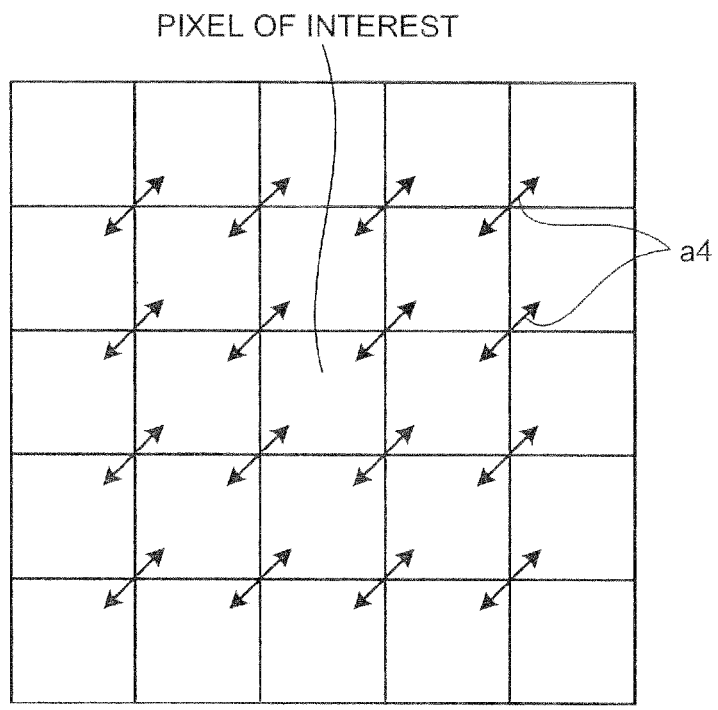
FIG. 9 is an explanatory diagram illustrating calculation principle of pixel group set representative similarity according to the first embodiment.

The right-up correlation pixel group set representative similarity calculator 314u calculates, a pixel group set representative similarity SGs when dividing the processing tar pet pixel area into the right-up correlation pixel group set. FIG. 9 is an explanatory diagram illustrating a calculation principle of the pixel group set representative similarity SGs according to the first embodiment. As shown by arrows a4 in FIG. 9, the right-up correlation pixel group set representative similarity calculator 314 calculates, for example, a difference absolute value between the values of pixels adjacent to each other in the right up diagonal direction as an adjacent pixel similarity for each pixel, and obtains the pixel group set representative similarity SGs by calculating a total sum of the adjacent pixel similarities. The calculation equation of the pixel group set representative similarity SGs is represented by the following equation (4).

$$SGs = |P_{x-2,y-1} - P_{x-1,y-2}| + |P_{x-2,y} - P_{x-1,y-1}| + \quad (4)$$
$$|P_{x-1,y-1} - P_{x,y-2}| + |P_{x-2,y+1} - P_{x-1,y}| + |P_{x-1,y} - P_{x,y-1}| +$$
$$|P_{x,y-1} - P_{x+1,y-2}| + |P_{x-2,y+2} - P_{x-1,y+1}| +$$
$$|P_{x-1,y+1} - P_{x,y}| + |P_{x,y} - P_{x+1,y-1}| + |P_{x+1,y-1} - P_{x+2,y-2}| +$$
$$|P_{x-1,y+2} - P_{x,y+1}| + |P_{x,y+1} - P_{x+1,y}| + |P_{x+1,y} - P_{x+2,y-1}| +$$
$$|P_{x,y+2} - P_{x+1,y+1}| + |P_{x+1,y+1} - P_{x+2,y}| + |P_{x+1,y+2} - P_{x+2,y+1}|$$

Figure 10:
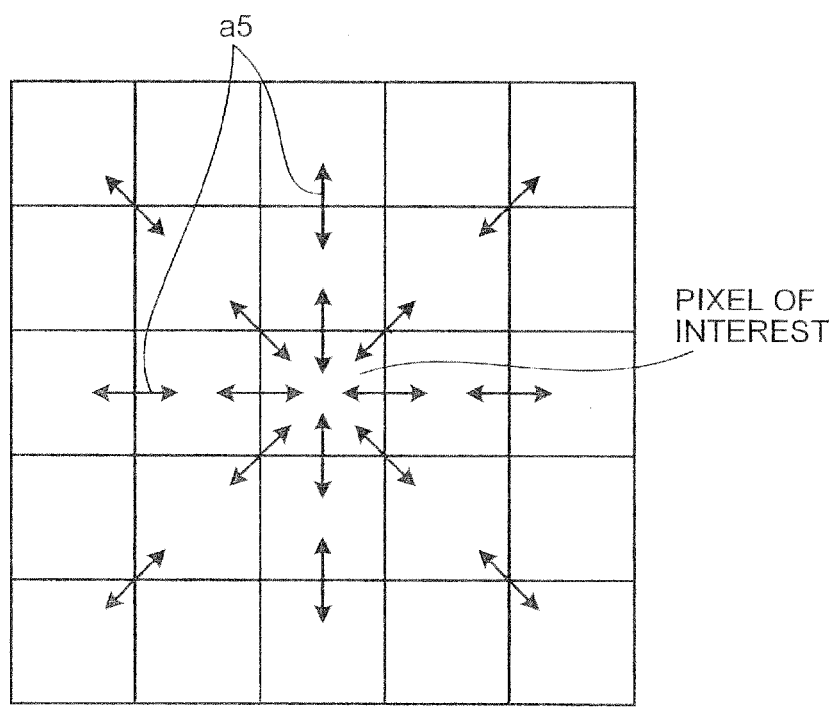
FIG. 10 is an explanatory diagram illustrating a calculation principle of pixel group set representative similarity according to the first embodiment.

The isotropic correlation pixel group representative similarity calculator 31, calculates a pixel group set representative similarity SGe when dividing the processing target pixel area into the isotropic correlation pixel group set. FIG. 10 is an explanatory diagram illustrating a calculation principle of the pixel group set representative similarity SGe according to the first embodiment. As shown by arrows a5 in FIG. 10, the isotropic correlation pixel group set representative similarity calculator 315 calculates, for example, difference absolute value between the values of pixels adjacent to each other in a radial fashion around the pixel of interest as en adjacent pixel similarity for each pixel, and obtains the pixel group set representative similarity SGe by calculating a total sum of the adjacent pixel similarities. The calculation equation of the pixel group set representative similarity SGe is represented by the following equation (5).

$$SGe = |P_{x-2,y+2} - P_{x-1,y+1}| + |P_{x-1,y+1} - P_{x,y}| + |P_{x,y} - P_{x+1,y-1}| + \quad (5)$$
$$|P_{x+1,y-1} - P_{x+2,y-2}| + |P_{x-2,y-2} - P_{x-1,y-1}| + |P_{x-1,y-1} - P_{x,y}| +$$
$$|P_{x,y} - P_{x+1,y+1}| + |P_{x+1,y+1} - P_{x+2,y+2}| + |P_{x,y-2} - P_{x,y-1}| +$$
$$|P_{x,y-1} - P_{x,y}| + |P_{x,y} - P_{x,y+1}| + |P_{x,y+1} - P_{x,y+2}| +$$
$$|P_{x-2,y} - P_{x-1,y}| + |P_{x-1,y} - P_{x,y}| + |P_{x,y} - P_{x+1,y}| + |P_{x+1,y} - P_{x+2,y}|$$

The five pixel group set representative similarities SGv, SGn, SGb, SGs, and SGe calculated for each candidate as described above are outputted to the representative pixel group set selector 32.

The representative pixel group set selector 32 determines a division pattern best matched to a pixel value distribution in the processing target pixel area on the bans of the five pixel group sot representative similarities SGv, SGh, SGb, SGs, are SGe inputted from too pixel group set representative similarity calculator 31, and selects a representative pixel group set of the best matched division pattern. Specifically, the representative pixel group set selector 32 selects a pixel group set having a highest pixel group set representative similarity (here, a pixel group set from which a smallest value of pixel group set representative similarity is calculated) as the representative pixel group set. For example, when the pixel group set representative similarity having the smallest value is SGv, pixels in the processing target pixel area have high similarity between pixels adjacent to each other in the vertical direction. Therefore, the representative pixel group set selector 32 determines that the division pattern of the vertical correlation pixel group set (refer to FIG. 4A) is best matched to the pixel value distribution in the processing target pixel area and selects the vertical correlation pixel group set as the representative pixel group set. Thus, in this case, the pixel groups $g_{10}$ to $g_{14}$ shown in FIG. 1A are generated in the processing target pixel area. A priority order may be defined in the pixel group set representative similarities in advance. For example, the priority order may be appropriately defined sod that the isotropic correlation pixel group set is defined as the pixel group set having the highest priority. When there are a plurality of pixel group set representative similarities having a smallest value, pixel group set may be selected in accordance with the priority order.

By the processing here, the pixel group is generated so that pixels constituting a pixel group have high similarity of pixel value between the pixels. In other words, a pixel group set having a division pattern in which the similarity of pixel value between pixels constituting a pixel group is high is selected as the representative pixel group set. As a result, pixels in the processing target pixel area can be grouped into pixel groups in which pixels have similar pixel values.

The representative pixel group set selected as described above is outputted to a pixel group representative value calculator 41 in the pixel group similarity calculator 40. Actually, a unique index value is assigned to each pixel group set shown in FIGS. 4A, 4B, 4C, 4D, and 4E in advance. For example, the index value of the vertical correlation pixel group set in FIG. 4A is defined as "0". Also, the index value of the horizontal correlation pixel group set in FIG. 4B is defined as "1". The index value of the left-up correlation pixel group set in FIG. 4C is defined as "2". The index value of the right-up correlation pixel group set in FIG. 4D is defined as "3". And the index value of the isotropic correlation pixel group set in FIG. 4E is defined as "4". The representative pixel group set selector 32 outputs the index value of the pixel group set selected as the representative pixel group set to the pixel group representative value calculator 41.

As shown in FIG. 2, the pixel group similarity calculator 40 includes the pixel group representative value calculator 41 and a pixel group representative value similarity calculator 43, and calculates similarities between the pixel groups generated in the processing target pixel area by the processing of or calculators.

The pixel group representative value calculator 41 calculates representative values (pixel group representative values) of the pixel groups generated in the processing target pixel area on the basis of pixel values of the pixels in the processing target pixel area inputted from the pixel extracting unit 21. Specifically, first, the pixel group representative value calculator 41 identifies the representative pixel group set on the basis of the index value inputted from the representative pixel group set selector 32. Then, the pixel group representative value calculator 41 calculates pixel group representative values $A_0$, $A_1$, $A_2$, $A_3$, and $A_4$ of the pixel groups in accordance with the identified representative pixel group set.

For example, when the index value "0" of the vertical correlation pixel group set is inputted from the representative pixel group set selector 32, the pixel group representative value calculator 41 calculates the pixel group representative values $A_0, A_1, A_2, A_3$, and $A_4$ according to the equations (6) to (10) described below, here, the pixel group representative value of the pixel group $g_{12}$ (refer to FIG. 4A) including the pixel of interest corresponds to $A_0$.

$$A_0 = \Sigma_j P_{x,y+j}/5 \qquad (6)$$

$$A_1 = \Sigma_j P_{x-1,y+j}/5 \qquad (7)$$

$$A_2 = \Sigma_j P_{x+1,y+j}/5 \qquad (8)$$

$$A_3 = \Sigma_j P_{x-2,y+j}/5 \qquad (9)$$

$$A_4 = \Sigma_j P_{x+2,y+j}/5 \qquad (10)$$

where $j = -2, -1, 0, 1, 2$.

When the index value "1" of the horizontal correlation pixel group set is inputted from the representative pixel group or selector 32, the pixel group representative value calculator 41 calculates the pixel group representative values $A_0, A_1, A_2, A_3$, and $A_4$ according to the equations (11) to (15) described below. Here, the pixel group representative value of the pixel group $g_{22}$ (refer to FIG. 4B) including the pixel of interest corresponds to $A_0$.

$$A_0 = \Sigma_i P_{x+i,y}/5 \qquad (11)$$

$$A_1 = \Sigma_i P_{x+i,y-1}/5 \qquad (12)$$

$$A_2 = \Sigma_i P_{x+i,y+1}/5 \qquad (13)$$

$$A_3 = \Sigma_i P_{x+i,y-2}/5 \qquad (14)$$

$$A_4 = \Sigma_i P_{x+i,y+2}/5 \qquad (15)$$

When the index value "2" of the left-up correlation pixel group set is inputted from the representative pixel group set selector 32, the pixel group representative value calculator 41 calculates the pixel group representative values $A_0$, $A_1$, $A_2$, $A_3$, and $A_4$ according to the equations (16) to (20) described below. Here, the pixel group representative value of the pixel group $g_{32}$ (refer to FIG. 4C) including the pixel of interest corresponds to $A_0$.

$$A_0 = \Sigma_i P_{x+i,y+i}/5 \qquad (16)$$

$$A_1 = \{P_{x-1,y-2} + P_{x,y-1} + P_{x+1,y} + P_{x+2,y+1}\}/4 \qquad (17)$$

$$A_2 = \{P_{x-2,y-1} + P_{x-1,y} + P_{x,y+1} + P_{x+1,y+2}\}/4 \qquad (18)$$

$$A_3 = \{P_{x,y-2} + P_{x+1,y-1} + P_{x+2,y} + P_{x+1,y-2} P_{x+2,y-1} + P_{x+2,y-2}\}/6 \qquad (19)$$

$$A_4 = \{P_{x-2,y} + P_{x-1,y+1} + P_{x,y+2} + P_{x-2,y+1} P_{x-1,y+2} + P_{x,y+2}\}/6 \qquad (20)$$

where $j = -2, -1, 0, 1, 2$.

When the index value "3" of the right-up correlation pixel group set is inputted from the representative pixel group set selector 32, the pixel group representative value calculator 41 calculates the pixel group representative values $A_0$, $A_1$, $A_2$, $A_3$, and $A_4$ according to the equations (21) to (23) described below. Here, the pixel group representative value of the pixel group $g_{42}$ (refer to FIG. 4D) including the pixel of interest corresponds to $A_0$.

$$A_0 = \Sigma_i P_{x+i,y-i}/5 \qquad (21)$$

$$A_1 = \{P_{x-2,y+1} + P_{x-1,y} + P_{x+1,y-1} + P_{x+2,y-2}\}/4 \qquad (22)$$

$$A_2 = \{P_{x-1,y+2} + P_{x,y+1} + P_{x-1,y} + P_{x-2,y-1}\}/4 \qquad (23)$$

$$A_3 = \{P_{x-2,y} + P_{x-1,y-1} + P_{x,y-2} + P_{x-2,y-1} + P_{x-1,y-2} + P_{x-2,y-2}\}/6 \qquad (24)$$

$$A_4 = \{P_{x,y+2} + P_{x+1,y+1} + P_{x+2,y} + P_{x+1,y+2} + P_{x+2,y+1} + P_{x-2,y+2}\}/6 \qquad (25)$$

where $j = -2, -1, 0, 1, 2$.

When the index value "4" of the isotropic correlation pixel group set is inputted from the representative pixel group set selector 32, the pixel group representative value calculator 41 calculates the pixel group representative values $A_0$, $A_1$, $A_2$, $A_3$, and $A_4$ according to the equations (26) to (30) described below. Here, the pixel group representative value of the pixel group $g_{52}$ (refer to FIG. 4E) including the pixel of interest corresponds to $A_0$.

$$A_0 = \{P_{x,y} + P_{x-1,y} + P_{x+1,y} + P_{x,y-1} + P_{x,y+1}\}/5 \qquad (26)$$

$$A_1 = \{P_{x-1,y-1} + P_{x+1,y-1} + P_{x-1,y+1} + P_{x-1,y+1}\}/4 \qquad (27)$$

$$A_2 = \{P_{x-2,y} + P_{x+2,y} + P_{x,y-2} + P_{x,y+2}\}/4 \qquad (28)$$

$$A_3 = \{P_{x-1,y-2} + P_{x-2,y-1} + P_{x+1,y-2} + P_{x+2,y-1} + P_{x+2,y+1} + P_{x+1,y+2} + P_{x-1,y+2} + P_{x-2,y+1}\}/8 \qquad (29)$$

$$A_4 = \{P_{x-2,y-2} + P_{x+2,y-2} + P_{x+2,y+2} + P_{x-2,y+2}\}/4 \qquad (30)$$

where $j = -2, -1, 0, 1, 2$.

The pixel group representative values $A_0$, $A_1$, $A_2$, $A_3$, and $A_4$ calculated as described above are outputted to the pixel group representative value similarity calculator 43.

First, the pixel group representative value similarity calculator 43 calculates the pixel group representative value similarity on the basis of the pixel group representative values $A_0$, $A_1$, $A_2$, $A_3$, and $A_4$ of the pixel groups inputted from the pixel group representative value calculator 41. Specifically, in accordance with the equation (31) described below, the pixel group representative value similarity calculator 43 calculates difference absolute values between the pixel group representative value of each pixel group and the pixel group representative value ($A_0$) of the pixel group including the pixel of interest, and obtains pixel group representative value similarities $SG_n$.

$$SG_n = |A_n - A_0| \quad (31)$$

where n=0, 1, 2, 3, 4.

Next, the pixel group representative value similarity calculator 43 defines a pixel group similarity $SG_{x+i,y+j}$ for each pixel in the rocessin$_d$ target pixel area in accordance with the equation 32) described below on the basis of the calculated pixel group representative value similarities $SG_n$. As a result, a value of the pixel group representative same similarity $SG_n$ that is calculated for the pixel group n is uniformly defined for pixels belonging to the same pixel group n. The pixel group similarity $SG_{x+i,y+j}$ defined for each pixel is outputted to the filter coefficient calculator 25.

$$SG_{x+i,y+j} = SG_n; \ i,j \in \text{pixel group } n \quad (32)$$

where i=−2, −1, 0, 1, 2 and j=−2, −1, 0, 1, 2.

The pixel value similarity calculator 24 calculates a pixel value similarity $SP_{x+i,y+j}$ of each pixel on the basis of the pixel value $P_{x+i,y+j}$ of each pixel constituting the processing target pixel area inputted from the pixel extracting unit 21. For example, the pixel value similarity calculator 24 calculates the pixel value similarity $SP_{x+i,y+j}$ of each pixel as an absolute value of a pixel value difference between each pixel and the pixel of interest $P_{x,y}$. The pixel value similarity $SP_{x+i,y+j}$ is represented by the equation (33) described below. The calculated pixel value similarity $SP_{x+i,y+j}$ of each pixel is outputted to the filter coefficient calculator 25.

$$SP_{x+i,y+j} = |P_{x+i,y+j} - P_{x,y}| \quad (33)$$

where i=−2, −1, 0, 1, 2 and j=−2, −1, 0, 1, 2.

The filter coefficient calculator 25 calculates a filter coefficient to be applied to each pixel in the processing target pixel area on the basis of the pixel group similarity $SG_{x+i,y+j}$ inputted from the pixel group representative value similarity calculator 43 and the pixel value similarity $SP_{x+i,y+j}$ inputted from the Pixel value similarity calculator 24. Specifically, the filter coefficient calculator 25 calculates the filter coefficient in accordance with a Gauss function, a rational function, and the like by using a $\sigma_g$ value and a $\sigma_p$ value related to a noise reduction amount transmitted from the control unit 16 as process parameters. Here, a publicly known bilateral filter, which is known as a typical smoothing filter, is used in the smoothing process described below, and the filter coefficient is calculated and weighted by using the Gauss function.

In this case, the pixel group similarity $SG_{x+i,y+j}$ and the pixel value similarity $SP_{x+i,y+j}$ are defined as Gaussian weights, and a filter coefficient $C_{x+i,y+j}$ is calculated in accordance with the equation (34) described below. Trio calculated filter coefficient $C_{x+i,y+j}$ is outputted to the smoothing processing unit 26. Here, $Wg_{x+i,y+j}$ a first function value which is calculated to be smaller as the pixel group similarity decreases, and $Wp_{x+i,y+j}$ is a second function value which is calculated to be smaller as the pixel value similarity decreases.

$$C_{x+i,y+j} = Wg_{x+i,y+j} Wp_{x+i,y+j} / N \quad (34)$$

where $Wg_{x+i,y+j}$, $Wp_{x+i,y+j}$, and N are represented by the equations (35) to (37) described below, and $\Sigma_{i,j}$ means a total sum of values where i and j can vary (i=−2, −1, 0, 1, 2 and j=−2, −1, 0, 1, 2).

$$Wg_{x-i,y+j} = \exp(-SG_{x+i,y+j}^2/(2\sigma_g)^2) \quad (35)$$

$$Wp_{x+i,y+j} = \exp(-SP_{x+i,y+j}^2/(2\sigma_p)^2) \quad (36)$$

$$N = \Sigma_{i,j} \exp(-SG_{x+i,y+j}^2/(2\sigma_g)^2) \exp(-SP_{x+i,y+j}^2/(2\sigma_p)^2) \quad (37)$$

Here, one $\sigma_g$ value and the $\sigma_p$ value may be set by the control unit 16 according to a user operation and transmitted to the filter coefficient calculator 25, or may automatically determined by the control unit 16 on the basis of an ISO sensitivity and an amount of signal gain and transmitted to the filter coefficient calculator 25. In the first embodiment, a user operation of selecting strong/weak of noise reduction amount is received. The control unit 16 sets the $\sigma_g$ value and the $\sigma_p$ value in accordance with the selected strong/weak of noise reduction amount, and transmits the $\sigma_g$ value and the $\sigma_p$ value to the filter coefficient calculator 25.

Figure 11:
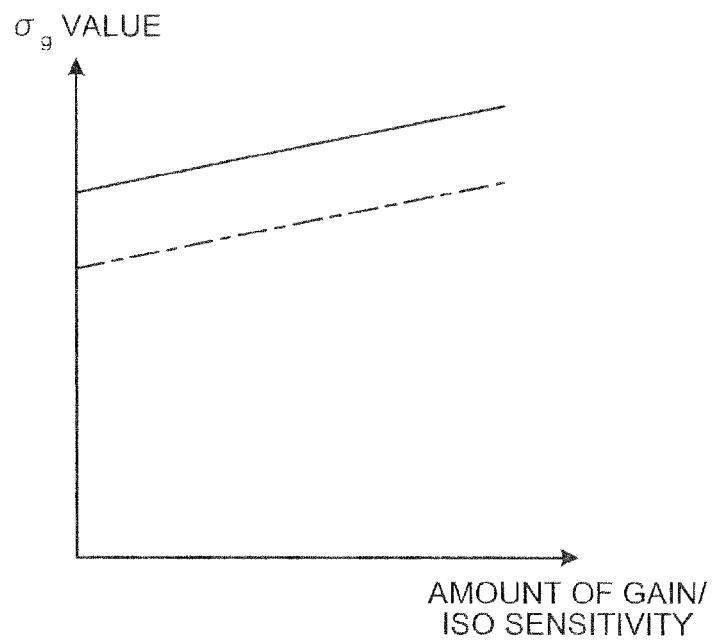
FIG. 11 is a diagram graphing a correspondence relationship between an amount of gain or an ISO sensitivity and a $\sigma_g$ value.

FIG. 11 is a diagram graphing the $\sigma_g$ value determined in accordance with the amount of gain or the ISO sensitivity. In FIG. 11, a correspondence relationship between the amount of gain or tee ISO sensitivity and the $\sigma_g$ value when the noise reduction amount is set to "strong" by the user is shown by a solid line, and a correspondence relationship between the amount of gain or the ISO sensitivity and the $\sigma_g$ value when the noise reduction amount is set to "weak" by the user is shown by an alternate long and short dashed line.

Figure 12:
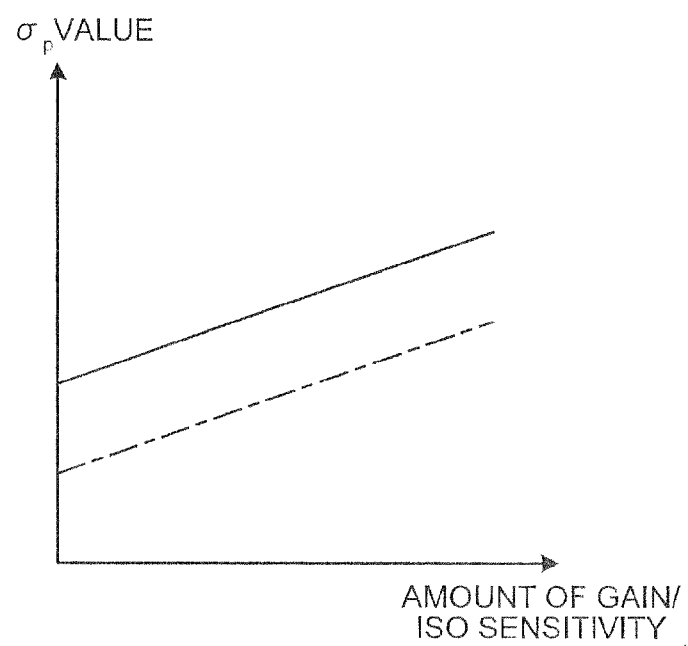
FIG. 12 is a diagram graphing a correspondence relationship between an amount of gain or an ISO sensitivity and a $\sigma_p$ value.

FIG. 12 is a diagram graphing the $\sigma_p$ value determined in accordance with the amount of gain or the ISO sensitivity. In FIG. 12, a correspondence relationship between the amount of gain or the ISO sensitivity and the $\sigma_p$ value when the noise redaction amount is set "strong", by the user is shown by a solid line, and a correspondence relationship between the amount of gain or the ISO sensitivity and the $\sigma_p$ value when the noise reduction amount is set to "weak" by the user is shown by an alternate long and short dashed line.

As shown in FIGS. 11 and 12, the $\sigma_g$ value and the $\sigma_p$ value are set to increase as the amount of gain or the ISO sensitivity increases. Although when the amount of gain or the ISO sensitivity increases, the amount of noise increases, if the $\sigma$ value is fixed to a small value, the filter coefficient may become smaller than necessary by variation of pixel value due to noise. In soft a case, to prevent a case in which the number of pixels contributing to smoothing cannot be obtained, the settings as shown in FIGS. 11 and 12 are performed. It is expensive at calculate $Wg_{x+i,y+j}$ and $Wp_{x+i,y+j}$, which are values of the Gauss function, by a circuit. Therefore, a LUT (not shown) in which Gauss function values are set for a plurality of $\sigma_p$ values and $\sigma_g$ values may be prepared in advance. By referring to the LUT in accordance with a $\sigma_g$ value transmitted from the control unit 16, and reading a Gauss function value corresponding to the pixel group similarity $SG_{x+i,y+j}$, the $Wg_{x+i,y+j}$ may be obtained, and by referring to the LUT in accordance with a transmitted $\sigma_p$ value, and reading a Gauss function value corresponding to the pixel value similarity $SP_{x+i,y+j}$, the $Wp_{x+i,y+j}$ may be obtained, and then the filter coefficient $C_{x+i,y+j}$ may be calculated.

The smoothing processing unit 26 performs smoothing process on the pixel of interest on the oasis of the pixel values of the pixels in the processing target pixel area inputted from the pixel extracting unit 21 and the filter coefficient $C_{x+i,y+j}$ inputted from the filter coefficient calculator 25. Specifically, a smoothed pixel value $Pf_{x,y}$ is obtained by performing the smoothing process on a pixel value $P_{x,y}$ of the pixel of interest in accordance with the equation (38) described below. The obtained smoothed pixel value $Pf_{x,y}$ is outputted to the WB processing unit 153.

$$Pf_{x,y} = \Sigma_{i,j} C_{x+i,y+j} P_{x+i,y+j} \quad (38)$$

where i=−2, −1, 0, 1, 2 and j=−2, −1, 0, 1, 2.

In a conventional bilateral filter, two pixel value correlations, which are an absolute value of pixel value difference and relative spatial distance, are used as parameters, and the filter coefficient is obtained by calculating a product of Gauss function values weighted by the parameters.

Here, to weight the Gauss function value by using a spatial distance and calculate the filter coefficient is to apply an assumption that a pixel value correlation between the pixel of interest and a pixel around the pixel of interest decreases isotropically, as the spatial distance increases. However, when the above assumption is applied to a processing target pixel area having a microstructure in which pixel values vary anisotropically, and isotropic smoothing process using spatial distance is performed on the processing target pixel area, a filter works in a direction where the anisotropic microstructure of the processing target pixel area is destroyed, and hence the microstructure cannot be preserved.

In a conventional bilateral filter, a Gauss function value weighted by an absolute value of pixel value difference lightens a weighting operation that uses spatial distance, and hence it is possible to preserve large and sharp edge portions without blunting roe edge portions. Also, to preserve a microstructure having small pixel value differences, a parameter is adjusted (specifically, the $\sigma_p$ value is decreased) so that the pixel value similarity $SP_{x+i,y+j}$ is sharpened. However, actually, there is a problem that the noise reduction effect significantly decreases and noise remains along with the microstructure. In other words, an edge that is sufficiently larger than the amount of noise to be smoothed (average amplitude of noise) determined by a noise reduction level can be preserved, however, when pixel value differences are small as shown in a microstructure and the differences between the pixel value differences and the amount of noise decrease, an edge (that is, microstructure) cannot be preserved.

On the other hand, in the first embodiment, the filter coefficient is calculated by using two parameters which are the pixel group similarity $SP_{x+i,y+j}$ significantly contributing to preserve an edge having large pixel value differences and the pixel value similarity $SG_{x+i,y+j}$ significantly contributing to preserve a microstructure having small pixel value differences, and it is possible to perform the smoothing process on the pixel of interest by using the filter coefficient.

In other words, in the first embodiment, the pixel value similarity $SP_{x+i,y+j}$ is used as one parameter of the two parameters used in the bilateral filter. This corresponds to the absolute value of the pixel value difference between the pixel of interest and a pixel around the pixel of interest used in the conventional bilateral filter. Based on this, a sharp and large edge can be preserved.

Specifically, the difference absolute value between each pixel in the processing target pixel area and the pixel of interest is calculated as the pixel value similarity $SP_{x+i,y+j}$. As a result, a sharp edge in the processing target pixel area can be preserved at low cost and high speed with high accuracy.

On the other hand, as the other parameter, the relative spatial distance between the pixel of interest and a pixel around the pixel of interest is conventionally used, however, in the first embodiment, the pixel group similarity $SG_{x+i,y+j}$ is used instead of the spatial distance. That is, in the conventional bilateral, filter, an isotropic weighting based on a relative spatial distance is performed and the Gauss function value is calculated. On the other hand, in the first embodiment, the pixel group similarity $SG_{x+i,y+j}$ obtained by grouping the processing target pixel area on the basis of the pixel value distribution in the recessing target pixel area is used, and an isotropic weighting is performed to calculate the Gauss function value.

In more detail, a pixel group set which matches a structure having a directional property included in the processing target pixel area or a structure having regularity included in the processing target pixel area is selected from candidates of the pixel group set prepared in advance. By using the pixel group set, the processing target pixel area is divided into small areas, each of which has similar pixel values respectively, to generate pixel groups. Therefore, pixels in the processing target pixel area can be grouped in accordance with microstructures having a low frequency component in a specific direction in the processing target pixel area.

The pixel group similarity $SG_{x+i,y+j}$ is calculated for each pixel group on the basis of pixel values belonging to the pixel groups. Therefore, the pixel group similarity $SG_{x+i,y+j}$ can be obtained as a value in which the directional property and the regularity of the microstructure in the processing target pixel area are reflected. The same parameter (specifically, the pixel group similarity $SG_{x+i,y+j}$) is elan to pixels belonging to the same pixel group, and the Gauss function value is calculated and weighted. Therefore, a microstructure having a low frequency component in a specific direction matched to a division pattern can be preserved by the pixel group similarity $SG_{x+i,y+j}$, and a sharp edge having a high frequency component can be preserved by the pixel value similarity $SP_{x+i,y+j}$. For example, when both the pixel group similarity $SG_{x+i,y+j}$ and the pixel value similarity $SP_{x+i,y+j}$ are high, a large weight can be set intensively. Based on this, different from the conventional uniform and non-directional weighting which uses a spatial distance, a weighting matched to an image structure in the processing target pixel area (a weighting depending on the directional property and the regularity at the image in the processing target pixel area) can be realized. In this way, a microstructure (a minute edge) can be preserved.

Actually, a Gauss function value, which is a first function value, as calculated by using the pixel group similarity $SG_{x+i,y+j}$ as a weight. Then, a Gauss function value, which is a second function value, is calculated by using the pixel value similarity $SP_{x+i,y+j}$ as a weight, and by multiplying the calculated Gauss function values to calculate the filter coefficient.

In the first embodiment, the pixel group set representative similarity when dividing the processing target pixel area into a pixel group set of each candidate is calculated. At this time, in the first embodiment, difference absolute values between pixels adjacent to each other belonging to a pixel group are calculated for each pixel group for each candidate, and the pixel group set representative similarity a calculated by using the total sum of the calculated difference absolute values between pixels adjacent to each other. Then, a pixel group set having the least pixel group set representative similarity among the pixel group set representative similarities calculated for each candidate is selected as the representative pixel group set. Therefore, the representative pixel group set matched to the pixel value distribution in the processing target pixel area can be selected at low cost and high speed.

The pixel group representative value for each pixel group generated in the processing target pixel area is calculated. Then, a difference absolute vale between the pixel group representative value of a pixel group and the pixel group representative value of the pixel group including the pixel of interest is calculated for each pixel group, and the obtained pixel group representative value similarity is defined as the pixel group similarity for the pixels belonging to each pixel group. Therefore, the values of the pixel group representative value and the pixel group similarity can be calculated at low cost and high speed.

As described above, according to the first embodiment, there is an advantage that the microstructure of the image can be preserved without being destroyed, and the noise can be educed with high accuracy, and hence the noise reduction effect can be increased. Therefore, images from a large and sharp to a microstructure can be preserved, a sufficient noise reduction effect can be stably realized, and the subjective image quality can be improved.

In the first embodiment described above, the smoothed pixel value on which the smoothing process has been performed by the smoothing processing unit 26 is outputted to the WB processing unit 153. On the other hand, for example, the technique disclosed in Japanese Laid-open Patent Publication No. 2008-124764 may be applied. Specifically, a new smoothed value may be calculated on the basis of the smoothed pixel value on which the smoothing process has been performed, and the calculated new smoothed pixel value may be outputted to the WB processing unit 153.

More specifically, a noise model table for estimating the amount of noise generated in accordance with a brightness level is stored in the storage unit 14 in advance. Then, by using a smoothed pixel value $Pf_{x,y}$ obtained as a result of the smoothing process as the brightness level, the noise model table is referred and an amount of noise Nq is estimated. Then, by using the smoothed pixel valise $Pf_{x,y}$ as a reference level, and using the estimated amount of noise Nq as a width of coring process, the coring process is performed or a pixel value $P_{x,y}$ the pixel of interest. A new smoothed pixel value $Pf'_{x,y}$ obtained as a result of the coring process may be outputted to the WB processing unit 153. Specifically, the coring process is realized in accordance with the following equations (39) to (41).

If $|Pf_{x,y}-P_{x,y}|<=Nq$, then $Pf'_{x,y}=Pf_{x,y}$ (39)

If $P_{x,y}-Pf_{x,y}>Nq$, then $Pf'_{x,y}=P_{x,y}-Nq$ (40)

If $Pf_{x,y}-P_{x,y}>Nq$, then $Pf'_{x,y}=P_{x,y}+Nq$ (41)

According to this modified example, the estimation accuracy of the amount of noise can be improved by using the smoothed pixel value $Pf_{x,y}$, thus the microstructure of the image can be preserved with high accuracy, and the noise reduction effect can be increased.

In the first embodiment described above, five types of division patterns shown in FIGS. 4A, 4B, 4C, 4D, and 4E are prepared in advance, and five types of pixel group sets divided according to each division pattern are used as candidates, however, the division patterns are not limited to the exemplified patterns. For example, a division pattern based on an assumable microstructure (pixel value distribution) in the processing target pixel area can be appropriately defined, such as, a division pattern assuming a microstructure of at pattern may be defined, or the like.

In the first embodiment described above, although a case in which a three-chip image sensor is used as the imaging unit 11 is exemplified, the configuration of the imaging unit may be a single-chip configuration using a monochrome image sensor. According to this configuration, for example, the imaging system 1 described above can be applied to an endoscope in which the illumination light is switched frame-sequentially in time series in RGB three-channel wavelength bands.

In the first embodiment, although the imaging system 1 including the imaging unit 11 is described, the present invention may be applied to an image processing device that does not include an imaging device, and image data captured by a different imaging device may be inputted from outside. For example, the present invention can be applied to an image processing device which performs image processing on image data inputted from outside via a portable storage medium or from an external device connected through communication line.

In the first embodiment, each unit constituting the image processing unit 15 is configured by hardware, it is not limited to this. For example, process performed by each unit may be performed by a CPU, and the process may be realized as software by causing a CPU to execute a program. Or, a part of the process performed by each unit may be configured by software.

In this case, a publicly known computer system such as a workstation or a personal computer can be used as an image processing device. A program (image processing program) for realizing the process performed by each unit of the image processing unit 15 is prepared in advance, and the process can be realized by causing a CPU of the computer system to execute the imago processing program.

Figure 13:
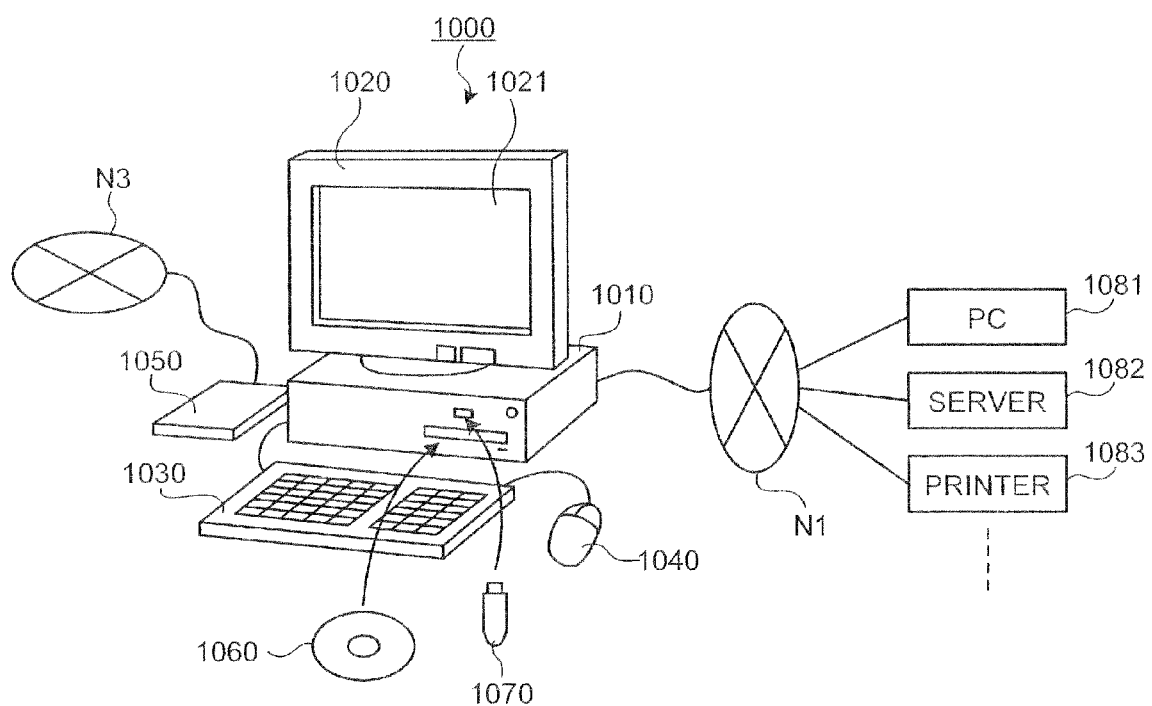
FIG. 13 is a system configuration diagram snowing configuration of a computer system according to a modified example.
Figure 14:
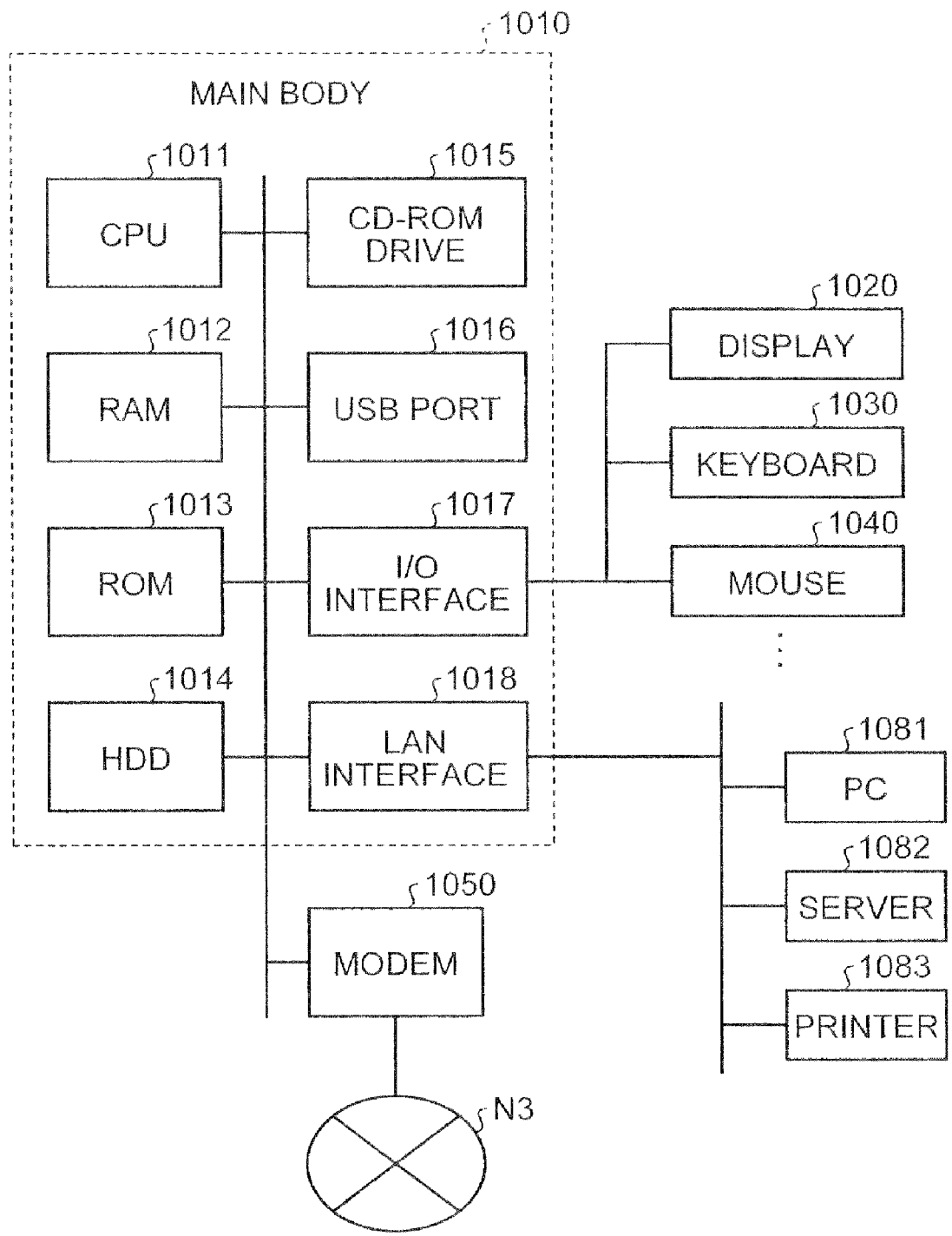
FIG. 14 is a block diagram showing a configuration of a main body of the computer system in FIG. 13.

FIG. 13 is a system configuration diagram showing configuration of a computer system 1000 according to this modified example, and FIG. 14 is a block diagram showing a configuration of a main 1010 of the computer system 1000. As shown in FIG. 13, the computer system 1000 includes the main body 1010, a display 1020 for displaying information such as an image on a display screen 1021 by an instruction from the main body 1010, a keyboard 1030 for inputting various information into the computer system 1000, and a mouse 1040 for pointing to an arbitrary position on the display screen 1021 of the display 1020.

As shown in FIG. 14, the main body 1010 of the computer system 1000 includes a CPU 1011, a RAM 1012, a ROM 1013, a hard disk drive (HDD) 1014, a CD-ROM drive 1015 for receiving a CD-ROM 1060, a USE port 1016 for attachably and detachably connecting a USB memory 1070, an I/O interface 1017 for connecting to the display 1020, the keyboard 1030, and the mouse 1040, and a LAN interface 1018 for connecting to a local area network or a wide area network (LAN/WAN) N1.

Further, a modem 1050 for connecting to a public line N3 such as the Internet is connected to the computer system 1000, and a personal computer (PC) 1081 is troth computer system, a server 1082, a printer 1083, and the like are connected to the computer system 1000 via the LAN interface 1018 and the Modal area network or the wide area network N1.

The computer system 1000 realizes an image processing device by reading and executing an image processing program (for example, an image processing program for realizing a processing procedure described below by referring to FIGS. 15 and 16) stored in a predetermined storage medium. Here, the predetermined storage medium includes not only the CD-ROM 1060 and the USE memory 1070, but also all storage media which stores the image processing program readable by the computer system 1000, such as a "portable physical medium" including a MO disk, a DVD disk, a flexible disk (FD), a magneto-optical disk, an IC card, and the like, "fixed physical medium" including the HDD 1014 provided inside or outside the computer system 1000, the RAM 1012, the ROM 1013, and the like, and a "communication medium" which temporarily holds the program for transmitting the program, such as the public line N3 connected is the modem 1050, the local area network or wide area network N1 to which another computer system (PC) 1081 or the server 1082 is connected, and the like.

In other words, the image processing program is computer-readably stored in a storage medium such as the "portable physical medium", the "fixed physical medium", and the "communication medium", and the computer system 1000 realizes the image processing device by reading the image processing program from such a storage medium and executing the image processing program. The image processing program is not limited to be executed by the computer system 1000, and the present invention can also be applied to a case in which another computer system (PC) 1081 or the server 1082 executes the image processing program or another computer system (PC) 1081 and the server 1082 cooperatively execute the image processing program.

Figure 15:
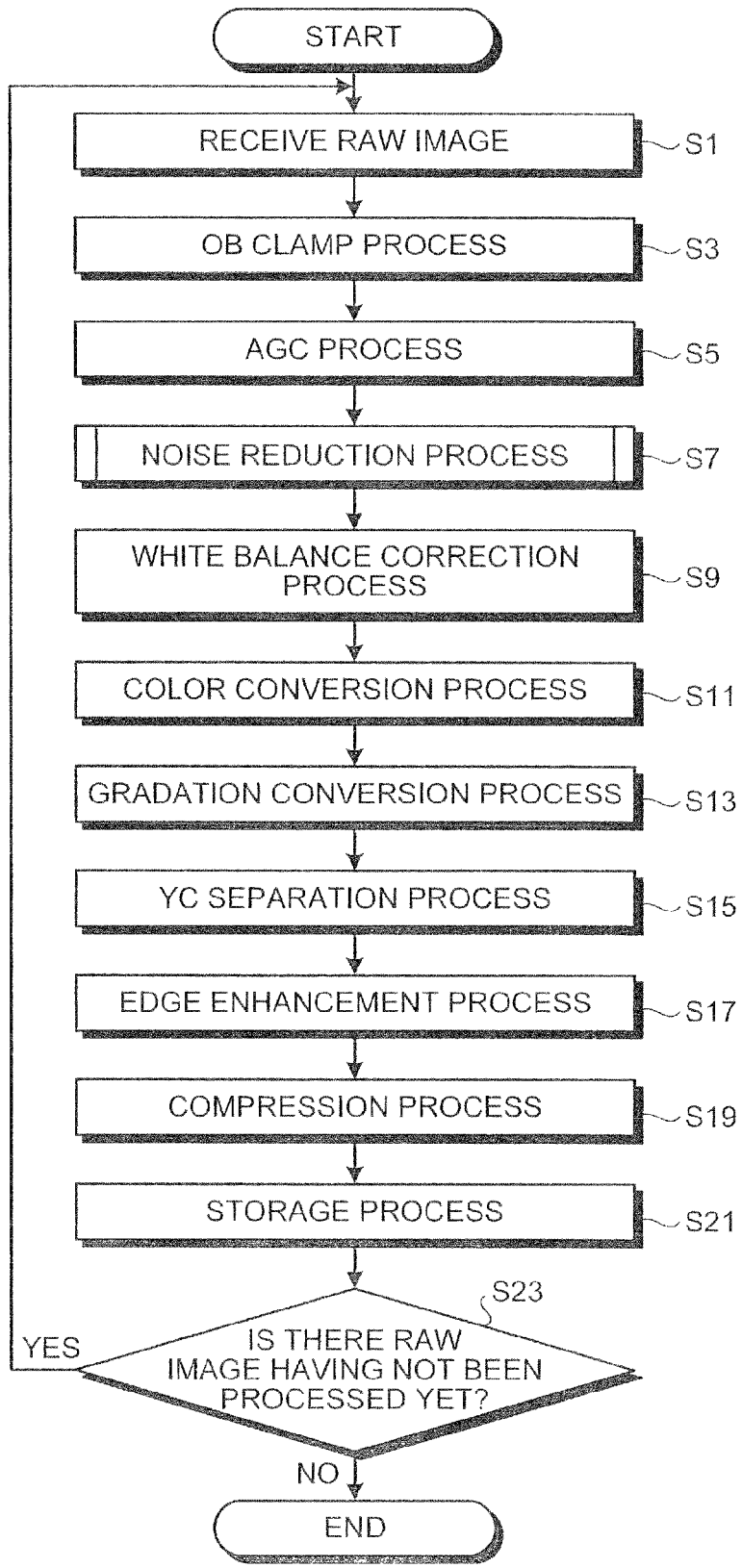
FIG. 15 is a general flowchart showing a processing procedure or a CPU according to a modified example.
Figure 16:
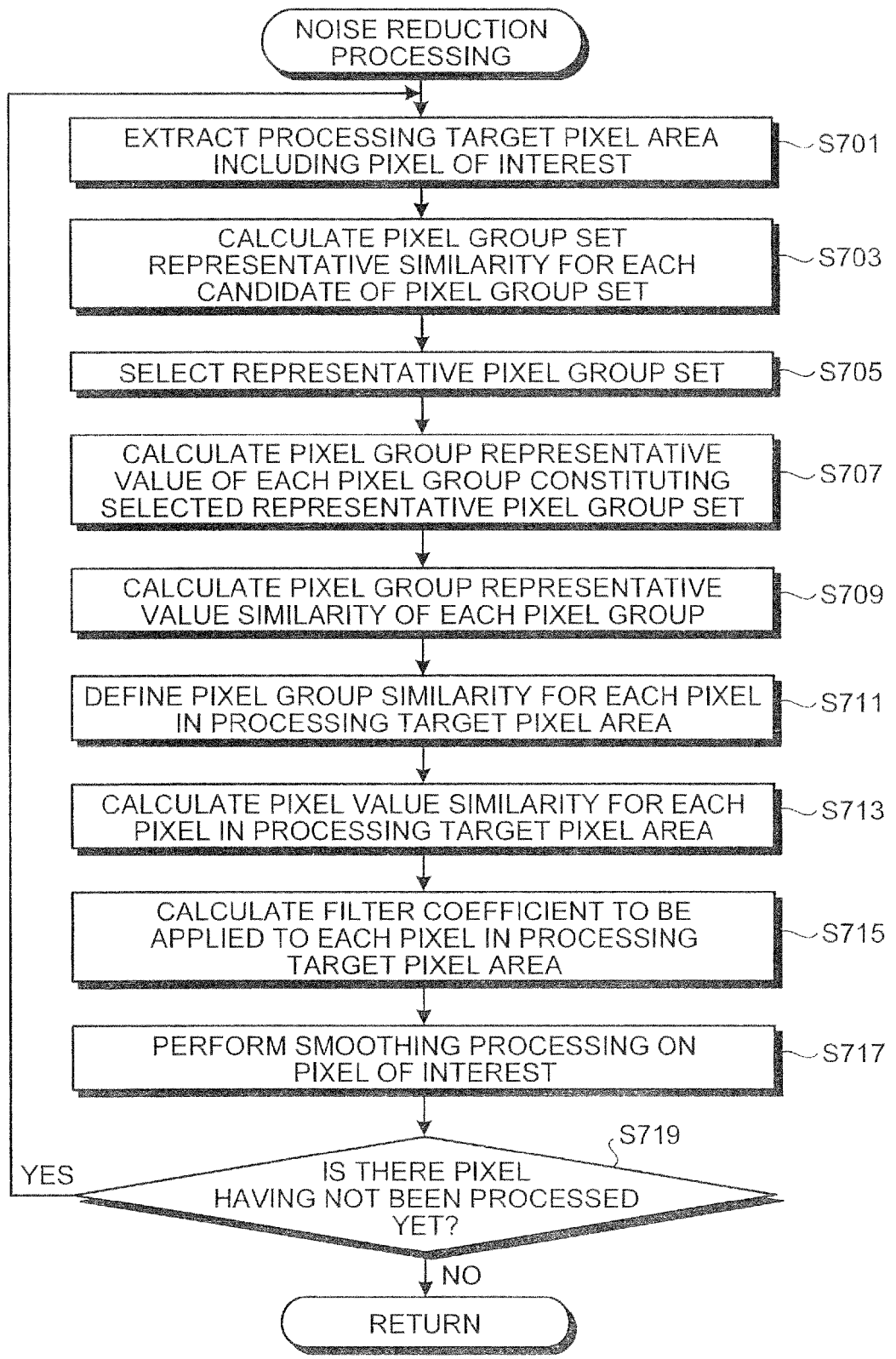
FIG. 16 is a flowchart showing a detailed processing procedure of noise reduction process.

FIG. 15 is a general flowchart showing a processing procedure performed by the CPU 1011 of the computer system 1000 according to the modified example. The processing described here is realized by the CPU 1011 executing the image processing program stored in the predetermined storage medium described above.

As shown in FIG. 15, first, RAW image data captured by an imaging device including a three-chip image sensor is obtained (inputted), for example, via a portable storage medium or from en external device connected through a communication line (step S1). At this time, the RAW image including a plurality of frames may be obtained, and the RAW image corresponding to processing target frames specified by a user by an operation of the input unit 12 may be defined as a processing target. In this case, the frames are sequentially obtained one by one.

Then, the processes of step S3 to step S21 are performed on the RAW image obtained in step S1. Specifically, first, the OB clamp process is performed on the RAW image (step S3). Next, the AGC process is performed on the RAW image on which the OB clamp process has been performed (step S5). Next, the noise reduction process is performed on the RAW image on which the AGC process has been performed (step S7). Next, the white balance correction process is performed on the RAW image on which the noise reduction process has been performed (step S9). Next, the color conversion process is performed on the RAW image on which the white balance correction process has been performed (step S11). Next, the gradation conversion process is performed on the RAW image on which the color conversion process has been performed (step S13). Next, the YC separation process is performed on the RAW image on which the gradation conversion process has been performed (step S15). Next, the edge enhancement process is performed on the RAW image on which the YC separation process has been performed (step S17). Then, the compression process is performed on the RAW image on which the edge enhancement process has been performed (step S19), and the image data on which the compression process has been performed is stored in a predetermined storage medium to perform the storage process (step S21).

Thereafter, when there is RAW image which has not been processed yet (step S23: Yes), the process returns to step S1, and performs the process from step S3 to step S21 on the RAW image which has not been processed yet. On the other hand, when there is no RAW image which has not been processed yet (step S23: No), the process ends the process.

Next, the noise reduction process in step S7 will be described. FIG. 16 is a flowchart showing a detailed processing procedure of the noise reduction process. As shown in FIG. 16, in the noise reduction process, first, the processing target pixel area including the pixel of interest which is referred to when the noise reduction process is performed on the pixel of interest is extracted (step S701). Next, the pixel group set representative similarity when dividing the processing target pixel area extracted in step S701 into a pixel group set of a plurality of candidates prepared in advance is calculated for each candidate (step S703). Then, the representative pixel group set is selected on the basis of the pixel group set representative similarities calculated for each candidate (step S705).

Next, the pixel group representative value of each pixel group is calculated in accordance with the representative pixel group set selected in step S705 on the basis of the pixel values of the pixels in the processing target pixel area extracted in step S701 (step S707). Next, the pixel group representative value similarity is calculated on the basis of the calculated pixel group representative value of each pixel group (step 709). Then, the pixel group similarity is defined for each pixel in the processing target pixel area on the basis of the calculated pixel group representative value similarity (step S711).

The pixel value similarity of each pixel is calculated on the basis of the pixel values of the pixels in the processing target pixel area extracted in step S701 (step S713).

The filter coefficient to be applied to each pixel an the processing target pixel area is calculated on the basis of the pixel group similarity defined for each pixel in the processing target pixel area in step S711 and the pixel value similarity calculated for each pixel in the processing target pixel area in step S713 (step S715). Then, the smoothing process is performed on the pixel of interest by using the calculated filter coefficient (step S717).

Thereafter, when there is pixel which has not been processed yet (step S719: Yes), process returns to step S701, and performs the process from step S701 to step S717 on the pixel which has not been processed yet by defining that the pixel is the pixel of interest. On the other hand, when there is no pixel which has not been processed yet (step S719: No), the process ends the process.

Figure 17:
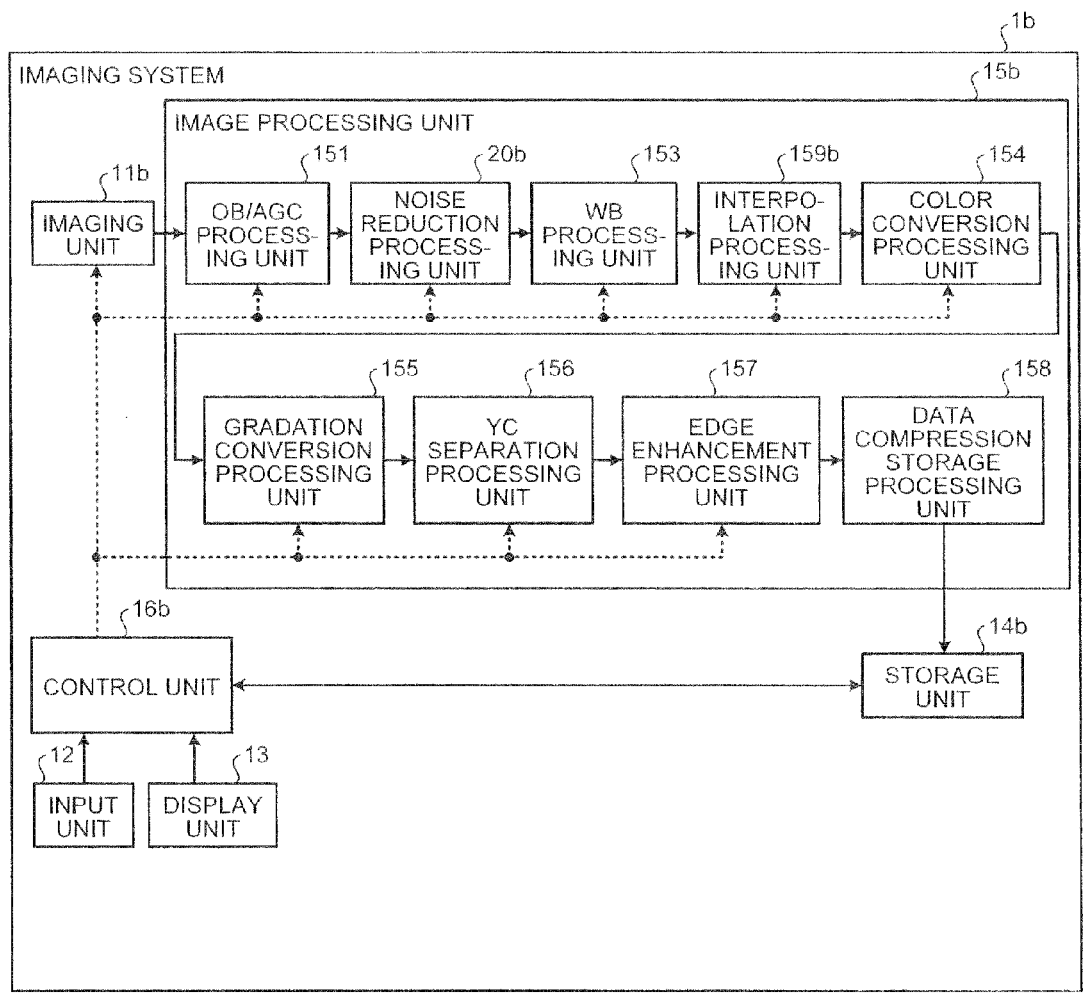
FIG. 17 is a block diagram showing an example of a general configuration of an imaging system according to a second embodiment.

Next, a second embodiment will be described. FIG. 17 is a block diagram showing an example of a general configuration of an imaging system 1b according to the second embodiment. The same components as those described in the first embodiment are given the same reference symbols. As shown in FIG. 17, the imaging system 1b according to the second embodiment includes an imaging unit 11b, input unit 12, the display unit 13, a storage unit 14b, an image processing unit 15b, and a control unit 16b that controls operations of the above units.

In the second embodiment, the imaging unit 11b is constituted by a digital camera or a digital video camera including an image capturing lens, a single-chip image sensor, and the like, and outputs one channel signal for a single pixel. The single-chip image sensor is, for example, an image sensor in which an RGB primary color filter is Bayer-arranged on a monochrome image sensor in a checkered pattern.

FIG. 18 is a diagram showing an arrangement example of the RGB primary color filter. When using a single-chip image sensor including a primary color filter as shown in FIG. 18, insufficient R, G, and B components interpolated by using nearby pixel values. In FIG. 18, while a G channel adjacent to an R channel in the horizontal direction is represented by $G_r$, and a G channel adjacent to a B channel in the horizontal direction is represented by $G_b$ in the second embodiment, $G_r$ and $G_b$ are treated as deferent channels in other words, the imaging unit 11b outputs a signal of any one of the R channel, the $G_r$ channel, the $G_b$ channel, and the B charm for a single pixel.

In the storage unit 14b, a program for operating the Imagine system 1b and realizing various functions included in the imaging system 1b, data used while the program is being executed, and the like are stored. Also, image data captured by the imaging unit 11b is stored.

The image processing unit 15b includes the OB/AGC processing unit 151, a noise reduction processing unit 20b, the WB processing unit 153, an interpolation processing unit 159b, the color conversion processing unit 154, the gradation conversion processing unit 155, the YC separation processing unit 156, the edge enhancement processing unit 157, and the data compression storage processing unit 158.

Here, the interpolation processing unit 159b performs interpolation process on the image data inputted from the WB processing unit 153. Specifically, the interpolation processing unit 159b synchronizes one channel signal for a single pixel into RBG three channel signals for a single pixel. The processed image data of RGB colors is outputted to the color conversion processing unit 154.

Next, the noise reduction processing unit 201a according to the second embodiment will be described. FIG. 19 is a block diagram showing a configuration example of the noise reduction processing unit 20b.

As shown in FIG. 19, the noise reduction processing unit 20b includes a pixel extracting unit 21b, a same-channel-signal selector 27b, a pixel group generator 30b, a pixel group similarity calculator 40b, a pixel value similarity calculator 24h, a filter coefficient calculator 25b, and a smoothing processing unit 26b.

The image data from the OB/AGC processing unit 151 is inputted into the pixel extracting unit 21b. The pixel extracting unit 21 sequentially, defines each pixel to be processing target, and extracts the processing target pixel area which referred when performing the noise reduction process on the pixel of interest which is the processing target pixel. In the second embodiment, when performing the noise reduction process, in the same way as in the first embodiment, 5×5 pixels with the pixel of interest at its center are referred. Therefore, the pixel extracting unit 21b extracts a 9×9 pixel area with the pixel of interest at its center as the processing target pixel area so that the 5×5 pixels of the same channel as that of the pixel of interest are included with the pixel of interest at its center. The extracted processing target pixel area is outputted to the same-channel-signal selector 27b.

The same-channel-signal selector 27b selects 25 pixels including the pixel of interest and pixels of the same channel as that of the pixel of interest from the processing target pixel area extracted by the pixel extracting unit 21b. The arrangement of the pixel of the same channel is determined the arrangement of the primary color filler shown in FIG. 18. FIG. 20 is a diagram showing an example of the processing target pixel area extracted by the pixel extracting unit 21b, and in FIG. 20, hatching is given to the 25 pixels, which include the pixel of interest and pixels of the same channel as that of the pixel of interest, selected by the same-channel-signal selector 27b. Here, as shown in FIG. 20, pixel value of the 25 pixels, which include the pixel of interest and pixels of the same channel as that of the pixel of interest selected, is defined as $P_{x+i,y+j}$ (i=−4, −2, 0, 2, 4 and j=−4, −2, 0, 2, 4). The x and y represent the horizontal coordinate (x coordinate) and the vertical coordinate (y coordinate) of the pixel of interest in the image data, respectively. The i and j represent a relative coordinate (i) in the horizontal direction and a relative coordinate (j) in the vertical direction of each pixel in the extracted processing target pixel area.

The pixel values (values of $P_{x+i,y+j}$) of the 25 pixels, which include the pixel of interest and pixels of the same channel as that of the pixel of interest, selected as described above are inputted into a pixel group set representative similarity calculator 31b in the pixel group generator 30b and the pixel value similarity calculator 24b.

The pixel group generator 30b generates a pixel group on the basis of the pixel values $P_{x+i,y+j}$ of the 25 pixels inputted from the same-channel-signal selector 27b. Although the pixel group can be realized in the same way as in the first embodiment, in the second embodiment, processing is performed on the 25 pixels (hereinafter referred to as "selected pixels") including the pixel of interest selected by the same-channel-signal selector 27b from 9×9 processing target pixel area extracted by the pixel extracting unit 21h, and the pixel group is generated.

FIGS. 21A, 2, 21C, 21D, and 21E are diagrams showing an example of five types of pixel group sets used as candidates in the second embodiment. In FIGS. 21A, 21B, 21C, 21D, and 21E, the selected pixels belonging to the same pixel group are identified by a type of hatching.

Specifically, as shown in FIG. 21A, a vertical correlation pixel group set including five pixel groups $g_{10\_2}$ to $g_{14\_2}$ each obtained by dividing the selected pixels in the processing target pixel area by five pixels in the column direction is used as a first candidate. As shown in FIG. 21B, a horizontal correlation pixel group set including five pixel groups $g_{20\_2}$ to $g_{24\_2}$ each obtained by dividing the selected pixels in the processing target pixel area five pixels in the row direction is used as a second candidate. As shown in FIG. 21C, a left-up correlation pixel group set including five pixel groups $g_{30\_2}$ to $g_{34\_2}$ each obtained by dividing the selected pixels in the processing target pixel area along diagonally left-up lines is used as a third candidate. As shown in FIG. 21D, a right-up correlation pixel group set including five pixel groups $g_{40\_2}$ to $g_{44\_2}$ each obtained by dividing the selected pixels in the processing target pixel area along diagonally right-up lines is used as a fourth candidate. And, as shown in FIG. 21E, an isotropic correlation pixel group set including five pixel groups $g_{50\_2}$ to $g_{54\_2}$ each obtained by dividing the selected pixels in the processing target pixel area so that pixels included in each pixel group are symmetrical with respect, to the pixel of interest at the center of the processing target pixel area is used a fifth candidate.

Actually, as shown in FIG. 19, in the same way as in the first embodiment, the pixel group generator 30b includes the pixel group set representative similarity calculator 31b and the reprepresentative pixel group set selector 32, and generate a pixel group (in other words, selects a representative pixel group by the processing of these components.

First, the pixel group set representative similarity calculator 31b calculates the pixel group set representative similarity for each candidate when dividing the processing target pixel area into a pixel group set of each candidate. Although not shown in FIG. 19, in the same way as the pixel group set representative similarity calculator 31 (refer to FIG. 5) in the first embodiment, the pixel group set representative similarity calculator 31b includes the vertical correlation pixel group set representative similarity calculator (311), the horizontal correlation pixel group set representative similarity calculator (312), the left-up correlation pixel group set representative similarity calculator (313), the right-up correlation pixel group set representative similarity calculator (314), and the isotropic correlation pixel group set representative similarity calculator (315).

Figure 22:
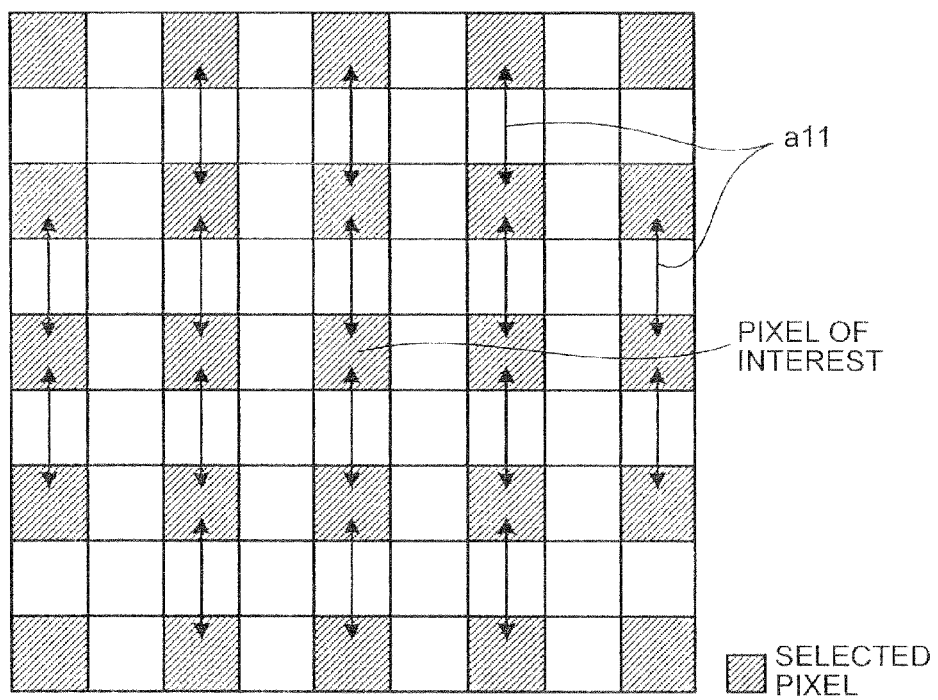
FIG. 22 is an explanatory diagram illustrating a calculation principle of pixel group set representative similarity according to the second embodiment.

In the second embodiment, the vertical correlation pixel group set representative similarity calculator calculates a pixel group eat representative similarity SGv when dividing the selected pixels in the processing target pixel area into the vertical correlation pixel group set. FIG. 22 is an explanatory diagram illustrating a calculation principle of the pixel group set representative similarity SGv according to the second embodiment. In FIG. 22, hatching is given to the selected pixels in the processing target pixel urea. As shown by arrows all in FIG. 22, the vertical correlation pixel group set representative similarity calculator 311 calculates, for example, a difference absolute value between the values of selected pixels adjacent to each other in the vertical direction as an adjacent pixel similarity for each pixel, and obtains the pixel group set representative similarity SGv by calculating a total sum of the adjacent pixel similarities. The calculation equation of the pixel group set representative similarity SGv is represented by the following equation (42).

$$SGv = |P_{x-4,y-2} - P_{x-4,y}| + |P_{x-4,y} - P_{x-4,y+2}| + \quad (42)$$
$$|P_{x-2,y-4} - P_{x-2,y-2}| + |P_{x-2,y-2} - P_{x-2,y}| +$$
$$|P_{x-2,y} - P_{x-2,y+2}| + |P_{x-2,y+2} - P_{x-2,y+4}| + |P_{x,y-4} - P_{x,y-2}| +$$
$$|P_{x,y-2} - P_{x,y}| + |P_{x,y} - P_{x,y-2}| + |P_{x,y+2} - P_{x,y+4}| +$$
$$|P_{x-2,y-4} - P_{x+2,y-2}| + |P_{x+2,y-2} - P_{x+2,y}| + |P_{x+2,y} - P_{x+2,y-2}| +$$
$$|P_{x+2,y+2} - P_{x+2,y+4}| + |P_{x+4,y-2} - P_{x+4,y}| + |P_{x+4,y} - P_{x+4,y+2}|$$

Figure 23:
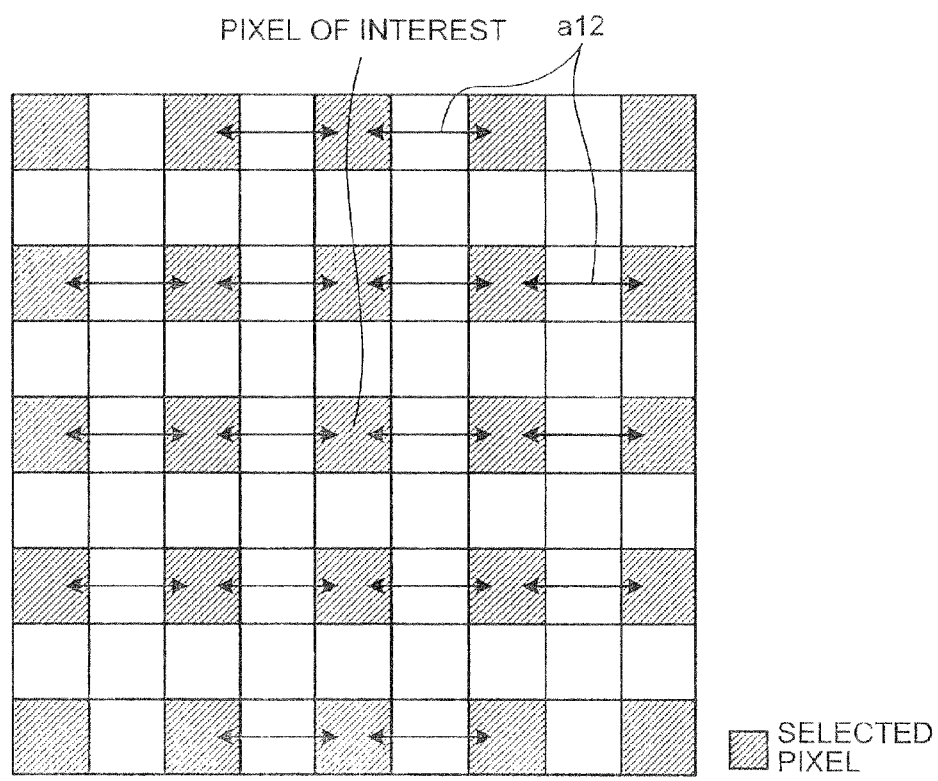
FIG. 23 is an explanatory diagram illustrating a calculation principle of pixel group set representative similarity according to the second embodiment.

The horizontal correlation pixel group set representative similarity calculator calculates a pixel group set representative similarity SGh when dividing the selected pixels in the processing target pixel area into the horizontal correlation pixel group set. FIG. 23 is an explanatory diagram illustrating a calculation principle of the pixel group set representative similarity SGh according to the second embodiment. In FIG. 23, hatching is given to the selected pixels in the processing target pixel area. As shown by arrows a12 in FIG. 23, the horizontal correlation pixel group set representative similarity calculator 312 calculates, for example, a difference absolute value between the values of selected pixels adjacent to each other in the horizontal direction as an adjacent pixel similarity for each pixel, and obtains the pixel group set representative similarity SGh by calculating a total sum of roe adjacent pixel similarities. The calculation equation of the pixel group set representative similarity SGh is represented by the following equation (43).

$$SGh = |P_{x-2,y-4} - P_{x,y-4}| + |P_{x,y-4} - P_{x+2,y-4}| + \quad (43)$$
$$|P_{x-4,y-2} - P_{x-2,y-2}| + |P_{x-2,y-2} - P_{x,y-2}| +$$
$$|P_{x,y-2} - P_{x+2,y-2}| + |P_{x+2,y-2} - P_{x+4,y-2}| + |P_{x-4,y} - P_{x-2,y}| +$$
$$|P_{x-2,y} - P_{x,y}| + |P_{x,y} - P_{x+2,y}| + |P_{x-2,y} - P_{x+4,y}| +$$
$$|P_{x-4,y+2} - P_{x-2,y+2}| + |P_{x-2,y+2} - P_{x,y+2}| + |P_{x,y+2} - P_{x+2,y+2}| +$$
$$|P_{x+2,y+2} - P_{x+4,y+2}| + |P_{x-2,y+4} - P_{x,y+4}| + |P_{x,y+4} - P_{x+2,y+4}|$$

Figure 24:
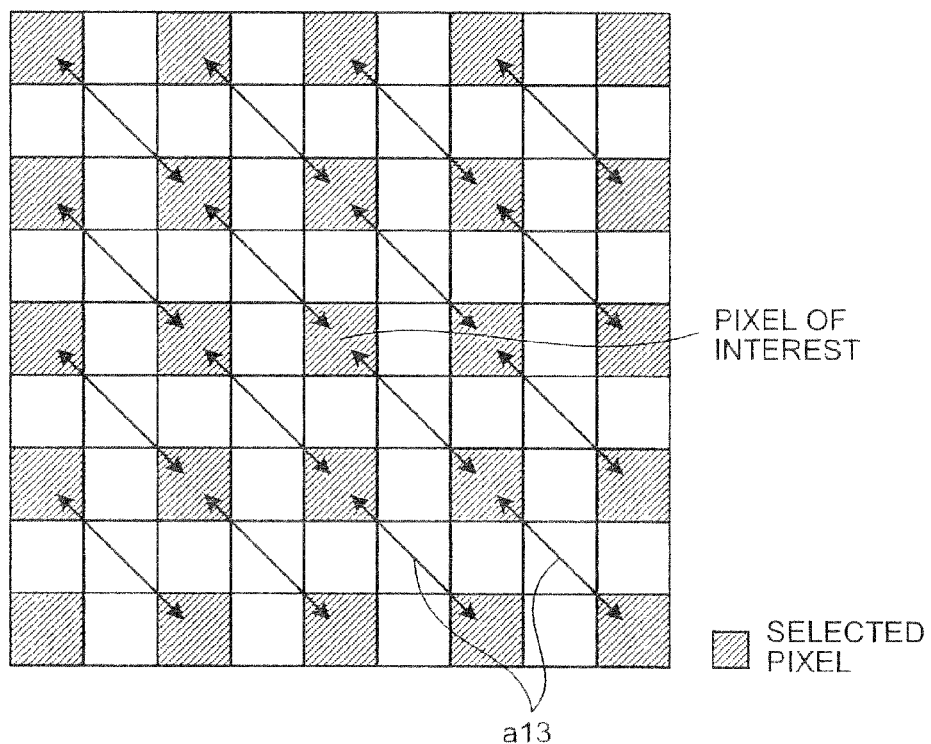
FIG. 24 is an explanatory diagram illustrating a calculation principle of pixel, group set representative similarity according to the second embodiment.

The left-up correlation pixel group set representative similarity calculator calculates a pixel group set representative similarity SGb when dividing the selected pixels in the processing target pixel area into the left-up correlation pixel group set. FIG. 24 is an explanatory diagram illustrating a calculation principle of the pixel group set representative similarity SGb according to the second embodiment. In FIG. 24, hatching is given to the selected pixels in the processing target pixel area. As shown by arrows a13 in FIG. 24, the left-up correlation pixel group set representative similarity calculator 313 calculates, for example, a difference absolute value between the values of selected pixels adjacent to each other in the left-up diagonal direction as an adjacent pixel similarity for each pixel, and obtains the pixel group set representative similarity SGb calculating a total sum of the adjacent pixel similarities. The calculation equation of the pixel group set representative similarity SGb is represented by the following equation (44).

$$SGb = |P_{x-2,y-4} - P_{x+4,y-2}| + |P_{x,y-4} - P_{x+2,y-2}| + \quad (44)$$
$$|P_{x+2,y-2} - P_{x+4,y}| + |P_{x-2,y-4} - P_{x,y-2}| + |P_{x,y-2} - P_{x+2,y}| +$$
$$|P_{x+2,y} - P_{x+4,y+2}| + |P_{x-4,y-4} - P_{x-2,y-2}| +$$
$$|P_{x-2,y-2} - P_{x,y}| + |P_{x,y} - P_{x+2,y+2}| + |P_{x+2,y+2} - P_{x+4,y+4}| +$$
$$|P_{x-4,y-2} - P_{x-2,y}| + |P_{x-2,y} - P_{x,y+2}| + |P_{x,y+2} - P_{x+2,y+4}| +$$
$$|P_{x-4,y} - P_{x-2,y+2}| + |P_{x-2,y+2} - P_{x,y+4}| + |P_{x-4,y+2} - P_{x-2,y+4}|$$

Figure 25:
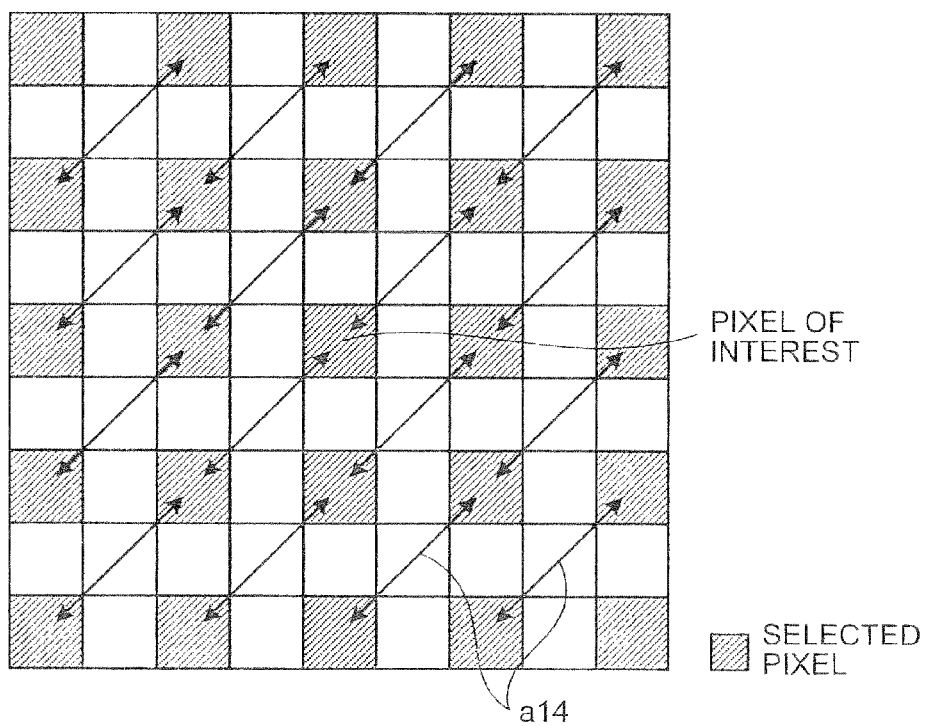
FIG. 25 is an explanatory diagram illustrating a calculation principle of pixel group set representative similarity according to the second embodiment.

The right-up correlation pixel group set representative similarity calculator calculates a pixel group set representative similarity SGs when dividing the selected pixels in the processing target pixel area into the right-up correlation pixel group set. FIG. 25 is an explanatory diagram illustrating a calculation principle the pixel group et representative similarity SGs according to the second embodiment. In FIG. 25, hatching is given to the selected pixels in the processing target pixel area. As shown by arrows a14 in FIG. 25, the right-up correlation pixel group set representative similarity calculator calculates, for example, a difference absolute value between the values of selected pixels adjacent to each other in the right-up diagonal direction as an adjacent pixel similarity for each pixel, and obtains the pixel group set representative similarity SGs by calculating total sum of the adjacent pixel similarities. The calculation equation of the pixel group set representative similarity SGs is represented by the following equation (45).

$$SGs = |P_{x-4,y-2} - P_{x-2,y-4}| + |P_{x-4,y} - P_{x-2,y-2}| + \quad (45)$$
$$|P_{x-2,y-2} - P_{x,y-4}| + |P_{x-4,y-2} - P_{x-2,y}| + |P_{x-2,y} - P_{x,y-2}| +$$
$$|P_{x,y-2} - P_{x+2,y-4}| + |P_{x-4,y+4} - P_{x-2,y-2}| +$$
$$|P_{x-2,y+2} - P_{x,y}| + |P_{x,y} - P_{x+2,y-2}| + |P_{x+2,y-2} - P_{x+4,y-4}| +$$
$$|P_{x-2,y+4} - P_{x,y+2}| + |P_{x,y+2} - P_{x+2,y}| + |P_{x+2,y} - P_{x+4,y-2}| +$$
$$|P_{x,y+4} - P_{x+2,y+2}| + |P_{x+2,y+2} - P_{x+4,y}| + |P_{x+2,y+4} - P_{x+4,y+2}|$$

Figure 26:
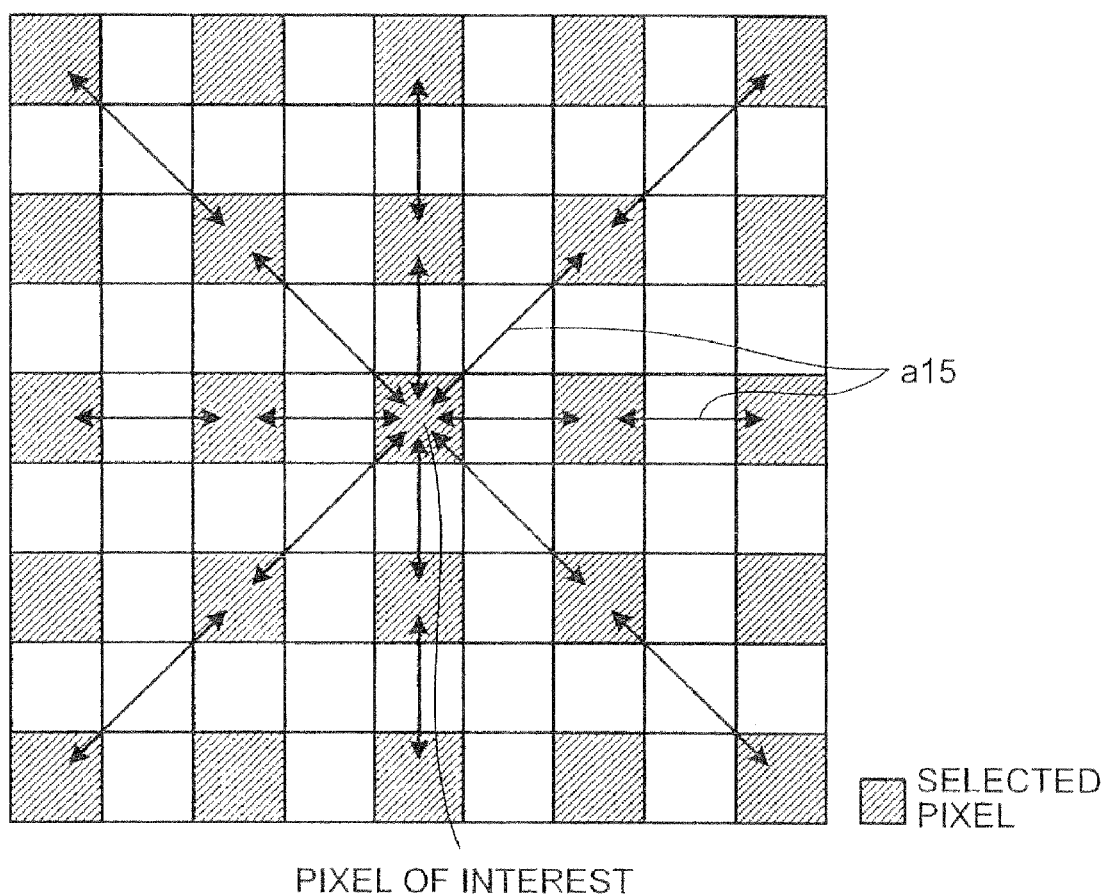
FIG. 26 is an explanatory diagram illustrating a calculation principle of pixel group set representative similarity according to the second embodiment.

The isotropic correlation pixel group set representative similarity calculator calculates a pixel group set representative similarity SGe when dividing the selected pixels in the processing target pixel area into the isotropic correlation pixel group FIG. 26 is on explanatory diagram illustrating a calculation principle of the pixel group set representative similarity SGe according to the second embodiment. In FIG. 26, hatching is given to the selected pixels in the processing target pixel area. As shown by arrows a15 in FIG. 26, the isotropic correlation pixel group set representative similarity calculator 315 calculates, for example, a difference absolute vale between roe values of selected pixels adjacent to each other in a radial fashion around the pixel of interest as an adjacent pixel similarity for each pixel, and obtains the pixel group set representative similarity SGe by calculating a total sum of the adjacent pixel similarities. The calculation equation of the pixel group set representative similarity SGe is represented by the following equation (46).

$$SGe = |P_{x-4,y+4} - P_{x-2,y+2}| + |P_{x-2,y+2} - P_{x,y}| + \\ |P_{x,y} - P_{x+2,y-2}| + |P_{x+2,y-2} - P_{x+4,y-4}| + \\ |P_{x-4,y-4} - P_{x-2,y-2}| + |P_{x-2,y-2} - P_{x,y}| + |P_{x,y} - P_{x+2,y+2}| + \\ |P_{x+2,y+2} - P_{x+4,y+4}| + |P_{x,y-4} - P_{x,y-2}| + |P_{x,y-2} - P_{x,y}| + \\ |P_{x,y} - P_{x,y+2}| + |P_{x,y+2} - P_{x,y+4}| + |P_{x-4,y} - P_{x-2,y}| + \\ |P_{x-2,y} - P_{x,y}| + |P_{x,y} - P_{x+2,y}| + |P_{x+2,y} - P_{x+4,y}| \quad (46)$$

The five pixel group representative similarities SGv, SGh, SGb, SGs, and SGe calculated for each candidate as described above are outputted to the representative pixel group et selector 32.

In the same manner as in the first embodiment, the representative pixel group set selector 32 determines a division pattern best matched to a pixel value distribution in the processing target pixel area on the basis of the five pixel group set representative similarities SGv, SGh, SGb, SGs, and SGe inputted from the pixel group set representative similarity calculator 31b, and selects representative pixel group set. The representative pixel group set selector 32 outputs an index value of the pixel group set selected as the representative pixel group set to the pixel group similarity calculator 40b.

As shown in FIG. 19, the pixel group similarity calculator 40b includes a pixel group representative value calculator 41b and the pixel group representative value similarity calculator 43, and calculates similarities between the pixel groups generated in the processing target pixel area by the processing of these calculators.

The pixel group representative value calculator 41b calculates pixel group representative values $A_0$, $A_1$, $A_2$, $A_3$, and $A_4$ of each pixel group generated in the processing target pixel area on the basis of the pixel values $P_{x+i,y+j}$ of the 25 pixels inputted from the same-channel-signal selector 27b. The calculation method of the pixel group representative value can be realized in the same way as in the first embodiment.

For example, when the index value "0" of the vertical correlation pixel group set is inputted from the representative pixel group set selector 32, the pixel group representative value calculator 41b calculates the pixel group representative values $A_0$, $A_1$, $A_2$, $A_3$, and $A_4$ according to the equations (47) to (51) described below. Here, the pixel group representative value of the pixel group $g_{12\_2}$ (refer to FIG. 21A) including the pixel of interest responds to $A_0$.

$$A_0 = \Sigma_j P_{x,y-j}/5 \quad (47)$$

$$A_1 = \Sigma_j P_{x-2,y+j}/5 \quad (48)$$

$$A_2 = \Sigma_j P_{x+2,y+j}/5 \quad (49)$$

$$A_3 = \Sigma_j P_{x-4,y+j}/5 \quad (50)$$

$$A_4 = \Sigma_j P_{x+4,y-j}/5 \quad (51)$$

where j=−4, −2, 0, 2, 4.

When the index value "1" of the horizontal correlation pixel group set is inputted from the representative pixel group set selector 32, the pixel group representative value calculator 41b calculates the pixel group representative values $A_0$, $A_1$, $A_2$, $A_3$, and $A_4$ according to the equations (52) to (56) described below. Here, the pixel group representative value of the pixel group $g_{22\_2}$ (refer to FIG. 21B) including the pixel of interest corresponds to $A_0$.

$$A_0 = \Sigma_i P_{x+i,y}/5 \quad (52)$$

$$A_1 = \Sigma_i P_{x+i,y-2}/5 \quad (53)$$

$$A_2 = \Sigma_i P_{x+i,y+2}/5 \quad (54)$$

$$A_3 = \Sigma_i P_{x+i,y-4}/5 \quad (55)$$

$$A_4 = \Sigma_i P_{x-i,y+4}/5 \quad (56)$$

where j=−4, −2, 0, 2, 4.

When the index value "2" of the lent up correlation pixel group set is inputted from the representative pixel group set selector 32, the pixel group representative value calculator 41b calculates the pixel group representative values $A_0$, $A_1$, $A_2$, $A_3$, and $A_4$ according to the equations (57) to (61) describer below. Here, the pixel group representative value of the pixel group $g_{32\_2}$ (refer to FIG. 21C) including the pixel of interest corresponds to $A_0$.

$$A_0 = \Sigma_i P_{x+i,y+i}/5 \quad (57)$$

$$A_1 = \{P_{x-2,y-4} + P_{x,y-2} + P_{x+2,y} + P_{x+4,y+2}\}/4 \quad (58)$$

$$A_2 = \{P_{x-4,y-2} + P_{x-2,y} + P_{x,y+2} + P_{x+2,y+4}\}/4 \quad (59)$$

$$A_3 = \{P_{x,y-4} + P_{x+2,y-2} + P_{x+4,y} + P_{x+2,y-4} + P_{x+4,y-2} + P_{x+4,y-4}\}/6 \quad (60)$$

$$A_4 = \{P_{x-4,y} + P_{x-2,y+2} + P_{x,y+4} + P_{x-4,y+2} + P_{x-2,y+4} + P_{x,y+4}\}/6 \quad (61)$$

where j=−4, −2, 0, 2, 4

When the index value "3" of the right-up correlation pixel group set is inputted from the representative pixel group set selector 32, the pixel group representative value calculator 41b calculates the pixel group representative values $A_0$, $A_1$, $A_2$, $A_3$, and $A_4$ according to the equations (62) to (66) described below. Here, the pixel group representative value of the pixel group $g_{42\_2}$ (refer to FIG. 21D) including the pixel of interest corresponds to $A_0$.

$$A_0 = \Sigma_i P_{x+i,y-i}/5 \quad (62)$$

$$A_1 = \{P_{x-4,y+2} + P_{x-2,y} + P_{x+2,y-2} + P_{x+4,y-4}\}/4 \quad (63)$$

$$A_2 = \{P_{x-2,y+4} + P_{x,y+2} + P_{x-2,y} + P_{x-4,y-2}\}/4 \quad (64)$$

$$A_3 = \{P_{x-4,y} + P_{x-2,y-2} + P_{x,y-4} + P_{x-4,y-2} + P_{x-2,y-4} + P_{x-4,y-4}\}/6 \quad (65)$$

$$A_4 = \{P_{x,y-4} + P_{x+2,y+2} + P_{x+4,y} + P_{x+2,y+4} + P_{x+4,y+2} + P_{x-4,y-4}\}/6 \quad (66)$$

where j=−4, −2, 0, 2, 4.

When the index value "4" of the isotropic correlation pixel group set is inputted from the representative pixel group set selector 32, the pixel group representative value calculator 41b calculates the pixel group representative values $A_0$, $A_1$, $A_2$, $A_3$, and $A_4$ according to the equations (67) to (71) described below. Here, the pixel group representative value of the pixel group $g_{52\_2}$ (refer to FIG. 21E) including the pixel of interest corresponds to $A_0$.

$$A_0 = \{P_{x,y} + P_{x-2,y} + P_{x-2,y} + P_{x,y-2} + P_{x,y+2}\}/5 \quad (67)$$

$$A_1 = \{P_{x-2,y-2} + P_{x+2,y-2} + P_{x+2,y+2} + P_{x-2,y+2}\}/4 \quad (68)$$

$$A_2 = \{P_{x-4,y} + P_{x+4,y} + P_{x,y-4} + P_{x,y-4}\}/4 \quad (69)$$

$$A_3=\{P_{x-2,y-4}+P_{x-4,y-2}+P_{x+2,y-4}+P_{x+4,y-2}+P_{x+4,y+2}+ \\ P_{x+2,y+4}+P_{x-2,y+4}+P_{x-4,y-2}\}/8 \quad (70)$$

$$A_4=\{P_{x-4,y-4}+P_{x+4,y-4}+P_{x+4,y+4}+P_{x-4,y+4}\}/4 \quad (71)$$

where j=−4, −2, 0, 2, 4.

The Pixel group representative values $A_0$, $A_1$, $A_2$, $A_3$, and $A_4$ calculated as described above are outputted to the pixel group representative value similarity calculator 43.

In the same manner as in the first embodiment, first, the pixel group representative value similarity calculator 43 calculates the pixel group representative value similarity $SG_n$ on the basis or the pixel group representative values $A_0$, $A_1$, $A_2$, $A_3$, and $A_4$ of the pixel groups inputted from the pixel group representative value calculator 41b. In the same manner as in the first embodiment, the pixel group representative value similarity calculator 43 defines a pixel group similarity $SG_{x+i,y-j}$ for each pixel in the processing target pixel area in accordance with the equation (72) described below on the basis of the calculated pixel group representative value similarities $SG_n$.

$$SG_{x+i,y+j}=SG_n; \; i,j \in \text{pixel group } n \quad (72)$$

where i=−4, −2, 0, 2, 4 and j=−4, −2, 0, 2, 4.

The pixel values similarity calculator 24b calculates a pixel value similarity $SP_{x-i,y+j}$ of each pixel on the basis of the pixel values $P_{x+i,y+j}$ of the 25 pixels inputted from the same-channel-signal selector 27b. For example, the pixel value similarity calculator 24b calculates the pixel value similarity $SP_{x+i,y+j}$ of each pixel as an absolute value of a pixel value difference between each pixel and the pixel of interest $P_{x,y}$. The pixel value similarity $SP_{x+i,y+j}$ is represented by the equation (73) described below calculated pixel value similarity $SP_{x-i,y-j}$ of each pixel is outputted to the filter coefficient calculator 25b.

$$SP_{x+i,y+j}=|P_{x+i,y+j}-P_{x,y}| \quad (73)$$

where i=−4, −2, 0, 2, 4 and j=−4, −2, 0, 2, 4.

The filter coefficient calculator 25b calculates a filter coefficient to be applied to each pixel in the processing target pixel area on the basis of she pixel group similarity $SG_{x-i,y+j}$ inputted from the pixel group representative value similarity calculator 43 and the pixel value similarity $SP_{x+i,y+j}$ inputted from pixel value similarity calculator 24b. Specifically, in the same manner as in the first embodiment, the pixel group similarity $SG_{x+i,y+j}$ and the pixel value similarity are defined as Gaussian weights, and a filter coefficient $C_{x+i,y+j}$ is calculated in accordance with the equation (74) described below. The calculated filter coefficient $C_{x+i,y+j}$ is outputted to the smoothing processing unit 26b.

$$C_{x+i,y+j}=Wg_{x+i,y+j}Wp_{x+i,y+j}/N \quad (74)$$

where $Wg_{x+i,y+j}$, $Wp_{x+i,y+j}$ and N are represented by the equations (75) to (77) described below, respectively, and $\Sigma_{i,j}$ means a total sum of values where i and j can vary (i=−4, −2, 0, 2, 4 and j=−4, −2, 0, 2, 4).

$$Wg_{x+i,y+j}=\exp(-SG_{x+i,y+j}^2/(2\sigma_g)^2) \quad (75)$$

$$Wp_{x+i,y+j}=\exp(-SP_{x+i,y+j}^2/(2\sigma_p)^2) \quad (76)$$

$$N=\Sigma_{i,j}\exp(-SG_{x+i,y+j}^2/(2\sigma_g)^2)\exp(-SP_{x+i,y+j}^2/(2\sigma_p)^2) \quad (77)$$

Here, the $\sigma_g$ value and the $\sigma_p$ value are values transmitted from the control unit 16b as values of process parameters, and in the same manner as in the first embodiment, the $\sigma_g$ value and the $\sigma_p$ value are defined by the control unit 16b and transmitted to the filter coefficient calculator 25b.

The smoothing processing unit 26b performs the smoothing process on the pixel of interest on the basis the the pixel values $P_{x+i,y+j}$ of the 25 pixels inputted from the same-channel-signal selector 27b and the filter coefficient $C_{x+i,y+j}$ inputted from the filter coefficient calculator 25b. Specifically, a smoothed pixel value $Pf_{x,y}$ is obtained by performing the smoothing process on a pixel value $P_{x,y}$ of the pixel of interest in accordance with the equation (78) described below. The obtained smoothed pixel value $Pf_{x,y}$ is outputted to the WB processing unit 153.

$$Pf_{x,y}=\Sigma_{i,j}C_{x+i,y+j}P_{x+i,y+j} \quad (78)$$

where i=−4, −2, 0, 2, 4 and j=−4, −2, 0, 2, 4.

According to the second embodiment described above, even when the imaging unit 11b is constituted by a single-chip image sensor using a primary color filter, the same effect as that of the sort embodiment can be obtained, so that the microstructure of the image is preserved without being destroyed, the noise can be reduced with high accuracy, and the noise reduction effect can be increased.

In the same way as in the first embodiment, the image processing unit 15b according to the second embodiment is not limited to hardware, but may be realized as software by causing the CPU 1011 of the computer system 1000 as exemplified in FIGS. 13 and 14 to execute the image processing program.

Figure 27:
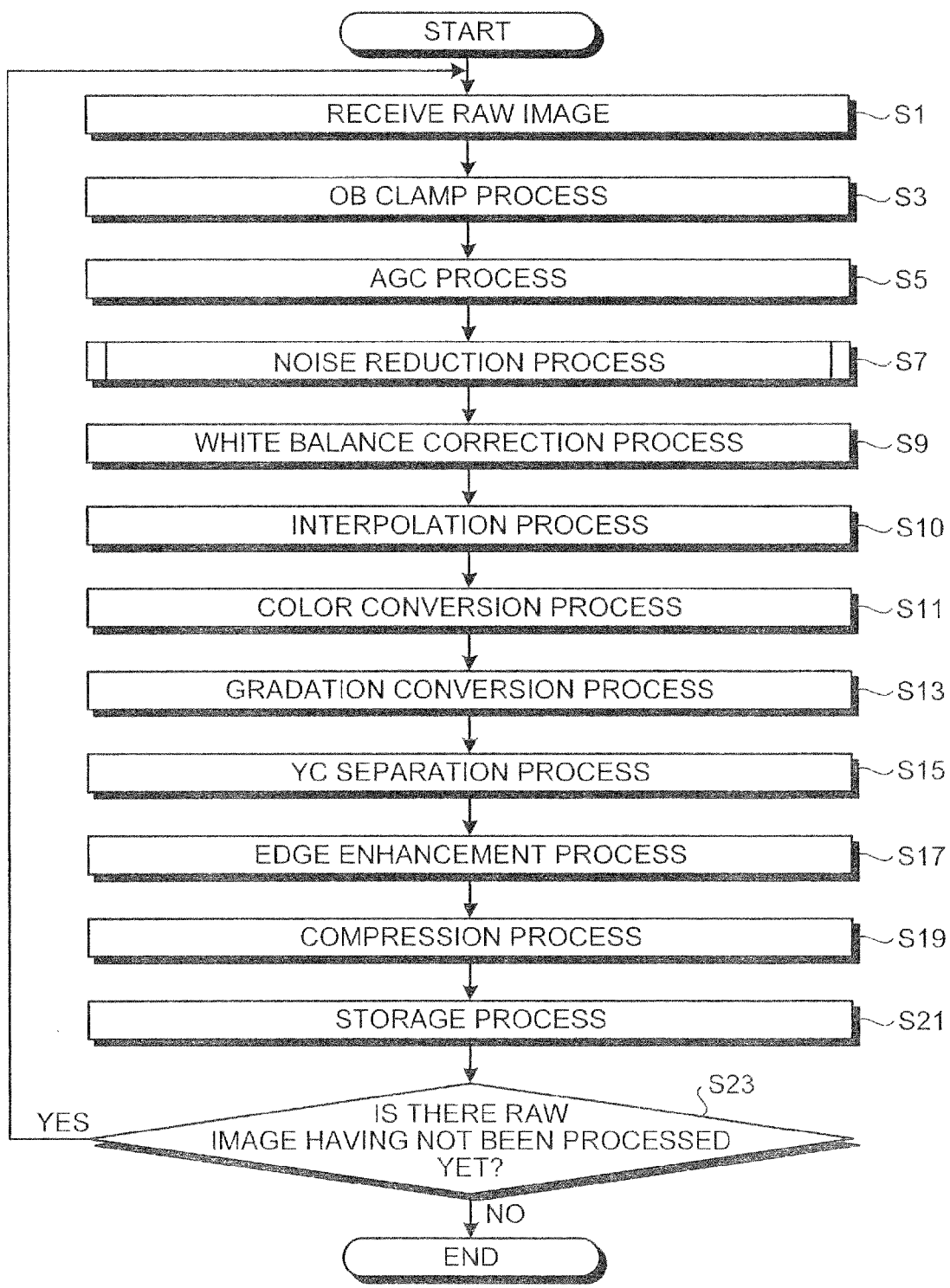
FIG. 27 as a general flowchart showing a processing procedure of a CPU according to a modified example.

FIG. 27 is a general flowchart showing a processing procedure performed by the CPU 1011 according to a modified example. In FIG. 27, the same processes as those described in the first embodiment are given the same reference symbols, and descriptions thereof will be omitted.

As shown in FIG. 27, in the modified example, after the white balance correction process is performed on the RAW image on which the noise reduction process has been performed (step S9), the interpolation process is performed (step S10). In the next step S11, the color conversion process is performed on the RAW image or which the interpolation process has been performed.

Next, a third embodiment will be described. In the third embodiment, a moving image obtained by continuously capturing images in time series is a processing target.

FIG. 24 is a block diagram showing a configuration example of a noise reduction processing unit 20c in an image processing unit included in an imaging system according to the third embodiment. The imaging system according to the third embodiment is configured in the same way as the imaging system 1b described with reference to FIG. 17 in the second embodiment, and can be realized by replacing the control unit 16b in FIG. 17 by a control unit 16c shown in FIG. 28 are replacing the noise reduction processing unit 20b in FIG. 17 by the noise reduction processing unit 20c shown in FIG. 23.

Figure 28:
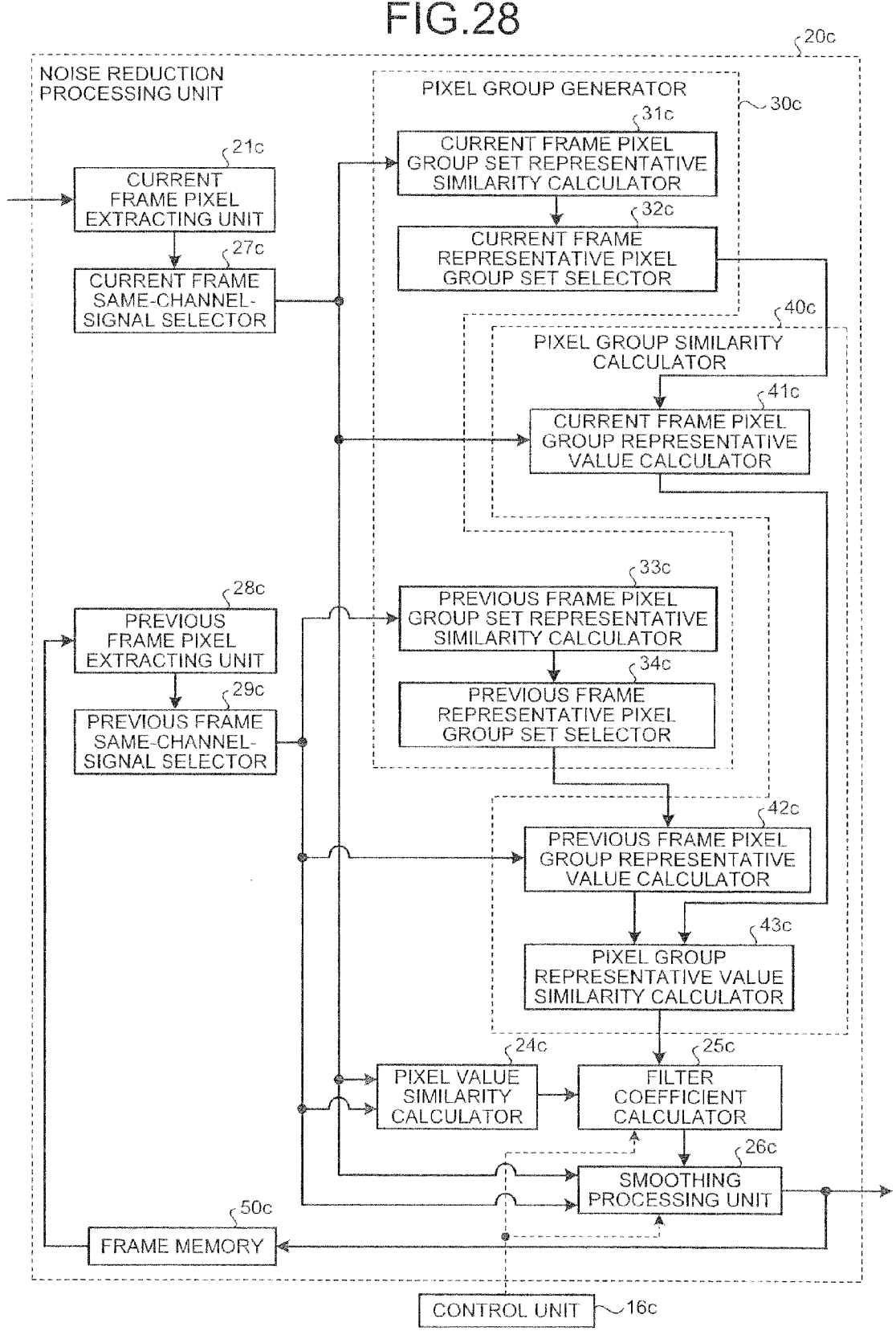
FIG. 28 is a block diagram showing a configuration example of a noise reduction processing unit in an image processing unit included in an imaging system according a third embodiment.

As shown in FIG. 28, the noise reduction process unit 20c includes a current frame pixel extracting unit 21c, a current frame same-channel-signal selector 27c, a previous frame pixel extracting unit 28c, a previous frame same-channel-signal selector 29c, a pixel-group generator 80d, a pixel group similarity calculator 40c, a pixel value similarity calculator 24c, a filter coefficient calculator 25c, a smoothing processing unit 26c, and a frame memory 50c.

Here, the frame memory 50c is to hold a current frame (current image) on which the noise reduction process has been performed so that the current frame on which the noise reduction process has been performed can be referred to as a previous frame (previous image) in the next frame. The frame memory 50c includes en area for storing two frames of image data. Specifically, the frame memory 50c includes a storage area which stores smoothed pixel values of pixels in the previous irate on which the noise reduction process as formed last time and a storage area which stores smoothed pixel values of pixels in the current frame on which the noise reduction process was performed this time. For example, it is possible to use ring buffer in which a storage area is manager like a ring, and a storage area for next frame is switched when the noise reduction process for one franc is completed.

The image data from the OB/AGC processing unit 151 is inputted into the current frame pixel extracting unit 21c. The current frame pixel extracting unit 21c sequentially defines each pixel in the current frame to be a processing target, and extracts the processing target pixel area (current frame processing target pixel area) as a current image pixel area which is referred when performing the noise reduction process on the pixel of interest which is the processing target pixel. Specifically, in the same manner as the pixel extracting unit 21b described in the second embodiment, the current frame pixel extracting unit 21c extracts a 9×9 pixel area with the pixel of interest in the current frame at its center as the current frame processing target pixel area. The extracted current frame processing target pixel area is outputted to the current frame same-channel-signal selector 27c.

In the same manner as the same-channel-signal selector 27b described in the second embodiment, the current frame same-channel-signal selector 27c selects 25 pixels including the pixel of interest and pixels of the same channel as that of the pixel of interest from the current frame processing target pixel area extracted by the current frame pixel extracting unit 21c. The pixel values (values of $P_{x+i,y+j}$) of the 25 pixels, (ich includes the pixel of interest and pixels of the same channel as that of the pixel of interest, selected from the current frame processing target pixel area as described above are inputted into a current frame pixel group set representative similarity calculator 31c in the pixel group generator 30c and the pixel value similarity calculator 24c, respectively.

On the other hand, the image data of the last frame (previous frame) held en the frame memory 50c is inputted into the previous frame pixel extracting unit 28c. The previous frame pixel extracting unit 28c sequentially defines each pixel in the previous frame to be a processing target, and extracts a pixel area (previous frame processing target pixel area) as a previous image pixel area which is referred when performing the noise reduction process on the pixel of interest which is the processing target pixel. Specifically, in the sane manner as the current frame pixel extracting unit 21c, the previous frame pixel extracting unit 28c extracts a 9×9 pixel area with the pixel of interest in the previous frame at its center as the previous frame processing target pixel area. The extracted previous frame processing target pixel area is outputted to the previous frame same-channel-signal selector 29c.

In the same manner as the current frame same-channel-signal selector 27c, the previous frame same-channel-signal selector 29c selects 25 pixels including the pixel of interest and pixels of the same channel as that of the pixel of interest from the previous frame processing target pixel area extracted by the previous frame pixel extracting unit 28c. The pixel values (values of $P_{x+i,y+j}$) of the 25 pixels, which include the pixel of interest and pixels of the same channel as that of the pixel of interest, selected from the previous frame processing target pixel area as described above are inputted into a previous frame pixel group set representative similarity calculator 33c in the pixel group generator 30c and the pixel value similarity calculator 24c.

Figure 29:
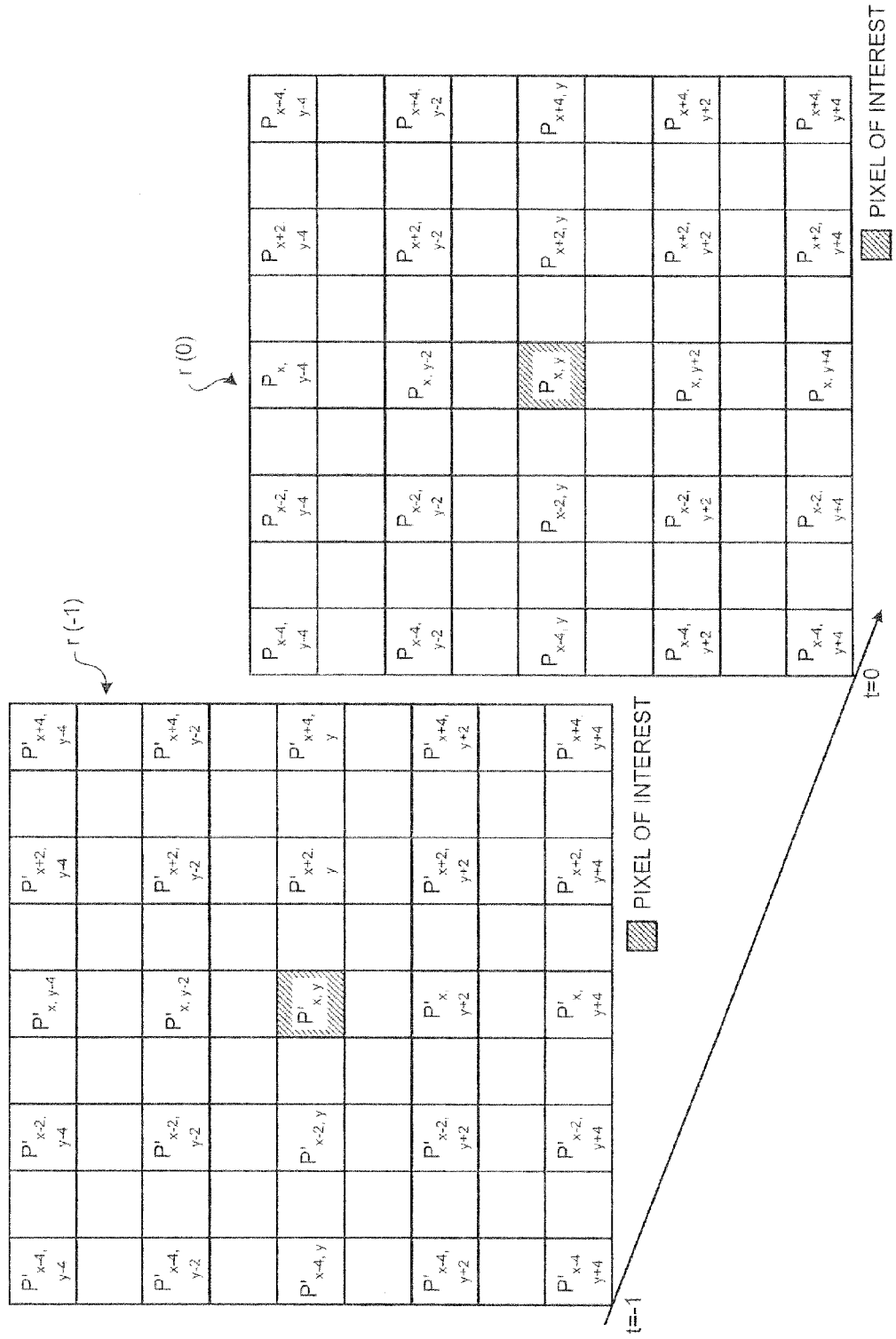
FIG. 29 is a diagram showing an example of a current frame processing target pixel area and a previous frame processing target pixel area.

FIG. 29 is a diagram showing an example of a current frame processing target pixel area r(0) extracted from the current frame of time t=0 by the current frame pixel extracting unit 21c, and a previous frame processing target pixel area r(−1) extracted from the previous frame of time t=−1 by the previous frame pixel extracting unit 28c. In the current frame processing target pixel area r(0) shown in FIG. 29, hatching is given to the 25 pixels including the pixel of interest and pixels of the same channel as that of the pixel of interest selected by the current frame same-channel-signal selector 27c. In the same way, in the previous frame pr sing target pixel area r(−1) shown in FIG. 29, hatching is given to the 25 pixels including the pixel of interest aced pixels of the channel as that of the pixel of interest selected by the previous frame same-channel-signal selector 29c.

Here, as shown in FIG. 29, the pixel value of each pixel, which includes the pixel of interest and pixels of the same channel as that of the pixel of interest selected from the current frame processing target pixel area r(0) by the current frame same-channel-signal selector 27c, is defined as $P_{x+i,y+j}$ (i=−4, −2, 0, 2, 4 and j=−4, −2, 0, 2 4). On the other hand, the pixel value of each pixel, which includes the pixel of interest, and pixels of the same channel as that of the pixel of interest selected from the previous frame processing target pixel area r(−1) by the previous frame same-channel-signal selector 29c, is defined as $P'_{x+i,y+j}$ (i=−4, −2, 0, 2, 4 and j=−4, −2, 0, 2, 4). The x and y represent the horizontal coordinate (x coordinate) and the vertical coordinate (y coordinate) of the pixel of interest in the image data of a corresponding frame. The i and j represent a relative coordinate (i) in the horizontal direction and a relative coordinate (j) in the vertical direction of each pixel in the extracted current frame processing target pixel area or previous frame processing target pixel area.

As shown in FIG. 28, the pixel group generator 30c includes the current frame pixel group set representative similarity calculator 31c as a first pixel group set representative similarity calculator and a current frame representative pixel group set lector 32c as a first representative pixel group set selector. By the current frame pixel group set representative similarity calculator 31c and the current frame representative pixel group set selector 32c, processing is performed on the 25 pixels (hereinafter referred to as "current-frame selected pixels") including the pixel of interest selected by the current frame same-channel-signal selector 27c from the 9×9 current frame processing target pixel area extracted by the current frame pixel extracting unit 21c, and the pixel group is generated.

Further, the pixel group generator 30c includes the previous frame pixel group set representative similarity calculator 33c as a second pixel group set representative similarity calculator and a previous frame representative pixel group set selector 34c as a second representative pixel group selector. By the previous frame pixel group set representative similarity calculator 33c and the previous frame representative pixel group set selector 34c, processing is performed on the 25 pixels (hereinafter referred to as "previous-frame selected pixels") including the pixel of interest selected by the previous frame same-channel-signal selector 29c from the 9×9 previous frame processing target pixel area extracted by the previous frame pixel extracting unit 28c, and the pixel group us generated.

Here, processing performed or the current frame by the pixel group generator 30c, and processing performed on the previous frame by the pixel group generator 30c will be described in this order. In the processing performed on the current frame, first, the current frame pixel group set representative similarity calculator 31c calculates a pixel group sot representative similarity (a current image pixel group set representative similarity for each candidate when dividing the current frame processing target pixel area into a pixel group set of each candidate. Although not shown in FIG. 28, in the same way as the pixel group set representative similarity calculator 31b in the second embodiment, the current frame pixel group set representative similarity calculator 31c includes the vertical correlation pixel group set representative similarity calculator, the horizontal correlation pixel group set representative similarity calculator, the left-up correlation pixel group set representative similarity calculator, the right-up correlation pixel group set representative similarity calculator, and the isotropic correlation pixel group set representative similarity calculator.

In the third embodiment, in the same manner as in the second embodiment, the vertical correlation pixel group set representative similarity calculator in the current frame pixel group set representative similarity calculator 31c calculates a pixel group set representative similarity SGv(0) when dividing the current-frame selected pixels in the current frame processing target pixel area into the vertical correlation pixel group set in accordance with the following equation (79).

$$SGv(0) = |P_{x-4,y-2} - P_{x-4,y}| + |P_{x-4,y} - P_{x-4,y+2}| + \qquad (79)$$
$$|P_{x-2,y-4} - P_{x-2,y-2}| + |P_{x-2,y-2} - P_{x-2,y}| +$$
$$|P_{x-2,y} - P_{x-2,y+2}| + |P_{x-2,y+2} - P_{x-2,y+4}| + |P_{x,y-4} - P_{x,y-2}| +$$
$$|P_{x,y-2} - P_{x,y}| + |P_{x,y} - P_{x,y+2}| + |P_{x,y+2} - P_{x,y+4}| +$$
$$|P_{x+2,y-4} - P_{x+2,y-2}| + |P_{x+2,y-2} - P_{x+2,y}| + |P_{x+2,y} - P_{x+2,y+2}| +$$
$$|P_{x+2,y+2} - P_{x+2,y+4}| + |P_{x+4,y-2} - P_{x+4,y}| + |P_{x+4,y} - P_{x+4,y+2}|$$

In the same manner as an the second embodiment, the horizontal correlation pixel group set representative similarity calculator in the current frame pixel group set representative similarity calculator 31c calculates a pixel group set representative similarity SGh(0) when dividing the current-frame selected pixels in the current frame processing target pixel area into the horizontal correlation pixel group set in accordance with the following equation (80).

$$SGh(0) = |P_{x-2,y-4} - P_{x,y-4}| + |P_{x,y-4} - P_{x+2,y-4}| + \qquad (80)$$
$$|P_{x-4,y-2} - P_{x-2,y-2}| + |P_{x-2,y-2} - P_{x,y-2}| +$$
$$|P_{x,y-2} - P_{x+2,y-2}| + |P_{x+2,y-2} - P_{x+4,y-2}| + |P_{x-4,y} - P_{x-2,y}| +$$
$$|P_{x-2,y} - P_{x,y}| + |P_{x,y} - P_{x+2,y}| + |P_{x+2,y} - P_{x+4,y}| +$$
$$|P_{x-4,y+2} - P_{x-2,y+2}| + |P_{x-2,y+2} - P_{x,y+2}| + |P_{x,y+2} - P_{x+2,y+2}| +$$
$$|P_{x+2,y+2} - P_{x+4,y+2}| + |P_{x-2,y+4} - P_{x,y+4}| + |P_{x,y+4} - P_{x+2,y+4}|$$

In the same manner as in the second embodiment, the left up correlation pixel group set representative similarity calculator in the current frame pixel group set representative similarity calculator 31c calculates a pixel group set representative similarity SGb(0) when dividing the current-frame selected pixels in the current frame processing target pixel area into the left-up correlation pixel group set in accordance with the following equation (81).

$$SGb(0) = |P_{x+2,y-4} - P_{x+4,y-2}| + |P_{x,y-4} - P_{x+2,y-2}| + \qquad (81)$$
$$|P_{x+2,y-2} - P_{x+4,y}| + |P_{x-2,y-4} - P_{x,y-2}| + |P_{x,y-2} - P_{x+2,y}| +$$
$$|P_{x+2,y} - P_{x+4,y+2}| + |P_{x-4,y-4} - P_{x-2,y-2}| +$$
$$|P_{x-2,y-2} - P_{x,y}| + |P_{x,y} - P_{x+2,y+2}| + |P_{x+2,y+2} - P_{x+4,y+4}| +$$
$$|P_{x-4,y-2} - P_{x-2,y}| + |P_{x-2,y} - P_{x,y+2}| + |P_{x,y+2} - P_{x+2,y+2}| +$$
$$|P_{x-4,y} - P_{x-2,y+2}| + |P_{x-2,y+2} - P_{x,y+4}| + |P_{x-4,y+2} - P_{x-2,y+4}|$$

In the same manner as in the second embodiment, the right-up correlation pixel group set representative similarity calculator in the current frame pixel group set representative similarity calculator 31c calculates a pixel group set representative similarity SGs(0) when dividing the current-frame selected pixels in the current frame processing target pixel area into the right-up correlation pixel group set in accordance with the following equation (82).

$$SGs(0) = |P_{x-4,y-2} - P_{x-2,y-4}| + |P_{x-4,y} - P_{x-2,y-2}| + \qquad (82)$$
$$|P_{x-2,y-2} - P_{x,y-4}| + |P_{x-4,y+2} - P_{x-2,y}| + |P_{x-2,y} - P_{x,y-2}| +$$
$$|P_{x,y-2} - P_{x+2,y-4}| + |P_{x-4,y+4} - P_{x-2,y+2}| +$$
$$|P_{x-2,y+2} - P_{x,y}| + |P_{x,y} - P_{x+2,y-2}| + |P_{x+2,y-2} - P_{x+4,y-4}| +$$
$$|P_{x-2,y+4} - P_{x,y+2}| + |P_{x,y+2} - P_{x+2,y}| + |P_{x+2,y} - P_{x+4,y-2}| +$$
$$|P_{x,y+4} - P_{x+2,y+2}| + |P_{x+2,y+2} - P_{x+4,y}| + |P_{x+2,y+4} - P_{x+4,y+2}|$$

In the same manner ds in the second embodiment, the isotropic correlation pixel group set representative similarity calculator in the current frame pixel group set representative similarity calculator 31c calculates a group set representative similarity SGe(0) when dividing the current-frame selected pixels in the current frame processing target pixel area into the isotropic correlation pixel group set in accordance with the following equation (83).

$$SGe(0) = |P_{x-4,y+4} - P_{x-2,y+2}| + |P_{x-2,y+2} - P_{x,y}| + \qquad (83)$$
$$|P_{x,y} - P_{x+2,y-2}| + |P_{x+2,y-2} - P_{x+4,y-4}| +$$
$$|P_{x-4,y-4} - P_{x-2,y-2}| + |P_{x-2,y-2} - P_{x,y}| + |P_{x,y} - P_{x+2,y+2}| +$$
$$|P_{x+2,y+2} - P_{x-4,y+4}| + |P_{x,y-4} - P_{x,y-2}| + |P_{x,y-2} - P_{x,y}| +$$
$$|P_{x,y} - P_{x,y+2}| + |P_{x,y+2} - P_{x,y+4}| + |P_{x-4,y} - P_{x-2,y}| +$$
$$|P_{x-2,y} - P_{x,y}| + |P_{x,y} - P_{x+2,y}| + |P_{x+2,y} - P_{x+4,y}|$$

The five pixel group set representative similarities SGv(0), SGh(0), SCb(0), SGs(0), and SGe(0) calculated, for each candidate as described above are outputted to the current frame representative pixel group set selector 32c.

In the same manner as in the first embodiment, the current frame representative pixel group set selector determines a division pattern best matched to a pixel value distribution in the current frame processing target pixel area on the basis of the five pixel group set representative similarities SGv(0), SGh(0), SGb(0), SGs(0), and SGe(0) inputted from the current frame pixel group set representative similarity calculator 31c, and selects representative pixel group set (a first representative pixel group set). The current frame representative pixel group set selector 32c outputs an index value of the pixel group set selected as the representative pixel group set to the pixel group similarity calculator 40c.

On the other hand, in the processing performed on the previous trace, first, the previous frame pixel group set representative similarity calculator 33c calculates a pixel group set representative similarity (a previous image pixel group set representative similarity) for each candidate when dividing the previous frame processing target pixel area into a pixel group set of each candidate. Although not shown in FIG. 28, in the same way as the pixel group set representative similarity calculator 31b in the second embodiment, the previous frame pixel group set representative similarity calculator 33c includes the vertical correlation pixel group set representative similarity calculator, the horizontal correlation pixel group representative similarity calculator, the left-up correlation pixel group set representative similarity calculator, the right-up correlation pixel group set representative similarity calculator, and the isotropic correlation pixel group set representative similarity calculator.

In the third embodiment, in the same manner as in the second embodiment, the vertical correlation pixel group set representative similarity calculator in the previous frame pixel group set representative similarity calculator 33c calculates a pixel group set representative similarity SGv(−1) when dividing the previous-frame selected pixels in the previous frame processing target pixel area into the vertical correlation pixel group set in accordance with the following equation (84).

$$SGv(-1) = |P'_{x-4,y-2} - P'_{x-4,y}| + |P'_{x-4,y} - P'_{x-4,y+2}| + \qquad (84)$$
$$|P'_{x-2,y-4} - P'_{x-2,y-2}| + |P'_{x-2,y-2} - P'_{x-2,y}| +$$
$$|P'_{x-2,y} - P'_{x-2,y+2}| + |P'_{x-2,y+2} - P'_{x-2,y+4}| + |P'_{x,y-4} - P'_{x,y-2}| +$$
$$|P'_{x,y-2} - P'_{x,y}| + |P'_{x,y} - P'_{x,y+2}| + |P'_{x,y+2} - P'_{x,y+4}| +$$
$$|P'_{x+2,y-4} - P'_{x+2,y-2}| + |P'_{x+2,y-2} - P'_{x+2,y}| + |P'_{x+2,y} - P'_{x+2,y+2}| +$$
$$|P'_{x+2,y+2} - P'_{x+2,y+4}| + |P'_{x+4,y-2} - P'_{x+4,y}| + |P'_{x+4,y} - P'_{x+4,y+2}|$$

In the same manner as in the second embodiment, the horizontal correlation pixel group set representative similarity calculator in the previous frame pixel group set representative similarity calculator 33c calculates a pixel group set representative similarity SGh(−1) when dividing the previous-frame selected pixels in the previous frame processing target pixel area into the horizontal correlation pixel group set in accordance with the following equation (85).

$$SGh(-1) = |P'_{x-2,y-4} - P'_{x,y-4}| + |P'_{x,y-4} - P'_{x-2,y-4}| + \qquad (85)$$
$$|P'_{x-4,y-2} - P'_{x-2,y-2}| + |P'_{x-2,y-2} - P'_{x,y-2}| +$$
$$|P'_{x,y-2} - P'_{x+2,y-2}| + |P'_{x+2,y-2} - P'_{x+4,y-2}| + |P'_{x-4,y} - P'_{x-2,y}| +$$
$$|P'_{x-2,y} - P'_{x,y}| + |P'_{x,y} - P'_{x+2,y}| + |P'_{x+2,y} - P'_{x+4,y}| +$$
$$|P'_{x-4,y+2} - P'_{x-2,y+2}| + |P'_{x-2,y+2} - P'_{x,y+2}| + |P'_{x,y+2} - P'_{x+2,y+2}| +$$
$$|P'_{x+2,y+2} - P'_{x+4,y+2}| + |P'_{x-2,y+4} - P'_{x,y+4}| + |P'_{x,y+4} - P'_{x+2,y+4}|$$

In the same manner as in the second embodiment, the left-up correlation pixel group set representative similarity calculator in the previous frame pixel group set representative similarity calculator 33c calculates a pixel group set representative similarity SGb(−1) when dividing the previous-frame selected pixels in the previous frame processing target pixel area into the left-up correlation pixel group set in accordance with the following equation (86).

$$SGb(-1) = |P'_{x+2,y-4} - P'_{x+4,y-2}| + |P'_{x,y-4} - P'_{x+2,y-2}| + \qquad (86)$$
$$|P'_{x+2,y-2} - P'_{x+4,y}| + |P'_{x-2,y-4} - P'_{x,y-2}| + |P'_{x,y-2} - P'_{x-2,y}| +$$
$$|P'_{x+2,y} - P'_{x+4,y+2}| + |P'_{x-4,y-4} - P'_{x-2,y-2}| +$$
$$|P'_{x-2,y-2} - P'_{x,y}| + |P'_{x,y} - P'_{x+2,y+2}| + |P'_{x+2,y+2} - P'_{x+4,y+4}| +$$
$$|P'_{x-4,y-2} - P'_{x-2,y}| + |P'_{x-2,y} - P'_{x,y+2}| + |P'_{x,y+2} - P'_{x+2,y+4}| +$$
$$|P'_{x-4,y} - P'_{x-2,y+2}| + |P'_{x-2,y+2} - P'_{x,y+4}| + |P'_{x-4,y+2} - P'_{x-2,y+4}|$$

In the same manner as in the second embodiment, the right-up correlation pixel group set representative similarity calculator in the previous frame pixel group set representative similarity calculator 33c calculates a pixel group set representative similarity SGs(−1) when dividing the previous-frame selected pixels in the previous frame processing target pixel area into the right-up correlation pixel group set in accordance with the following equation (87).

$$SGs(-1) = |P'_{x-4,y-2} - P'_{x-2,y-4}| + |P'_{x-4,y} - P'_{x-2,y-2}| + \qquad (87)$$
$$|P'_{x-2,y-2} - P'_{x,y-4}| + |P'_{x-4,y+2} - P'_{x-2,y}| + |P'_{x-2,y} - P'_{x,y-2}| +$$
$$|P'_{x,y-2} - P'_{x+2,y-4}| + |P'_{x-4,y+4} - P'_{x-2,y+2}| +$$
$$|P'_{x-2,y+2} - P'_{x,y}| + |P'_{x,y} - P'_{x+2,y-2}| + |P'_{x+2,y-2} - P'_{x+4,y-4}| +$$
$$|P'_{x-2,y+4} - P'_{x,y+2}| + |P'_{x,y+2} - P'_{x+2,y}| + |P'_{x+2,y} - P'_{x+4,y-2}| +$$
$$|P'_{x,y+4} - P'_{x+2,y+2}| + |P'_{x+2,y+2} - P'_{x+4,y}| + |P'_{x+2,y-4} - P'_{x+4,y+2}|$$

In the same manner in the second embodiment, the tropic correlation pixel group set representative similarity calculator in the previous frame pixel group set representative similarity calculator 33c calculates a pixel group set representative similarity SGe(−1) when dividing the previous-frame selected pixels in the previous frame processing target pixel area into the isotropic correlation pixel group set in accordance with the following equation (88).

$$SGe(-1) = |P'_{x-4,y+4} - P'_{x-2,y+2}| + \qquad (88)$$
$$|P'_{x-2,y+2} - P'_{x,y}| + |P'_{x,y} - P'_{x+2,y-2}| + |P'_{x+2,y-2} - P'_{x+4,y-4}| +$$
$$|P'_{x-4,y-4} - P'_{x-2,y-2}| + |P'_{x-2,y-2} - P'_{x,y}| + |P'_{x,y} - P'_{x+2,y+2}| +$$
$$|P'_{x+2,y+2} - P'_{x+4,y+4}| + |P'_{x,y-4} - P'_{x,y-2}| + |P'_{x,y-2} - P'_{x,y}| +$$
$$|P'_{x,y} - P'_{x,y+2}| + |P'_{x,y+2} - P'_{x,y+4}| + |P'_{x-4,y} - P'_{x-2,y}| +$$
$$|P'_{x-2,y} - P'_{x,y}| + |P'_{x,y} - P'_{x+2,y}| + |P'_{x+2,y} - P'_{x+4,y}|$$

The five pixel group set representative similarities SGv(−1), SGh(−1), SGb(−1), SGs(−1), and SGe(−1) calculated for each candidate as described above are outputted to the previous frame representative pixel group set selector 34c.

In the same manner as in the first embodiment, the previous frame representative pixel group set selector 34c determines a division pattern neat matched to a pixel value distribution in the previous frame processing target pixel area on the basis of the five pixel group set representative similarities SGv(−1), SGh(−1), SGb(−1), SGs(−1), and SGe(−1) inputted from the previous frame pixel group set representative similarity calculator 33c, and selects a representative pixel group set (a second representative pixel group set). The previous frame representative pixel group set selector 34c outputs an index value of the pixel group set selected as the representative pixel group set to the pixel group similarity calculator 40c.

As shown in FIG. 28, Lou pixel group similarity calculator 40c includes a current frame pixel group representative value calculator 41c, a previous frame pixel group representative value calculator 42c, and a pixel group representative value similarity calculator 43c, and calculates similarities between tee pixel groups generated in the current frame processing target pixel area by the processing of these calculators.

The current frame pixel group representative value calculator 41c calculates pixel group representative values $B_0$, $B_1$, $B_2$, $B_3$, and $B_4$ of the pixel groups generated in the current frame processing target pixel area on the basis of the pixel values $P_{x+i,y+j}$ of the 25 pixels inputted from the current frame same-channel-signal footer 27c. The calculation method of the pixel group representative values $B_0$, $B_1$, $B_2$, $B_3$, and $B_4$ can be realized in the same way as the pixel group representative value calculation method described in the second embodiment. The calculated pixel group representative values $B_0$, $B_1$, $B_2$, $B_3$, and $B_4$ are outputted to the pixel group representative value similarity calculator 43c.

For example, when the index value "0" of the vertical correlation pixel group set is inputted from the current frame representative pixel group set selector 32c, the current frame pixel group representative value calculator 41c calculates the pixel group representative values $B_0$, $B_1$, $B_2$, $B_3$, and $B_4$ according to the equations (89) to (93) described below.

$$B_0 = \Sigma_j P_{x,y+j}/5 \qquad (89)$$

$$B_1 = \Sigma_j P_{x-2,y+j}/5 \qquad (90)$$

$$B_2 = \Sigma_j P_{x+2,y+j}/5 \qquad (91)$$

$$B_3 = \Sigma_j P_{x-4,y+j}/5 \qquad (92)$$

$$B_4 = \Sigma_j P_{x+4,y+j}/5 \qquad (93)$$

where $j = -4, -2, 0, 2, 4$.

When the index value "1" of the horizontal correlation pixel group set is inputted from the current frame representative pixel group set selector 32c, the current frame pixel group representative value calculator 41c calculates the pixel group representative values $B_0$, $B_1$, $B_2$, $B_3$, and $B_4$ according to the equations (94) to (98) described below.

$$B_0 = \Sigma_i P_{x-i,y}/5 \qquad (94)$$

$$B_1 = \Sigma_i P_{x+i,y-2}/5 \qquad (95)$$

$$B_2 = \Sigma_i P_{x+i,y+2}/5 \qquad (96)$$

$$B_3 = \Sigma_i P_{x+i,y-4}/5 \qquad (97)$$

$$B_4 = \Sigma_i P_{x+i,y+4}/5 \qquad (98)$$

where $j = -4, -2, 0, 2, 4$.

When the index value "2" of the left-up correlation pixel group set is inputted from the current frame representative pixel group set selector 32c, the current frame pixel group representative value calculator 41c calculates the pixel group representative values $B_0$, $B_1$, $B_2$, $B_3$, and $B_4$ according to the equations (99) to (103) described below.

$$B_0 = \Sigma_i P_{x+i,y+i}/5 \qquad (99)$$

$$B_1 \{P_{x-2,y-4} + P_{x,y-2} + P_{x-2,y} + P_{x+4,y+2}\}/4 \qquad (100)$$

$$B_2 \{P_{x-4,y-2} + P_{x-2,y} + P_{x,y+2} + P_{x+2,y+4}\}/4 \qquad (101)$$

$$B_3 \{P_{x,y-4} + P_{x+2,y-2} + P_{x+4,y} + P_{x+2,y-4} + P_{x+4,y-2} + P_{x+4,y-4}\}/6 \qquad (102)$$

$$B_4 \{P_{x-4,y} + P_{x-2,y+2} + P_{x,y+4} + P_{x-4,y+2} + P_{x-2,y+4} + P_{x,y+4}\}/6 \qquad (103)$$

where $j = -4, -2, 0, 2, 4$.

When the index value "3" of the right-up correlation pixel group set is inputted from the current frame representative pixel group set selector 32c, the current frame pixel group representative value calculator 41c calculates the pixel group representative values $B_0$, $B_1$, $B_2$, $B_3$, and $B_4$ according to the equations (104) to (108) described below.

$$B_0 = \Sigma_i P_{x+i,y-i}/5 \qquad (104)$$

$$B_1 = \{P_{x-4,y+2} + P_{x-2,y} + P_{x+2,y-2} + P_{x+4,y-4}\}/4 \qquad (105)$$

$$B_2 = \{P_{x-2,y+4} + P_{x,y+2} + P_{x-2,y} + P_{x-4,y-2}\}/4 \qquad (106)$$

$$B_3 = \{P_{x-4,y} + P_{x-2,y-2} + P_{x,y-4} + P_{x-4,y-2} + P_{x-2,y-4} + P_{x-4,y-4}\}/6 \qquad (107)$$

$$B_4 = \{P_{x,y+4} + P_{x+2,y+2} + P_{x+4,y} + P_{x+2,y+4} + P_{x+4,y+2} + P_{x+4,y+4}\}/6 \qquad (108)$$

where $-4, -2, 0, 2, 4$.

When the index value "4" of the isotropic correlation pixel group set is inputted from the current frame representative pixel group set selector 32c, the current frame pixel group representative value calculator 41c calculates the pixel group representative values $B_0$, $B_1$, $B_2$, $B_3$, and $B_4$ according to the equations (109) to (113) described below.

$$B_0 = \{P_{x,y} + P_{x-2,y} + P_{x+2,y} + P_{x,y-2} + P_{x,y+2}\}/5 \qquad (109)$$

$$B_1 = \{P_{x-2,y-2} + P_{x+2,y-2} + P_{x+2,y+2} + P_{x-2,y+2}\}/4 \qquad (110)$$

$$B_2 = \{P_{x-4,y} + P_{x+4,y} + P_{x,y-4} + P_{x,y+4}\}/4 \qquad (111)$$

$$B_3 = \{P_{x-2,y-4} + P_{x-4,y-2} + P_{x+2,y-4} + P_{x+4,y-2} + P_{x+4,y+2} + P_{x+2,y+4} + P_{x-2,y+4} + P_{x-4,y+2}\}/8 \qquad (112)$$

$$B_4 = \{P_{x-4,y-4} + P_{x+4,y-4} + P_{x+4,y+4} + P_{x-4,y+4}\}/4 \qquad (113)$$

where $j = -4, -2, 0, 2, 4$.

The pixel group representative values $B_0$, $B_1$, $B_2$, $B_3$, and $B_4$ calculated as described above are outputted to the pixel group representative value similarity calculator 43c.

On the other hand, the previous frame pixel group representative value calculator 42c calculates pixel group representative value $C_0$, $C_1$, $C_2$, $C_3$, and $C_4$ of the pixel groups generated in the previous frame processing target pixel area on the basis of the pixel values $P'_{x+i,y+j}$ of the 25 pixels inputted from the previous franc same-channel-signal selector 29c. The calculation method of the pixel group representative values $C_0$, $C_1$, $C_2$, $C_3$, and $C_4$ can be realized in the same way as the calculation method of the pixel group representative values $B_0$, $B_1$, $B_2$, $B_3$, and $P_4$. The calculated pixel group representative values $C_0$, $C_1$, $C_2$, $C_3$, and $C_4$ are outputted to the pixel group representative value similarity calculator 43c.

For example, when the index value "0" of the vertical correlation pixel group set it inputted from the previous frame representative pixel group set selector 34c, the previous frame pixel group representative value calculator 42c calculates the pixel group representative values $C_0$, $C_1$, $C_2$, $C_3$, and $C_4$ according to the equations (114) to (118) described below.

$$C_0 = \Sigma_j P'_{x,y+j}/5 \qquad (114)$$

$$C_1 = \Sigma_j P'_{x-2,y+j}/5 \qquad (115)$$

$$C_2 = \Sigma_j P'_{x+2,y+j}/5 \qquad (116)$$

$$C_3 = \Sigma_j P'_{x-4,y+j}/5 \qquad (117)$$

$$C_4 = \Sigma_j P'_{x+4,y+j}/5 \qquad (118)$$

where $j = -4, -2, 0, 2, 4$.

When the index value "1" of the horizontal correlation pixel group set is inputted from the previous frame representative pixel group set selector 34c, the previous frame pixel group representative value calculator 42s calculates the pixel group representative values $C_0$, $C_1$, $C_2$, $C_3$, and $C_4$ according to the equations (119) to (123) described below.

$$C_0=\Sigma_i P'_{x+i,y}/5 \qquad (119)$$

$$C_1=\Sigma_i P'_{x+i,y-2}/5 \qquad (120)$$

$$C_2=\Sigma_i P'_{x+i,y+2}/5 \qquad (121)$$

$$C_3=\Sigma_i P'_{x+i,y-2}/5 \qquad (122)$$

$$C_4=\Sigma_i P'_{x+i,y+4}/5 \qquad (123)$$

where j=−4, −2, 0, 2, 4.

When the index value "2" of the left-up correlation pixel group set is inputted from the previous frame representative pixel group set selector 34c, the previous frame pixel group representative value calculator 42c calculates the pixel group representative values $C_0$, $C_1$, $C_2$, $C_3$, and $C_4$ according to the equations (124) to (128) described below.

$$C_0=\Sigma_i P'_{x+i,y+i}/5 \qquad (124)$$

$$C_1=\{P'_{x-2,y-4}+P'_{x,y-2}+P'_{x+2,y}+P'_{x+4,y+2}\}/4 \qquad (125)$$

$$C_2=\{P'_{x-4,y-2}+P'_{x-2,y}+P'_{x,y+2}+P'_{x+2,y+4}\}/4 \qquad (126)$$

$$C_3=\{P'_{x,y-4}+P'_{x+2,y-2}+P'_{x+4,y}+P'_{x+2,y-2}+P'_{x+4,y-2}+P'_{x+4,y-4}\}/6 \qquad (127)$$

$$C_4=\{P'_{x-4,y}+P'_{x-2,y+2}+P'_{x,y+4}+P'_{x-4,y+2}+P'_{x-2,y+4}+P'_{x,y+4}\}/6 \qquad (128)$$

where j=−4, −2, 0, 2, 4.

When the index value "3" of the right-up correlation pixel group set is inputted from the previous frame representative pixel group set selector 34c, the previous frame pixel group representative value calculator 42c calculates the pixel group representative values $C_0$, $C_1$, $C_2$, $C_3$, and $C_4$ according to the equations (129) to (133) described below.

$$C_0=\Sigma_i P'_{x+i,y-i}/5 \qquad (129)$$

$$C_1=\{P'_{x-4,y+2}+P'_{x-2,y}+P'_{x+2,y-2}+P'_{x+4,y-4}\}/4 \qquad (130)$$

$$C_2=\{P'_{x-2,y+4}+P'_{x,y+2}+P'_{x-2,y}+P'_{x-4,y-2}\}/4 \qquad (131)$$

$$C_3=\{P'_{x-4,y}+P'_{x-2,y-2}+P'_{x,y-4}+P'_{x-4,y-2}+P'_{x-2,y-4}+P'_{x-4,y-4}\}/6 \qquad (132)$$

$$C_4=\{P'_{x,y+4}+P'_{x+2,y+2}+P'_{x-4,y}+P'_{x+2,y+4}+P'_{x+4,y+2}+P'_{x+4,y+4}\}/6 \qquad (133)$$

where j=−4,−2, 0, 2, 4.

When the index value "4" of the isotropic correlation pixel group set is inputted from the previous frame representative pixel group set selector 34c, the previous frame pixel creep representative value calculator 42c calculates the pixel group representative values $C_0$, $C_1$, $C_2$, $C_3$, and $C_4$ according to the equations (134) to (139) described below.

$$C_0=\{P'_{x,y}+P'_{x-2,y}+P'_{x-2,y}+P'_{x,y-2}+P'_{x,y-2}\}/5 \qquad (134)$$

$$C_1=\{P'_{x-2,y-2}+P'_{x+2,y-2}+P'_{x+2,y+2}+P'_{x-2,y+2}\}/4 \qquad (135)$$

$$C_2=\{P'_{x-4,y}+P'_{x+4,y}+P'_{x,y-4}+P'_{x,y+4}\}/4 \qquad (136)$$

$$C_3=\{P'_{x-2,y-4}+P'_{x-4,y-2}+P'_{x+2,y-4}+P'_{x+4,y-2}+P'_{x+4,y+2}+P'_{x+2,y+4}+P'_{x-2,y+4}+P'_{x-4,y+2}\}/8 \qquad (137)$$

$$C_4=\{P'_{x-4,y}+P'_{x+4,y-4}+P'_{x-4,y+4}+P'_{x-4,y+4}\}/4 \qquad (138)$$

where j=−4, −2, 0, 2, 4.

The pixel group representative values $C_0$, $C_1$, $C_2$, $C_3$, and $C_4$ calculated as described above are outputted to the pixel group representative value similarity calculator 43c.

First, the pixel group representative value similarity calculator 43c calculates a pixel group representative value similarity according to the equation (139) described below on the basis of the pixel group representative values $B_0$, $B_1$, $B_2$, $B_3$, and $B_4$ inputted from the current frame pixel group representative value calculator 41c and the pixel group representative values $C_0$, $C_1$, $C_2$, $C_3$, and $C_4$ inputted from the previous frame pixel group representative value calculator 42c. Here, "k" is "0" representing the current frame or "−1" representing the previous frame, and "n" is the index value (n=0, 1, 2, 3, 4) of the pixel groups. $B_0$ is the pixel group representative value of the pixel group to which the pixel of interest belongs in the current frame.

$$SG_{n,k=0}=|B_n-B_0|, SG_{n,k=-1}=|C_n-B_0| \qquad (139)$$

Next, the pixel group representative value similarity calculator 43c defines a pixel group similarity $SG_{x+i,y+j,k}$ for each pixel in the current frame processing target pixel area and the previous frame processing target pixel area in accordance with the equation (140) described below on the basis of the calculated pixel group representative value similarities $SG_{n,k=0}$ and $SG_{n,k=-1}$. The pixel group similarity $SG_{x+i,y+j,k}$ defined for each pixel is outputted to the filter coefficient calculator 25c.

$$SG_{x+i,y+j,k}=SG_{n,k}; \; i,j \in \text{pixel group n} \qquad (140)$$

where i=−4, −2, 0, 2, 4, j=−4, −2, 0, 2, 4 and k=−1, 0.

The pixel value similarity calculator 24c calculates pixel value similarity $SP_{x+i,y+j,k}$ each pixel en the bans of the pixel values $P_{x+i,y+j}$ and $P'_{x+i,y+j}$ of the 25 pixels inputted from the current frame same-channel-signal selector 27c and the previous frame same-channel-signal selector 29c. For example, the pixel value similarity calculator 24c calculates the pixel value similarity $SP_{x+i,y+j,k}$ of each pixel as an absolute value of a pixel value difference between each pixel and the pixel of interest $P_{x,y}$ in the current frame. The pixel value similarity $SP_{x+i,y+j,k}$ is represented by the equations (141) and (142) described below. Here, "k" is "0" representing the current frame or "−1" representing the previous frame. The calculated pixel value similarity $SP_{x-i,y+j,k}$ of each pixel is outputted to the filter coefficient calculator 25c.

$$SP_{x+i,y+j,0}=|P_{x+i,y+j}-P_{x,y}| \qquad (141)$$

$$SP_{x+i,y+j,-1}=|P'_{x+i,y+j}-P_{x,y}| \qquad (142)$$

where i=−4, −2, 0, 2, 4 and j=−4, −2, 0, 2, 4.

The filter coefficient calculator 25c calculates a filter coefficient $C_{x+i,y+j,k}$ to be applied to each pixel in the current frame processing target pixel area and the previous frame processing target pixel area on the basis of the pixel group similarity $SG_{x+i,y+j,k}$ inputted from the pixel group representative value similarity calculator 43c and the pixel value similarity $SP_{x+i,y+j,k}$ inputted from the pixel value similarity calculator 24c. Specifically, in the same manner as in the first embodiment, the pixel group similarity $SG_{x+i,y+j,k}$ and the pixel value similarity $SP_{x+i,y+j,k}$ are defined as Gaussian weights, and a filter coefficient $C_{x+i,y+j,k}$ is calculated in accordance with the equation (143) described below. The calculated filter coefficient $C_{x+i,y+j,k}$ is outputted to the smoothing processing unit 26c.

$$C_{x+i,y+j,k}=Wg_{x-i,y-j,k}Wp_{x+i,y+j,k}/N \qquad (143)$$

Here, $Wg_{x+i,y+j}$, $Wp_{x+i,y+j}$, and N are represented by toe equations (144) to (146) described below, respectively. $\Sigma_{i,\,j,\,k}$ means a total sum of values where i, j and k can vary (i=−4, −2, 0, 2, 4, j=−4, −2, 0, 2, 4, and k=−1, 0).

$$Wg_{x+i,y+j,k}=\exp(-SG_{x+i,y+j,k}^2/(2\sigma_{g,k})^2) \quad (144)$$

$$Wp_{x+i,y+j,k}=\exp(-SG_{x+i,y+j,k}^2/(2\sigma_{p,k})^2) \quad (145)$$

$$N=\Sigma_{i,j,k}\exp(-SG_{x+i,y+j,k}^2/(2\sigma_{g,k})^2)\exp(-SP_{x+i,y+j,k}^2/(2\sigma_{p,k})^2) \quad (146)$$

Here, the $\sigma_{g,k}$ value and the $\sigma_{p,k}$ value are values transmitted from the control unit 16c as values of process parameters, and in the same manner as in the first embodiment, the $\sigma_{g,k}$ value and the $\sigma_{p,k}$ value are defined by the control unit 16c and transmitted to the filter coefficient calculator 25c. In the third embodiment, the $\sigma_{g,k}$ value and the $\sigma_{p,k}$ value to be applied can be individually defined in the current frame and the previous frame. In the third embodiment, the noise reduction processing unit 20c has a frame cyclic configuration, and there may be a problem typical to the cyclic configuration in which an afterimage generated by a relative motion between subject and a camera remains for a long time. This type of problem can be reduced by setting the σ value ($\sigma_{g,-1}$ value and $\sigma_{p,-1}$ value) defined for the previous frame smaller than the σ value ($\sigma_{g,0}$ value and $\sigma_{p,0}$ value) defined for the current frame. When the $\sigma_{g,-1}$ value and $\sigma_{p,-1}$ value are smaller than the $\sigma_{g,0}$ value and $\sigma_{p,0}$ value, even if the values of the pixel group similarity $SG_{x+i,y+j,k}$ and the pixel value similarity $SP_{x+i,y-j,k}$ are the same level, the values of weighted Gauss function values $Wg_{x+i,y+j,-1}$ and $Wp_{x+i,y+j,-1}$ become smaller than the values of $Wg_{x+i,y+j,0}$ and $Wp_{x+i,y+j,0}$. In other word, this provides an effect to reduce the weights.

It is also possible to employ a configuration in which publicly known motion compensation process is performed between the current frame and the previous frame before the noise reduction process. In this configuration, an occurrence of the above described afterimage can be suppressed because a relative motion between a subject and a camera can be compensated and an amount of relative motion between the pixel area $P_{x+i,y+j}$ extracted from the current frame and the pixel area $P'_{x+i,y+j}$ extracted from the previous frame can be deleted. In this case, the noise reduction processing unit can process the inputted images of each frame as a still image. Therefore, it is possible to improve the noise reduction effect without decreasing the σ value for the previous frame.

The smoothing processing unit 26c performs the smoothing process on the pixel of interest on the basis of the pix values $P_{x+i,y+j}$ of the 25 pixels inputted from the current frame same-channel-signal selector 27c, the pixel values $P'_{x-i,y+j}$ of the 25 pixels inputted from the previous frame same-channel-signal selector 29c, and the filter coefficient $C_{x+i,y+j,k}$ inputted from the filter coefficient calculator 25c. Specifically, a smoothed pixel value $Pf_{x,y}$ is obtained by performing the smoothing process on a pixel value $P_{x,y}$ of the pixel of interest in accordance with the equation (147) described below. The obtained smoothed pixel value $Pf_{x,y}$ is outputted to the WB processing unit, and stored in the frame memory 50c.

$$Pf_{x,y}=\Sigma_{i,j}C_{x+i,y+j,0}P_{x+i,y+j}+\Sigma_{i,j}C_{x+i,y+j,-1}P'_{x+i,y+j} \quad (147)$$

where i=−4, −2, 0, 2, 4 and j=−4, −2, 0, 2, 4.

According to the third embodiment described above, it is possible to calculate the filter coefficient considering the pixel values of the previous frame, and perform the smoothing process on the pixel of interest by using the calculated filter coefficient. Based on this, it us possible to realize cyclic noise reduction process considering the correlation between frames, reduce noise while the microstructure is preserved, without being destroyed, with higher accuracy, and increase the noise reduction effect.

In the third embodiment described above, the image data on which the noise reduction process has been performed is used as the previous frame used in the noise reduction process. Whereas, it is possible to employ a configuration in which the frame memory 50c holds the pixel values of the current frame which is inputted into the noise reduction processing unit 20c and on which the noise reduction process has not been performed yet, and the image data on which the noise reduction process has not been performed vet as the previous frame.

In the same way as is the first embodiment, the noise reduction processing unit 20c described in the third embodiment is not limited to hardware, but may be realized as software by causing the CPU 1011 of the computer system 1000 as exemplified in FIGS. 13 and 14 to execute the image processing program.

Figure 30:
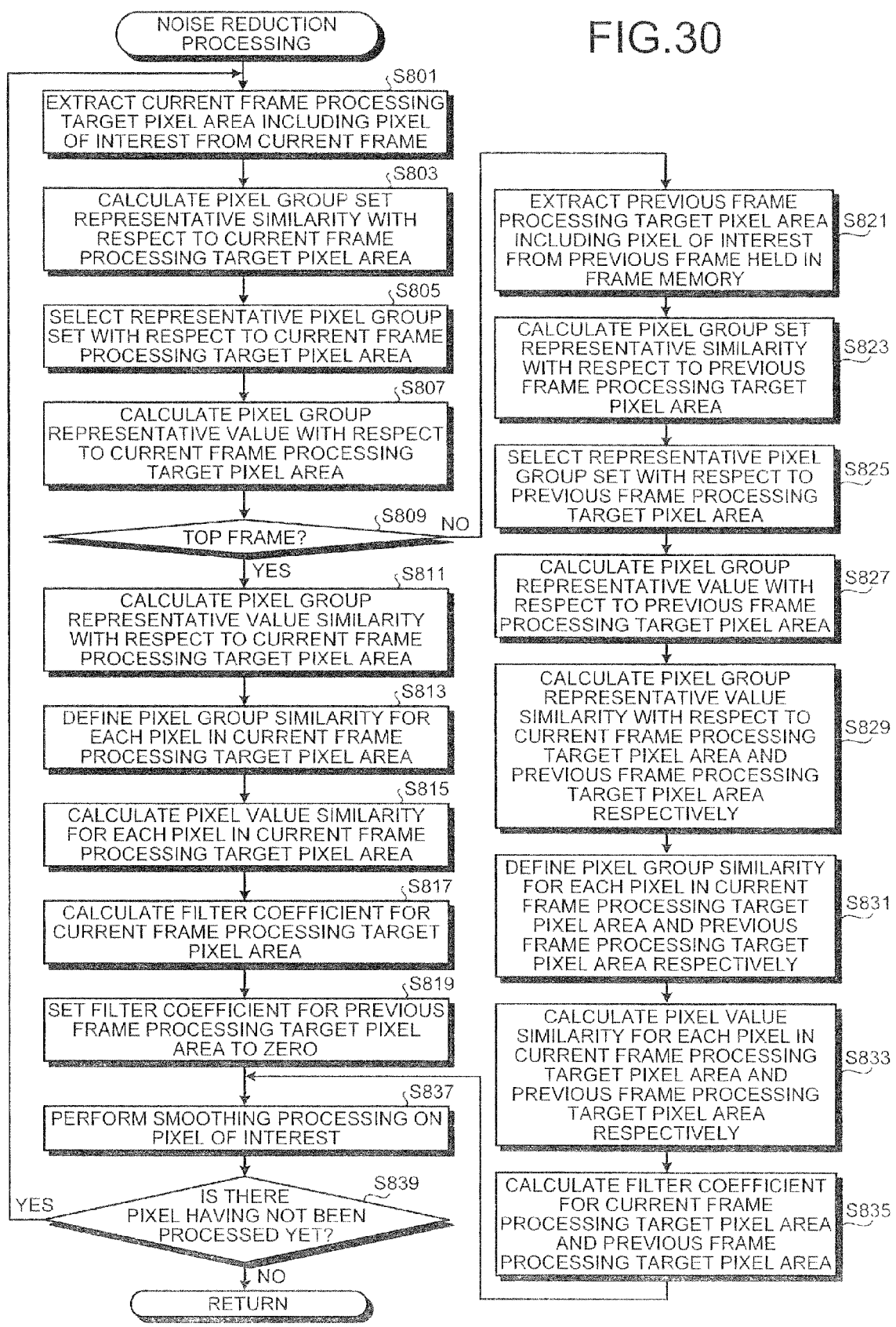
FIG. 30 is a flowchart showing a detailed processing procedure of noise reduction process according to a modified example.

FIG. 30 is a flowchart showing a detailed processing procedure of the noise reduction processing performed by the CPU 1011 in a modified example.

As shown in FIG. 30, in the noise reduction process, first, the current frame processing target pixel area including the pixel of interest is extracted from the current frame (step S801). Next, the pixel group set representative similarity when dividing the current frame processing target pixel area extracted in step S801 into a pixel group set of a plurality of candidates prepared in advance is calculated for each candidate in accordance with the equations (79) to (83) described above (step S803). Then, the representative pixel group set is selected with respect to the current frame processing target pixel area on the basis of the pixel group set representative similarities calculated for each candidate (step S805).

Next, the pixel group representative value of each pixel group with respect to the representative pixel group set selected in step S805 is calculated in accordance with a corresponding equation among, the equations (89) to (113) on the basis of the pixel values of the pixels in the current frame processing target pixel area extracted in step S801 (step S807). Then, whether or not the current frame is the top frame is determined. If the current frame is the top frame (step S809: Yes), the pixel group representative value similarity is calculated in accordance with the equation (139) described above on the basis of the pixel group representative value calculated with respect to the current frame processing target pixel area in step S807 (step S811). Then, the pixel group similarity is defined for each pixel in the current frame processing target pixel area in accordance with the equation (140) described above on the basis of the calculated pixel group representative value similarity (step S813).

The pixel value similarity of each pixel is calculated in accordance with the equation (141) described above on the basis of the pixel values the pixels in the current frame processing target pixel area extracted in step S801 (step S815).

The filter coefficient to be applied to the current frame processing target pixel area is calculated in accordance with the equation (143) described above by using the values of the process parameters on the basis of the pixel group similarity defined for each pixel in toe current frame processing target pixel area in step S813 and the pixel value similarity calculated for each pixel in the current frame processing target pixel area in step S815 (step S817). The filter coefficient to be applied to the previous frame processing target pixel area is set to "zero" because there is no previous frame (step S819). Thereafter, the process moves to step S837.

On the other hand, when it is determined that the current frame is not the top frame in step S309 (step S809: No), the previous frame which was smoothed last tree as the current frame and will be stored in the frame memory in step S837 described below is read, and the previous frame processing target pixel area including the pixel of interest extracted from the read previous frame (step S821). Next, the pixel group set representative similarity when dividing the previous frame processing target pixel area extracted in step S821 into a pixel group set of a plurality of candidates prepared in advance is calculated for each candidate in accordance with too equations (84) to (88) described above (step S823). Then, the representative pixel group set is selected with respect to the previous frame processing target pixel area on the basis of the pixel group set representative similarities calculated for each candidate (step S825).

Next, the pixel group representative value of each pixel group with respect to the representative pixel group set selected in step S825 is calculated in accordance with a corresponding equation among the equations (114) to (138) described above on the basis of the pixel values of the pixels in the previous frame processing target pixel area extracted in step S821 (step S827).

Next, in accordance with the equation (139) described above, the pixel group representative value similarity is calculated on the basis of the pixel group representative value calculated with respect to the current frame processing target pixel area in step S807, and the pixel group representative sale similarity is calculated on the basis of the pixel group representative value calculated with respect to the previous frame processing target pixel area in step S827 (step S829). Then, in accordance with the equation (140) described above, on the basis of the calculated pixel group representative value similarities, the pixel group similarity is defined for each pixel in she current frame processing target pixel area, and the pixel group similarity is defined for each pixel in the previous frame processing target pixel area (step S831).

The pixel value similarity of each pixel is calculated in accordance with the equation (141) described above on the basis of the pixel values of the pixels in the current frame processing target pixel area extracted in step S801, and the pixel value similarity of each pixel is calculated in accordance with the equation (142) described above on the basis of the pixel values of the pixels in the previous frame processing target pixel area extracted in step S821 (step S833).

In accordance with the equation (143) described above, the filter coefficient to be applied to the current frame processing target pixel area and the filter coefficient to be applied to the previous frame processing target pixel area are calculated by using the values of the process parameters on the basis of the pixel group similarity defined in step S831 and the pixel value, similarity calculated in step S833 (step S835). Thereafter, the process moves to step S837.

In step S637, in accordance with the equation (147) described above, the smoothing process is performed on the basis of the filter coefficient calculated in step S835, and the smoothed pixel value is calculated. The obtained smoothed pixel value is outputted to the WB processing unit, and stored in the frame memory.

Thereafter, when there is a pixel which has not been processed yet (step S839: Yes), the process returns to step S601, and performs the process from step S801 to step S837 on the pixel which has not been processed yet by defining that the pixel is the pixel of interest. On the other hand, when there is no pixel which has not been processed yet (step S839: No), the process ends the process.

In the present invention, a pixel of interest to be processed and a pixel area including peripheral pixels located around the pixel of interest are extracted. A plurality of pixel groups are then generated by dividing the pixels in the extracted pixel area in accordance with a pixel value distribution in the pixel area, and for each generated pixel group, a pixel group similarity defined for pixels belonging to the pixel group is calculated as a similarity between the pixel group and the pixel group including the pixel of interest. The pixel value similarity of each pixel in the extracted pixel area is calculated on the basis of the pixel value of the pixel of interest. Then, on the basis of the pixel group similarity and the pixel value similarity, a filter coefficient applied to the pixels in the extracted pixel area is calculated, and the smoothing process is performed on the pixel value of the pixel of interest on the basis of the pixel values in the pixel area and the calculated filter coefficient. Based on this, it is possible to calculate the filter coefficient considering the pixel value distribution in the pixel area, and perform the smoothing process on the pixel of interest by using the filter coefficient. As a result, noise can be reduced with high accuracy without destroying the microstructure of the image, and the noise reduction effect can be increased.

The above and other features, advantages and technical and industrial significance of this invention will be better understood by reading the following detailed description of presently preferred embodiments of the invention, when considered in connection with the accompanying drawings.

What is claimed is:

1. An image processing device comprising:
   an image data input unit that receives image data;
   a pixel extracting unit that extracts a pixel area including a pixel of interest to be processed and peripheral pixels located around the pixel of interest from the image data;
   a pixel group generator that generates a plurality of pixel groups by dividing pixels in the pixel area in accordance with a pixel value distribution in the pixel area;
   a pixel group similarity calculator that calculates a similarity between a pixel group and a pixel group including the pixel of interest for each pixel group as a pixel group similarity to be defined for pixels belonging to the pixel group in the pixel area;
   a pixel value similarity calculator that calculates a pixel value similarity of each pixel in the pixel area on the basis of a pixel value of the pixel of interest;
   a filter coefficient calculator that calculates filter coefficients to be applied to pixels in the pixel area on the basis of the pixel group similarity and the pixel value similarity; and
   a smoothing processing unit that performs a smoothing process on the pixel value of the pixel of interest on the basis of pixel values in the pixel area and the filter coefficients.

2. The image processing device according to claim 1, wherein the pixel group generator includes
   a pixel group set representative similarity calculator that calculates a pixel group set representative similarity for each candidate of a plurality types of pixel group sets generated by dividing the pixel area into a plurality of pixel groups in accordance with a plurality of predetermined division patterns, and
   a representative pixel group set selector that selects a candidate of a pixel group sot matched to the pixel distribution in the pixel area as a representative pixel group set from candidates of the plurality types of pixel group sets on the basis of the pixel group set representative similarities,
   the pixel groups are generated by selecting representative pixel group set.

3. The image processing device according to claim wherein the pixel group set representative similarity calculator calculates a similarity between pixels adjacent to each other belonging to a pixel group for each pixel group constituting the candidate of the pixel group set, and calculates a total sum of the calculated similarities as the pixel group set representative similarity.

4. The image processing device according to claim 3, wherein the pixel group set representative similarity calculator calculates a difference absolute value between values of the pixels adjacent to each other as a similarity between the pixels adjacent to each other.

5. The image processing device according to claim 4, wherein the representative pixel group set selector selects, as the representative pixel group set, a candidate of a pixel group set having a least pixel group set representative similarity in the pixel group set representative similarities calculated for each candidate of the plurality types of pixel group sets.

6. The image processing device according to claim 1,
wherein the pixel group similarity calculator includes
a pixel group representative value calculator that calculates a pixel group representative value for each of the plurality of pixel groups, an
a pixel group representative value similarity calculator that calculates a pixel group representative value similarity between a pixel group and the pixel group including the pixel of interest for each of the plurality of pixel groups on the basis of the pixel group representative value.

7. The image processing device according to claim 6, wherein the pixel group representative value calculator calculates, as the pixel group representative value, an average pixel value of each pixel belonging to the pixel group.

8. The image processing device according to claim 6, wherein the pixel group representative value similarity calculator calculates, as the pixel group representative value similarity, a difference absolute value between the pixel group representative value of the pixel group and the pixel group representative value of the pixel group including the pixel of interest.

9. The image processing device according to claim 1, wherein the pixel value similarity calculator calculates, as the pixel value similarity, a difference absolute value between a pixel value and the pixel value of the pixel of interest for each pixel in she pixel area.

10. The image processing device according to claim 1, wherein the filter coefficient calculator calculates the filter coefficient by multiplying a first function value which is calculated to be smaller as the pixel group similarity decreases and a second function value which is calculated to be smaller as the pixel value similarity decreases.

11. The image processing device according to claim 10, wherein the first function value and the second function value are calculated by using a Gauss function respectively.

12. The image processing device according to claim 1,
wherein the image data input unit sequentially receives images constituting a continuous image stream in chronological order,
the pixel extracting unit extracts a pixel area including the pixel of interest and peripheral pixels located around the pixel of interest from image data of a current image as a current image pixel area, and also extracts a pixel area including the pixel of interest and peripheral pixels located around the pixel of interest from image of a previous image as a previous image pixel area,
the pixel group generator generates the pixel group with respect to the current image pixel area and also generates the pixel group with respect to the previous image pixel area,
the pixel group similarity calculator calculates the pixel group similarity with respect to the current image pixel area and also calculates the pixel group similarity with respect to the previous image pixel area,
the pixel value similarity calculator calculates the pixel value similarity with respect to each pixel in the current image pixel area and also calculates the pixel value similarity with respect to each pixel in the previous image pixel area,
the filter coefficient calculator calculates filter coefficients to be applied to pixels in the current image pixel area on the basis of the pixel group similarity calculated with respect to the current image pixel area and the pixel value similarity calculated with respect to each pixel in the current image pixel area, and also calculates filter coefficients to be applied to pixels in the previous image pixel area on the basis of the pixel group similarity calculated with respect to the previous image pixel area and the pixel value similarity calculated with respect to each pixel in the previous image pixel area, and
the smoothing processing unit performs smoothing processing on the pixel value of the pixel of interest in the current image pixel area on the basis of the pixel values in the current image pixel area, the pixel values in the previous image pixel area, and the filter coefficients to be applied to the pixels in the current image pixel area and the pixels in the previous image pixel area respectively.

13. The image processing device according to claim 12, wherein the pixel group generator includes
a first pixel group set representative similarity calculator that calculates a current image pixel group set representative similarity for each candidate of a plurality types of pixel group sets generated by dividing the current image pixel area into a plurality of pixel groups in accordance with a plurality of predetermined division patterns,
a first representative pixel group set selector that selects a candidate of a pixel group et matched to a pixel distribution in the current image pixel area as a first representative pixel group set from candidates of the plurality types of pixel group sets on the basis of the current image pixel group set representative similarities,
a second pixel group set representative similarity calculator that calculates a previous image pixel group set representative similarity for each candidate of a plurality types of pixel group sets generated by dividing the previous image pixel area into a plurality of pixel groups in accordance with a plurality of predetermined division patterns, and
a second representative pixel group set selector that selects a candidate of a pixel group set matched to a pixel distribution in the previous image pixel area as a second representative pixel group set from candidates of the plurality types of pixel group sets on the basis of the previous image pixel group set representative similarities, and
the pixel groups with respect to the current image pixel area are generated by selecting the first representative pixel group set, and the pixel groups with respect to the previous image pixel area are generates by selecting the second representative pixel group set.

14. The image processing device according to claim 13, wherein the previous image is image data on which a smoothing process is performed by the smoothing processing unit.

15. An image processing method comprising:
receiving image data;
extracting a pixel area including a pixel of interest to be processed and peripheral pixels located around the pixel of interest from the image data;
generating a plurality of pixel groups by dividing pixels in the pixel area in accordance with a pixel value distribution in the pixel area;
calculating a similarity between a pixel group and a pixel group including the pixel of interest for each pixel group as a pixel group similarity to be defined for pixels belonging to the pixel group in the pixel area;
calculating a pixel value similarity of each pixel in the pixel area on the basis of a pixel value of the pixel of interest;
calculating filter coefficients to be applied to pixels in the pixel area on the basis of the pixel group similarity and the pixel value similarity; and
performing a smoothing process on the pixel value of the pixel of interest on the basis of pixel values in the pixel area and the filter coefficients.

16. A non-transitory computer readable storage medium storing an image processing program that comprises instructions causing a computer to execute:
receiving image data;
extracting a pixel area including a pixel of interest to be processed and peripheral pixels located around the pixel of interest from the image data;
generating a plurality of pixel groups by dividing pixels in the pixel area in accordance with a pixel value distribution in the pixel area;
calculating a similarity between a pixel group and a pixel group including the pixel of interest for each pixel group as a pixel group similarity to be defined for pixels belonging to the pixel group in the pixel area;
calculating a pixel value similarity of each pixel in the pixel area on the basis of a pixel value of the pixel of interest;
calculating filter coefficients to be applied to pixels in the pixel area on the basis of the pixel group similarity and the pixel value similarity; and
performing a smoothing process on the pixel value of the pixel of interest on the basis of pixel values in the pixel area and the filter coefficients.

* * * * *